US006356820B1

(12) United States Patent
Hashimoto et al.

(10) Patent No.: US 6,356,820 B1
(45) Date of Patent: Mar. 12, 2002

(54) PROCESSIONAL TRAVEL CONTROL APPARATUS

(75) Inventors: Hideki Hashimoto; Masami Ogura, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,111

(22) Filed: May 22, 2000

(30) Foreign Application Priority Data

May 21, 1999 (JP) .......................................... 11-142468
Jun. 23, 1999 (JP) .......................................... 11-177532

(51) Int. Cl.[7] .......................... G01C 21/00; B60Q 1/16
(52) U.S. Cl. ............................ 701/23; 701/24; 701/96; 701/116; 340/903; 340/435; 180/167; 180/170
(58) Field of Search ............................ 701/23, 24, 26, 701/96, 116; 340/435, 436, 902, 904, 903; 180/167, 170

(56) References Cited

U.S. PATENT DOCUMENTS 5,680,122 A * 10/1997 Mio ........................... 340/932
5,781,119 A * 7/1998 Yamashita et al. .......... 340/903
6,032,097 A * 2/2000 Iihoshi et al. ................. 701/96

* cited by examiner

*Primary Examiner*—Yonel Beaulieu
(74) *Attorney, Agent, or Firm*—Carrier, Blackman & Associates, P.C.; Joseph P. Carrier; William D. Blackman

(57) ABSTRACT

A processional travel control apparatus allows processional travel with a group of vehicles including a leading vehicle and a following vehicle automatically following the leading vehicle. An object vehicle includes a device for sending a request to separate from or join the processional travel, to the leading vehicle. The leading vehicle includes a device for permitting or rejecting the request from the object vehicle. When the leading vehicle permits the request, the object vehicle is switched by a mode switching device between automatic driving, in which the following vehicle automatically follows the leading vehicle, ans manual driving by a driver.

8 Claims, 43 Drawing Sheets

PROCESSIONAL TRAVEL CONTROL APPARATUS

BACKGROUND OF THE INVENTION

1. Field of the Invention

The present invention relates to a processional travel control apparatus, which enables processional travel with a leading vehicle being driven by a driver and a plurality of vehicles automatically following the leading vehicle, and in particular, to a processional travel control apparatus which allows a vehicle to separate from the procession, and which allows an independent vehicle or another procession to incorporate into the procession.

This application is based on Japanese Patent Application Nos. Hei 11-142468 and Hei 11-177532, the contents of which are incorporated herein by reference.

2. Description of the Related Art

In recent years, techniques for processional travel with vehicles automatically following a leading vehicle on a highway have been developed. The processional travel eliminates the labor of driving the following vehicles traveling in a procession, and the distances between the vehicles can be shortened, thereby increasing the transport efficiency.

The processional travel requires a sufficient space to arrange the vehicles in order of travel, and to register the order of travel. The procession is formed in a service area, or in a dedicated port, where an environment for supporting the processional travel (e.g., a control device) can be easily provided.

No problems are encountered when the final destination of all the vehicles forming the procession is the same, and all the vehicles go to the final destination while maintaining the procession. However, for example, during the travel, one or more specified vehicles in the procession may wish to separate from the procession. When some of the vehicles are to separate from the procession, the procession must stop at a service area, must be reformed, and must be restarted.

When the separating point is located near the service area, the loss in efficiency is not that large. However, there is the problem that, when the separating point is far from the service area, the procession must be reformed (e.g., divided into two processions), and two processions must travel a long distance to the separating point, decreasing the transport efficiency.

Further, there is the problem that, when there are two or more vehicles that wish to separate at different separating points, the procession must be reformed in different service areas, which is labor-consuming work.

Further, when the procession is traveling, another vehicle or procession may wish to join the traveling procession. When two processions join, the labor of the drivers can be decreased. The vehicle or procession which was once separated from the parent procession may finish its job, and may wish to rejoin the parent procession. Thus, to incorporate another vehicle or procession in the traveling procession, the procession must stop at a service area, must be reformed, and must be restarted.

BRIEF SUMMARY OF THE INVENTION

It is therefore an object of the present invention to provide a processional travel control apparatus which can divide a procession during a processional travel.

Such a processional travel control apparatus according to the invention includes communication device (transmitter

10, and receiver 11) for sending information regarding an object vehicle position to another vehicle (electric vehicle 1 in the embodiment), and which allows processional travel with a leading vehicle (A1) and a following vehicle (A2, A3, A4, and A5) automatically following the leading vehicle, based on the information. The following vehicle comprises a device (steps S82, and S83) for sending a request to separate from the processional travel to the leading vehicle. The leading vehicle comprises a device (steps S57, S58, S60, and S61) for permitting or rejecting the separation request from the following vehicle. When the leading vehicle permits the separation request, the following vehicle is switched by a mode switching device (step S96) from automatic driving, in which the following vehicle automatically follows the leading vehicle, to manual driving by a driver.

According to the invention, even when the vehicles are traveling, some of the vehicles can be separated from the procession without stopping the traveling procession. Therefore, because even the vehicles which have different destinations can form the procession, the flexibility in formation of the procession is increased.

In another aspect of the invention, the apparatus further comprises a channel switching device (frequency switching circuit 8) for switching a communication channel. When the leading vehicle permits the separation request and there is another following vehicle (A4 and A5) which follows the following vehicle (A3) separating from the procession at the time of switching from automatic driving to manual driving, the channel switching device switches the communication device of the new procession to a communication channel (the band AS or BS) different from that of the previous procession.

According to the invention, when a plurality of vehicles are separated from the procession, the communication data can be distinguished between these separated vehicles and the remaining vehicles in the procession, thereby preventing radio interference.

It is another object of the present invention to provide a processional travel control apparatus which can incorporate an independent vehicle or a procession into another procession during a processional travel.

Such a processional travel control apparatus according to the invention includes a communication device (the transmitter 10, and the receiver 11 in the embodiment) for sending information regarding an object vehicle position to another vehicle (the vehicle 1), and allows processional travel with a group of vehicles including a leading vehicle (D1) and a following vehicle (D2, D3, and D4) automatically following the leading vehicle, based on the information. An independent vehicle (E), which travels independently from the vehicle group (DG) traveling in a procession comprises a device (steps S1124 and S1125) for sending a request to incorporate the independent vehicle into the procession to the leading vehicle. The leading vehicle comprises a device (steps S1067 and S1070) for permitting or rejecting the incorporation request from the independent vehicle. When the leading vehicle permits the incorporation request from the independent vehicle, the independent vehicle is switched by a mode switching device (step S1138) from manual driving by a driver to automatic driving in which this vehicle automatically follows the leading vehicle.

According to the invention, by incorporating an independent vehicle, which is manually driven, into the processional vehicle group, the vehicle becomes a following vehicle which is automatically driven, as well as the other vehicles following the leading vehicle. Therefore, the labor of the driver to drive the independent vehicle can be reduced. Further, because the independent vehicle can be incorporated during the processional travel, the vehicles do not have to stop at a service area and to reform a procession, thus preventing the decrease in transport efficiency.

In another aspect of the invention, the processional travel control apparatus has a communication device for sending information regarding an object vehicle position to another vehicle, and allows processional travel with groups of vehicles, each group including a leading vehicle and at least one succeeding vehicle automatically following the leading vehicle, based on the information. The leading vehicle (E1) in a second vehicle group (EG), which travels in a second procession independently from a first vehicle group (DG) traveling in a first procession, comprises a device (steps S1274 and S1275) for sending a request to join the first procession to the leading vehicle in the first procession. The leading vehicle in the first vehicle group comprises a device (step S1221 and S1224) for permitting or rejecting the incorporation request from the second vehicle group. When the leading vehicle in the first vehicle group permits the incorporation request from the second vehicle group, the leading vehicle in the second vehicle group is switched by a mode switching device (step S1234) from manual driving by a driver to automatic driving in which this vehicle automatically follows the leading vehicle in the first vehicle group, and becomes a following vehicle (F4, and F5) in a new vehicle group (FG) and follows the leading vehicle in the first vehicle group.

According to the invention, when the second vehicle group traveling in a procession joins the first vehicle group, the following vehicles and the leading vehicles in the second vehicles group become following vehicles in a new procession following the leading vehicle in the first vehicle group. Thus, the labor of the driver to drive the leading vehicle in the second vehicle group can be reduced. Further, because the second vehicle group joins the first vehicle group during the processional travel, the vehicles do not have to stop at a service area and to reform a procession, thus preventing the decrease in transport efficiency.

In another aspect of the invention, the apparatus further comprises a channel switching device (frequency switching circuit 8) for switching a communication channel. When the leading vehicle in the first vehicle group permits the joining request from the second vehicle group and the second vehicle group joins the first vehicle group, the channel switching device sets the communication channel for the second vehicle group to the same as that for the first vehicle group.

According to this invention, when the leading vehicle in the first vehicle group permits the joining request from the second vehicle group and the second vehicle group joins the first vehicle group, the channel switching device sets the communication channel for the second vehicle group to the same as that for the first vehicle group. Thus, this establishes the communication environment for the new procession which combines two vehicle processions, and the processional travel of the new vehicle group can be smoothly performed.

BRIEF DESCRIPTION OF THE DRAWINGS

FIG. 5A shows a procession setting screen, FIG. 5B shows a screen during the formation of the procession, FIG. 5C shows a screen during the processional travel, and FIG. 5D shows a screen when a procession separation request is received.

FIG. 6A shows a procession setting screen, FIG. 6B shows a screen during the formation of the procession and during the processional travel, and FIG. 6C shows a screen after a separation request button is pushed and the vehicle is a waiting permission.

FIG. 7A shows an input/output screen on the display device in the leading vehicle in the new procession, and FIG. 7B shows an input/output screen on the display device in the last following vehicle which has sent the separation request.

FIG. 17A shows a transmitter, and FIG. 17B shows a receiver.

FIG. 21A shows a procession setting screen, FIG. 21B shows a screen during the formation of the procession, FIG. 21C shows a screen during the processional travel, and FIG. 21D shows a screen when a procession incorporation request is received.

FIG. 22A shows a procession setting screen, FIG. 22B shows a screen for selecting incorporation into the procession and during the communication with the leading vehicle, FIG. 22C shows a screen indicating the permission by the leading vehicle, and FIG. 22D shows a screen indicating the rejection by the leading vehicle or the failure in capturing a vehicle in front.

FIG. 33A shows a procession setting screen, FIG. 33B shows a screen during the formation of the procession, FIG. 33C shows a screen during the processional travel, and FIG. 33D shows a screen when a procession joining request is received.

FIG. 34A shows a procession setting screen, FIG. 34B shows a screen during the formation of the procession, and FIG. 34C shows a screen during the processional travel.

FIG. 35A shows the screen when a procession joining request button is pushed, and FIG. 35B shows the screen after that of FIG. 35A.

FIG. 43A shows a transmitter, and FIG. 43B shows a receiver.

DETAILED DESCRIPTION OF THE INVENTION

First Embodiment

Figure 1:
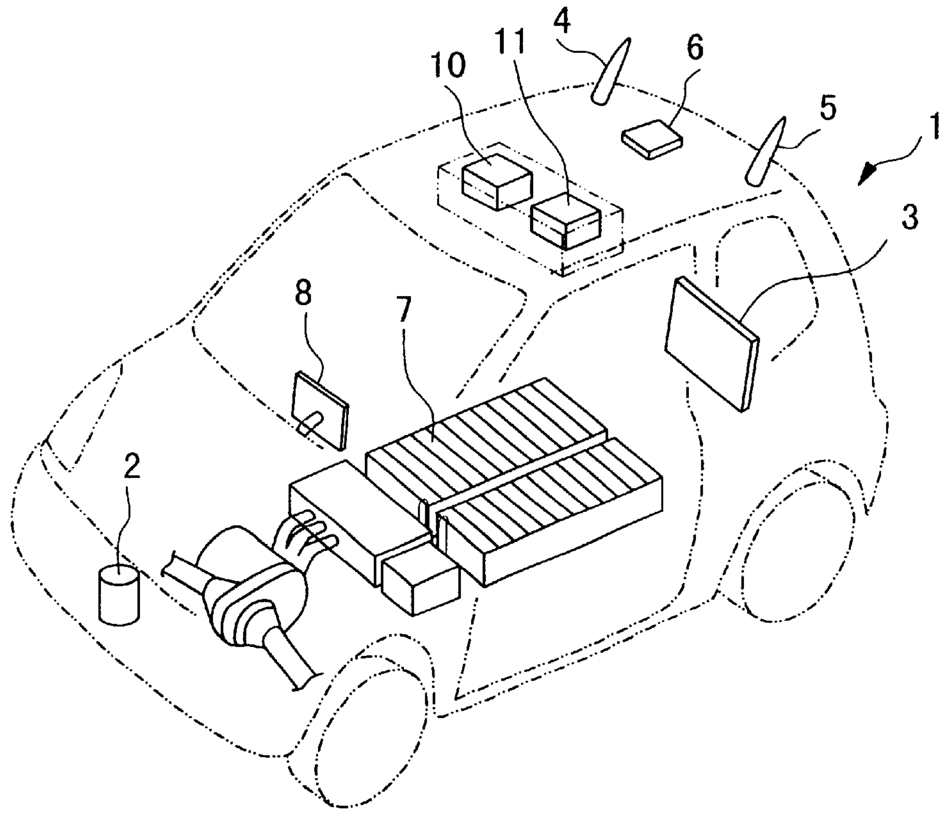
FIG. 1 is a perspective view of an electric vehicle of the embodiment of the present invention.

Hereinafter, embodiments of the present invention are described with reference to the drawings. FIG. 1 shows an electric vehicle 1 (hereinafter, referred to simply as a vehicle) capable of traveling in a procession, which is fitted with a laser radar 2 in the center of the front bumper capable of wide angle scanning, and a reflector 3 in the center of the rear bumper, being a plate with a mirror finish for reflecting a radar wave emitted by a laser radar 2 of a succeeding vehicle. Using a combination of the laser radar 2 and the reflector 3, by picking up the location of the reflector 3 (radar measuring point) of the preceding vehicle in real time using the laser radar 2 of the succeeding vehicle, it is possible for the succeeding vehicle to detect the location of the preceding vehicle (the distance from the preceding vehicle) and its direction in real time.

Figure 2:
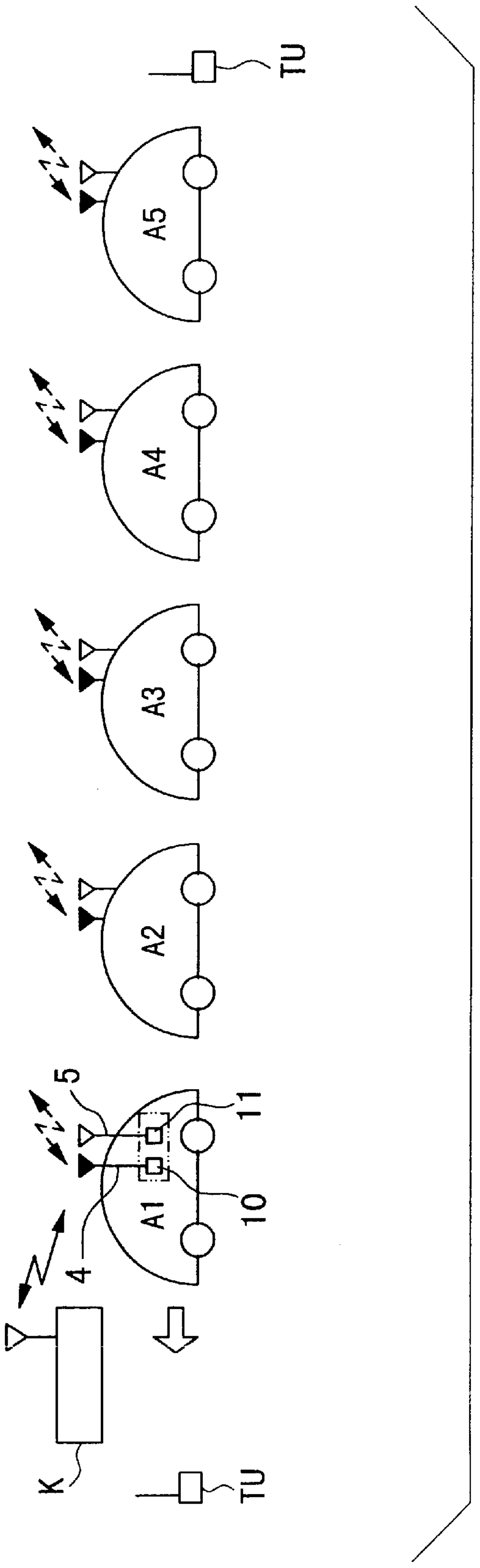
FIG. 2 is a diagram for explaining a processional travel of the present invention.

Installed in the roof of the electric vehicle 1 are: a vehicle-to-vehicle antenna 4 for radio communication between electric vehicles 1 (vehicle-to-vehicle communication), a road-to-vehicle antenna 5 for radio communication with communication devices TU and the like arranged along a road as shown in FIG. 2, and a GPS/DGPS antenna 6 for receiving radio waves from GPS satellites and DGPS stations. Here, 7 is a battery. The vehicle 1 includes a display device 8 which is normally used as a display for car navigation. 10 is a transmitter, 11 is a receiver (which are described later), and they are a part of the processional travel control apparatus as enclosed by the chain lines (the same in FIG. 2).

FIG. 2 shows the vehicles traveling in a procession. A plurality of electric vehicles travels in a procession by merging vehicle-to-vehicle communication information such as vehicle speed, steering angle, and vehicle position coordinates of the preceding vehicles, obtained from the vehicle-to-vehicle communication using the radio LAN as mentioned above, with information obtained from the laser radar 2 and the reflector 3, and by tracing the tracks of the preceding or leading vehicle, based on the merged information.

In FIG. 2, in the procession A, following vehicles A2, A3, A4, and A5, which are automatically driven, follow a leading vehicle A1 which is manually driven at the head. The leading vehicle A1, and the following vehicles A2, A3, A4, and A5 have the same specifications (the same structure).

Next is a description of the communication procedure in the vehicle-to-vehicle communication in the processional travel. When the setting for forming the procession has finished and each vehicle has recognized the total number of vehicles and its own sequence number (which is described later), the transmission and reception are started.

(1) The leading vehicle A1 transmits (broadcasts), and in the transmitted data, it is specified that the following vehicle A2 has the next transmission right. Here, the transmitted data from the leading vehicle A1 is received by all of the following vehicles A2 to A5.

(2) Next, the following vehicle A2 transmits, and in the transmitted data, it is specified that the leading vehicle A1 has the next transmission right. Similarly, the transmitted data from the following vehicle A2 is received by the leading vehicle A1 and all of the following vehicles A3 to A5.

(3) Next, the leading vehicle A1 transmits again, and in the transmitted data, it is specified that the following vehicle A3 has the next transmission right.

(4) Next, the following vehicle A3 transmits, and in the transmitted data, it is specified that the leading vehicle A1 has the next transmission right. Similarly, the transmitted data from the following vehicle A3 is received by the leading vehicle A1 and the following vehicles A2, A4, and A5.

(5) After the following vehicle AS transmits, the procedure returns to the leading vehicle A1, and then the above procedure is then repeated.

While in the embodiment there are five vehicles in the procession, the number of vehicles is not limited to this.

Figure 3:
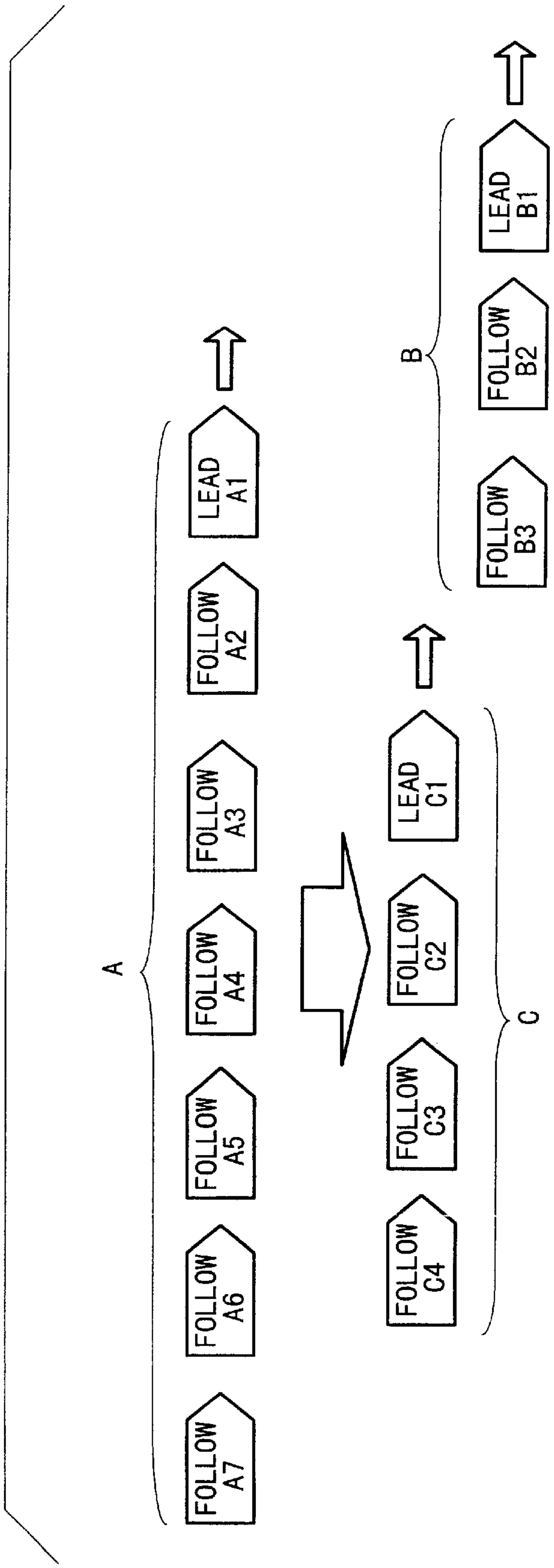
FIG. 3 is a diagram for explaining a manner of separating the procession of the present invention.
Figure 4:
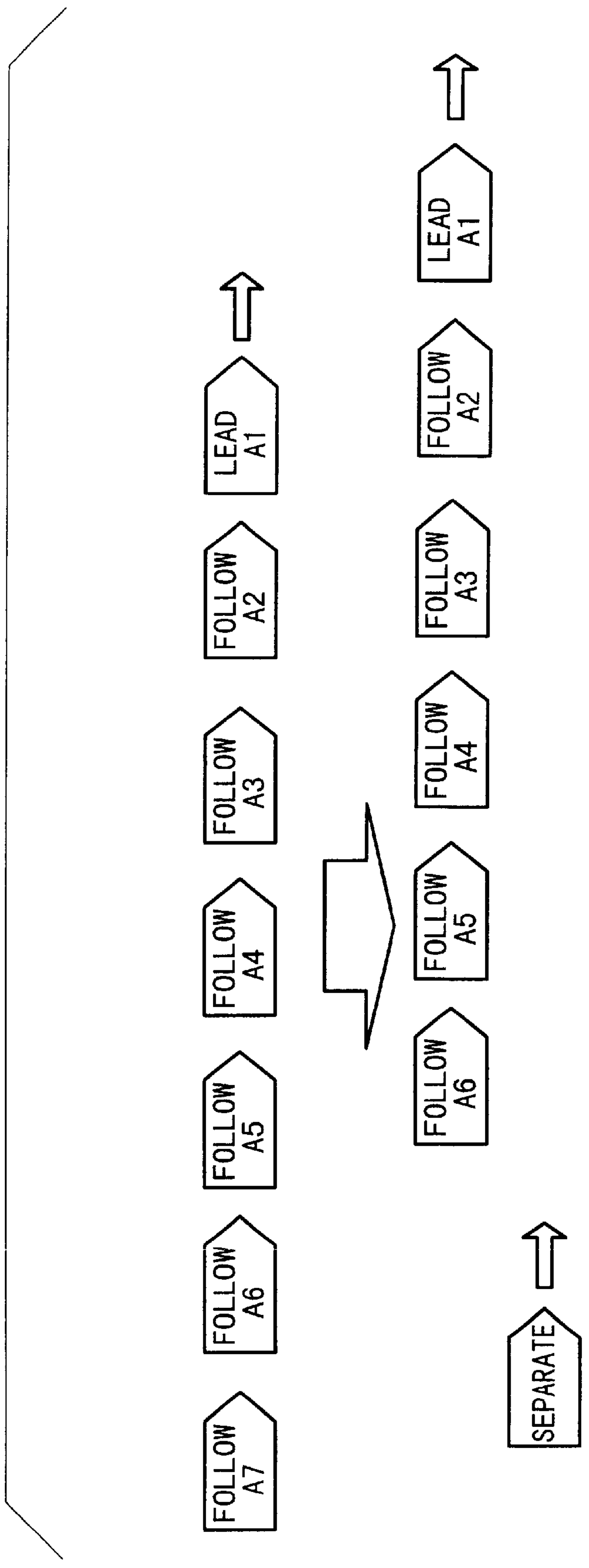
FIG. 4 is a diagram for explaining a manner of separating the procession of the present invention.

During the processional travel, a part of the procession may wish to separate. No problems occur when the destination of the vehicles in the procession is identical. However, when there are some vehicles having a different destination, the procession must be divided. FIGS. 3 and 4 show examples of dividing the procession. In FIG. 3, the procession is divided into two, and, in FIG. 4, one vehicle separates from the end of the procession. As shown in FIGS. 3 and 4, the processional vehicle group A is formed in a port which is not shown, and, just after the formation of the procession, seven vehicles in total travel as a group.

In the example shown in FIG. 3, because the following vehicles A4, A5, A6, and A7 have the destination different from that of the following vehicles A2 and A3, a driver is in the following vehicle A4 to manually drive it after the separation. Therefore, the processional vehicle group A is separated between the following vehicles A3 and A4, thus forming a processional vehicle group B in which a leading vehicle B1 at the head of the procession leads the following vehicles B2 and B3, and a processional vehicle group C in which a leading vehicle C1 at the head of the procession leads the following vehicles C2, C3, and C4.

In FIG. 4, because the last following vehicle A7 has a destination different from that of the other vehicles A1, A2, A3, A4, A5, and A6, the following vehicle A7 is independently separated from the procession, thus forming a new procession A in which the leading vehicle A1 leads the following vehicles A2, A3, A4, A5, and A6. Here, the leading vehicle A1 may be separated from the procession.

FIGS. 5, 6, and 7 show input/output screens on the display device 8. This display device 8 is normally used as a display for car navigation as mentioned above, and has a function for supporting the processional travel. Specifically, the input/output function for supporting the processional travel will be explained. The function includes an input function for forming a procession outside a port (this function is carried out based on transmission from a control device K in the port see FIG. 2), and another input function for separating a vehicle from the procession as described later.

Figure 5A:
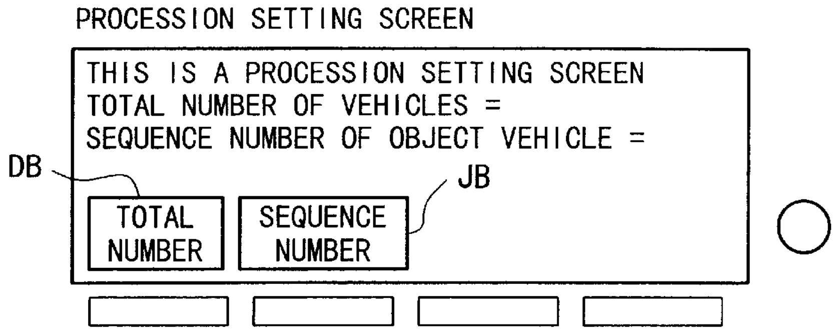
FIGS. 5A to 5D are diagrams for explaining input/output screens on a display device in a leading vehicle of an embodiment of the present invention.

FIGS. 5A to 5D shows a screen on the display device 8 in the leading vehicle A1, and FIG. 5A shows a procession setting screen. As shown in FIG. 5A, the total number of vehicles and the sequence number of the object vehicle can be input by a total number button DB and a vehicle sequence number button JB. In FIG. 5A, the large rectangle corresponds to the outline of the navigation display, and small rectangles under and a small circle next to the navigation display are NAVI (navigation) setting switches. Buttons are displayed on the screen (hereunder the same).

Figure 5B:
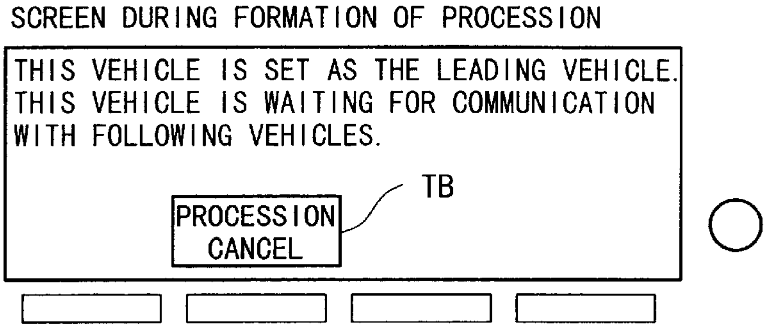
Figure 5C:
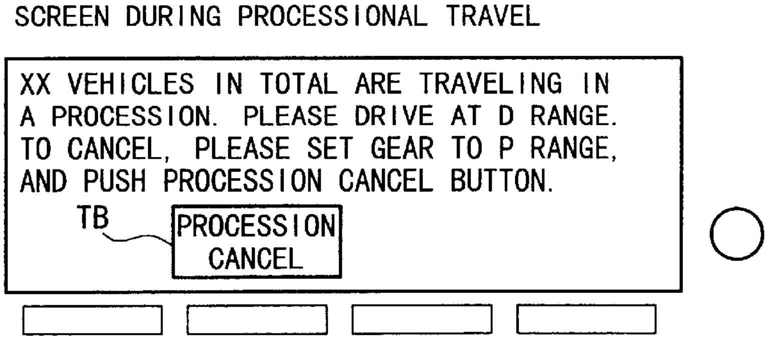

FIG. 5B shows a screen during the formation of the procession. It is indicated that this vehicle is set as the leading vehicle and is waiting for the communication from the following vehicles. A processional cancel button TB is displayed on the screen. FIG. 5C shows a screen during the processional travel. On the display, the number of vehicles in the procession, “the procession is traveling”, “please drive in the D range”, and “to cancel the procession, please stop vehicles, set the gear to the P range, and push the procession cancel button” are displayed. A processional cancel button TB is displayed on the screen.

Figure 5D:
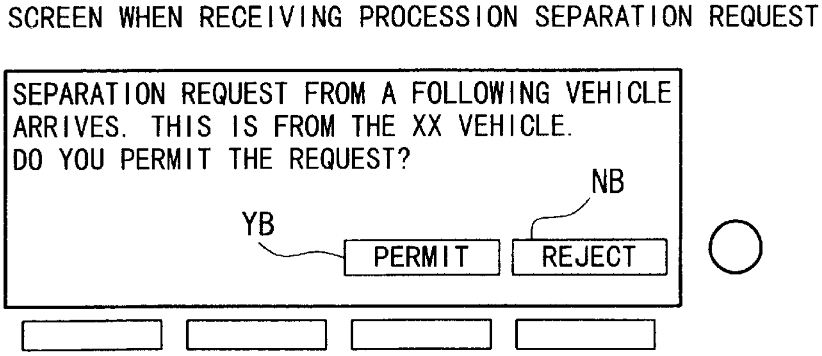

FIG. 5D shows a screen when receiving a request to separate the procession. When receiving the separation request from the following vehicles, a driver may push a request permission button to allow the vehicle requesting the separation to become a leading vehicle, or may wait for the separation of the following vehicle at the end of the procession.

“Separation request is received from following vehicle”, the identification of the vehicle requesting the separation, and “do you permit the separation?” are displayed. On the display, a permission button YB, and a rejection button NB are displayed. In FIG. 5D, when the permission is selected, the total number of vehicles is changed, and the screen returns to FIG. 5C.

Figure 6A:
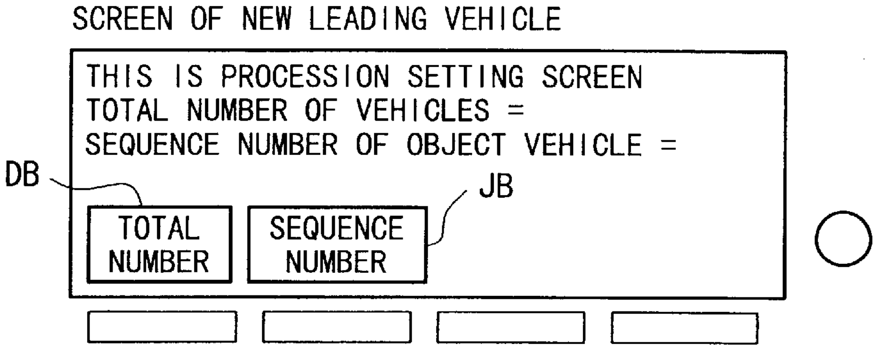
FIGS. 6A to 6C are diagrams for explaining input/output screens on a display device in a following vehicle of the present invention.
Figure 6B:
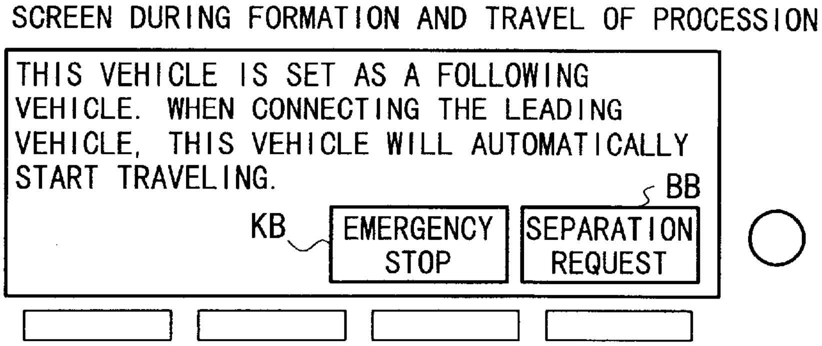

FIGS. 6A to 6C, 7A, and 7B show input/output screens in the following vehicle. FIG. 6A shows a procession setting screen. As shown in this figure, the total number of vehicles and the sequence number of the object vehicle can be input by a total number button DB and an object vehicle sequence number button JB. FIG. 6B shows a screen during the formation and travel of the procession. It is indicated that this vehicle is set as a following vehicle and is waiting for communication from a leading vehicle. On the display, an emergency stop button KB and a separation request button BB are displayed. The separation request button BB is provided to form a separate procession of this vehicle and the vehicles after this vehicle.

Figure 6C:
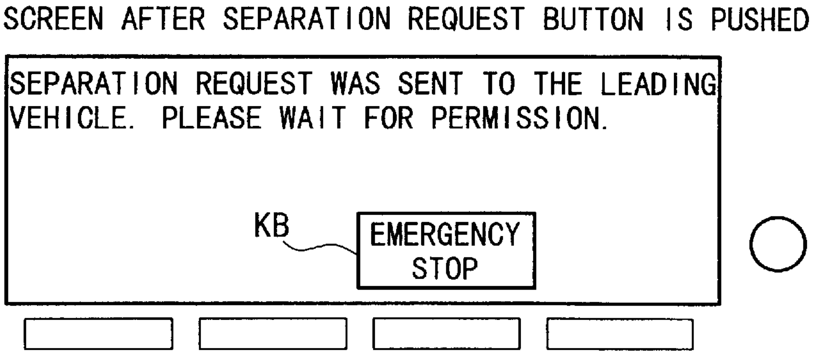

FIG. 6C shows a screen after sending the separation request. It is indicated that the vehicle is waiting for the permission. On the display, an emergency stop button KB is displayed.

Figure 7A:
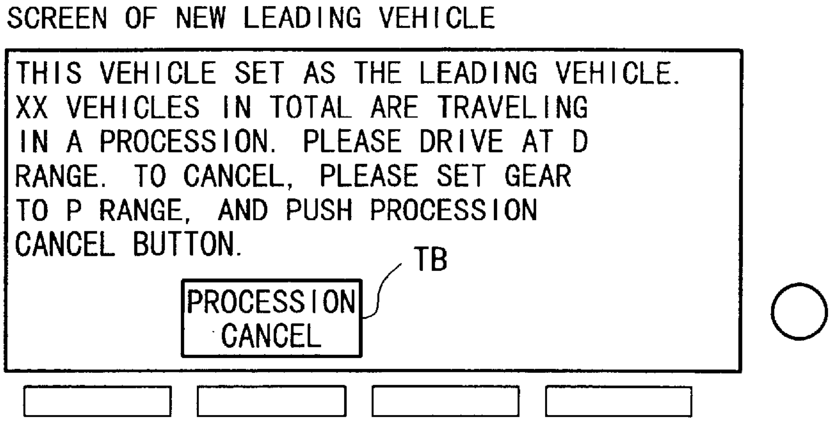
FIGS. 7A and 7B are diagrams for explaining input/output screens on a display device after the separation request of the present invention.

FIG. 7A shows a screen in the following vehicle requesting the separation when the driver in the leading vehicle pushes the permission button YB in FIG. 5D. “This vehicle is set as a leading vehicle”, the number of vehicles in the procession, “the procession is traveling”, “please drive in the D range”, and “to cancel the procession, please set the gear to the P range, and push the procession cancel button” are displayed. On the display, a procession cancellation button TB is displayed.

Figure 7B:
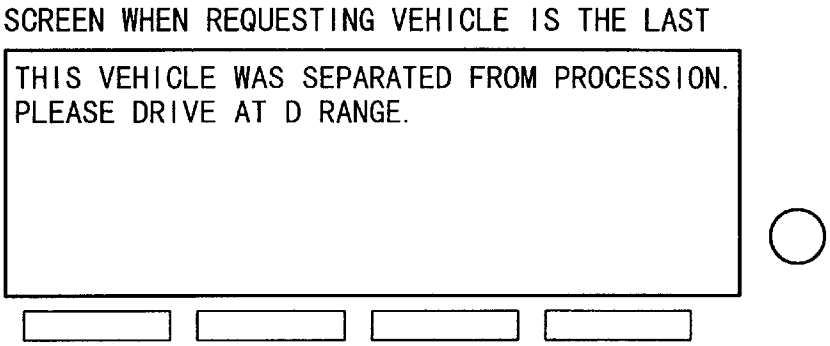

FIG. 7B shows a screen in the following vehicle at the end of the procession when the vehicle sends the separation request in FIG. 6C. “This vehicle is separated from the procession”, and “please drive in the D range” are indicated. When the following vehicle just behind the leading vehicle sends the separation request, the vehicle which was a leading vehicle displays the screen of FIG. 7B.

Figure 8:
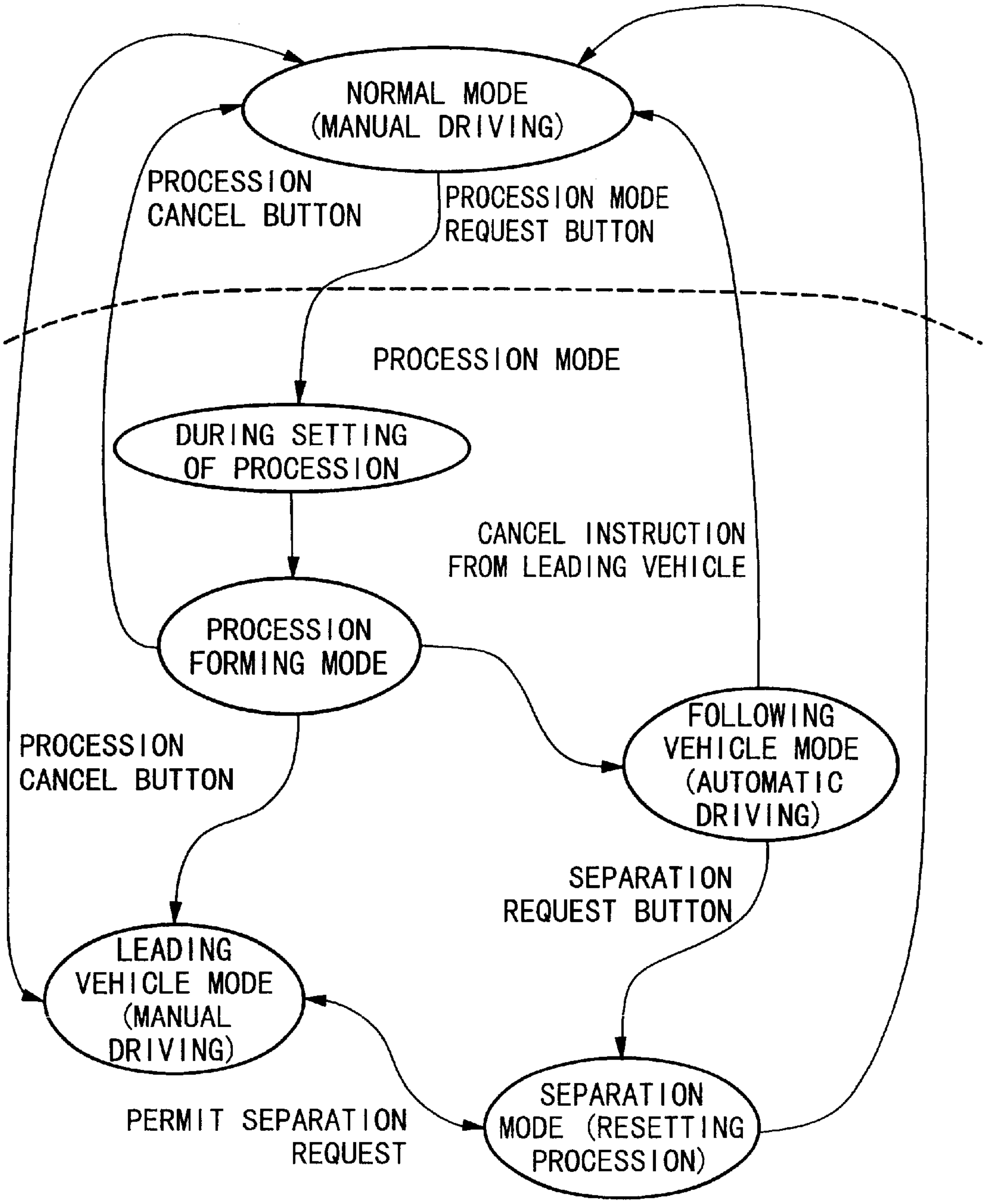
FIG. 8 is a diagram showing a change in control mode of the present invention.

FIG. 8 shows a change in control mode for the processional travel which is roughly divided into normal mode and procession forming mode.

When in normal mode (manual drive mode) a procession mode request button, which is not shown, is pushed, the vehicle changes through setting of a procession to procession forming mode. Procession forming mode can be changed to either leading vehicle mode (manual driving) and following vehicle mode (automatic driving), or the procession may be cancelled by the procession cancellation button TB and the vehicle may change to normal mode. Leading vehicle mode and following vehicle mode can be changed to separation mode (resetting of a procession), and separation mode can be changed to normal mode when the separation of the last following vehicle is permitted. Leading vehicle mode can be changed to normal mode by the procession cancellation button TB.

Figure 9:
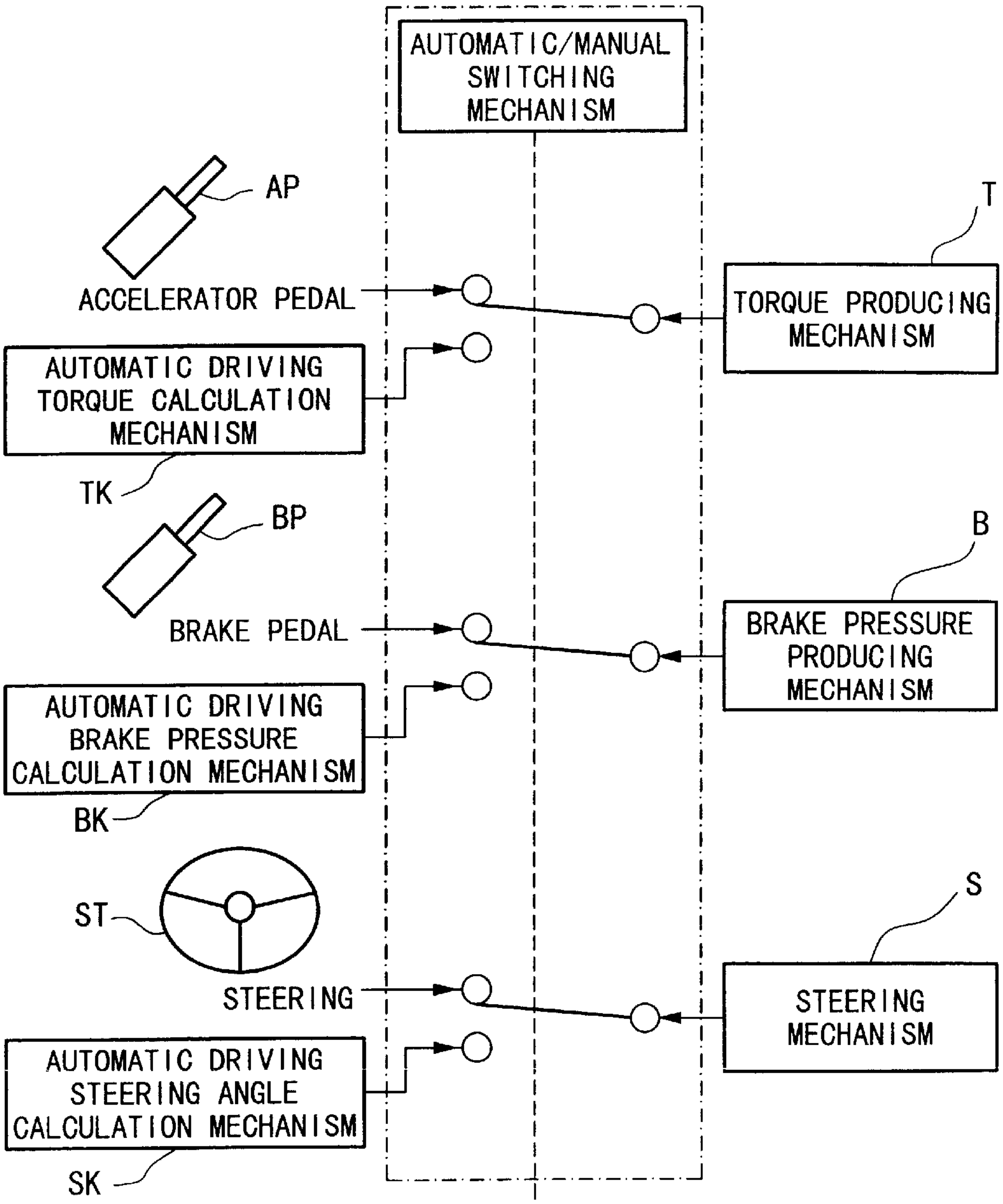
FIG. 9 is a diagram showing a switching mechanism of the present invention.

When normal mode is changed to procession forming mode, the following vehicle is changed from manual driving to automatic driving, and this change is performed by switching a mechanism shown in FIG. 9. FIG. 9 shows an automatic/manual switching mechanism. This switching mechanism can switch three mechanisms, which are a torque producing mechanism T, a brake pressure producing mechanism B, and a steering mechanism S, between automatic/manual operations so that the vehicle can be manually driven as the leading vehicle and is automatically driven as the following vehicle. Here, in FIG. 9, the portion enclosed by the chain lines constitutes a part of the processional travel control apparatus.

The torque producing mechanism T is connected to an accelerator pedal AP when switched to manual, or is connected to an automatic driving torque calculation mechanism TK when switched to automatic. The brake pressure producing mechanism B is connected to a brake pedal BP when switched to manual, or is connected to an automatic driving brake pressure calculation mechanism BK when switched to automatic. The steering mechanism S is connected to a steering device ST when switched to manual, or is connected to an automatic driving steering angle calculation mechanism SK when switched to automatic.

The automatic/manual switching mechanism is used when normal mode (manual driving) is changed to procession setting mode as shown in FIG. 8, when the vehicle is changed from a leading vehicle to a following vehicle or from a following vehicle to a leading vehicle during the processional travel.

The automatic/manual switching mechanism is switched to manual driving when the vehicle acts as a leading vehicle, or is switched to the automatic driving when the vehicle acts as a following vehicle.

Figure 10:
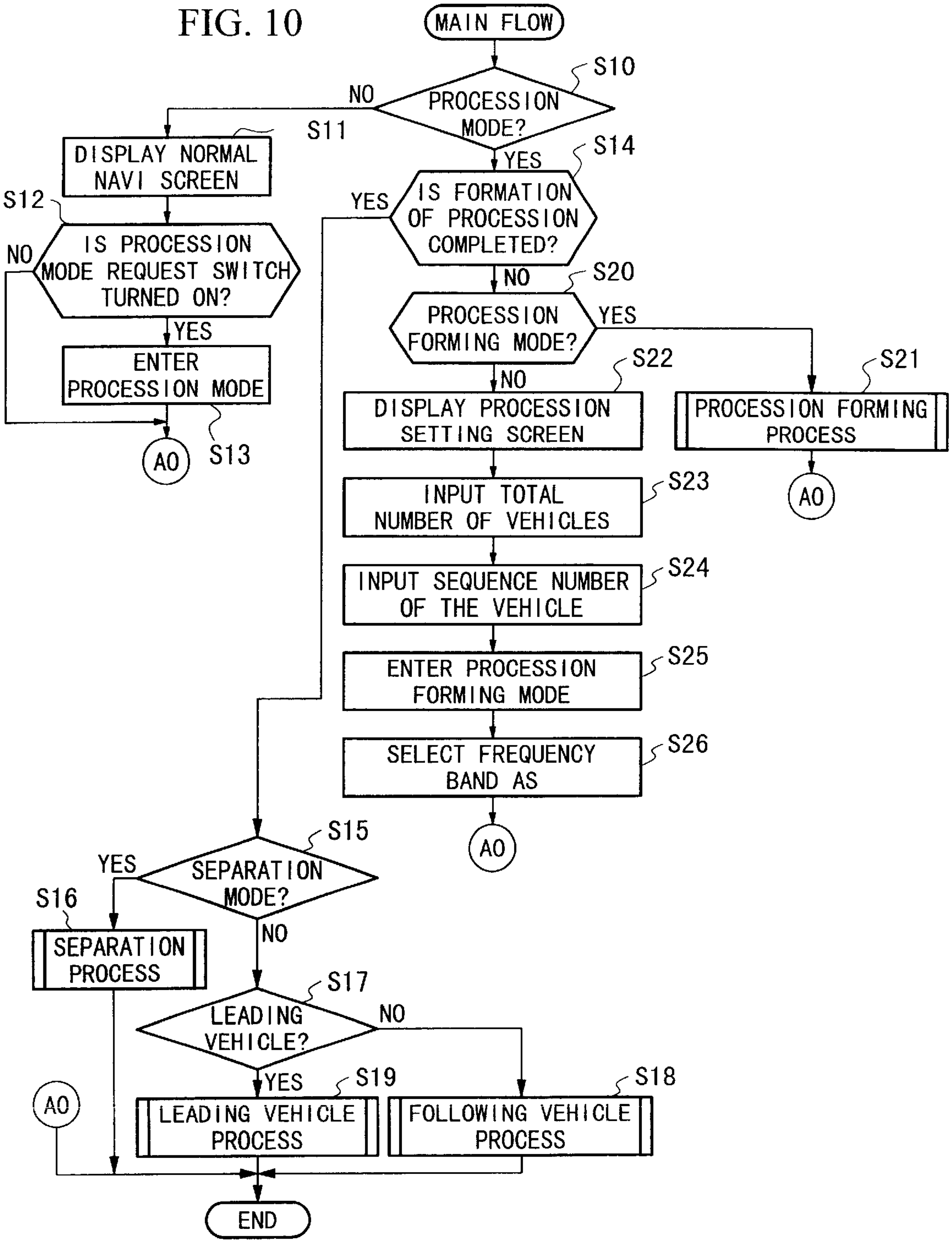
FIG. 10 is a main flowchart showing the control process of the procession of the first embodiment of the present invention.

FIG. 10 is a main flowchart showing the control of the procession of the first embodiment.

In step S10, it is determined whether the vehicle is in procession mode or not. When in step S10 it is not in the procession mode, the flow proceeds to step S11, in which then the display device 8 displays a normal navigation screen, and the flow proceeds to step S12. In step S12, it is determined whether the procession mode request switch is ON. When in step S12 the procession mode request switch is OFF, control terminates. When in step S12 the procession mode request switch is ON, the flow proceeds to step S13, in which the vehicle then enters the procession mode, and control terminates.

When in step S10 the vehicle is in the procession mode, the flow proceeds to step S14, in which then it is determined whether the formation of the procession is completed or not. When the determination is YES, that is, when the formation of the procession is completed, the flow proceeds to step S15, in which then it is determined whether the vehicle is in the separation mode or not. When in step S15 the vehicle is in the separation mode, the separation process is performed in step S16, and control terminates. When in step S15 the vehicle is not in the separation mode, the flow proceeds to step S17. In step S17, it is determined whether the vehicle is a leading vehicle or not, according to the sequence number of the vehicle. When in step S17 the vehicle is a leading vehicle, the flow proceeds to step S19, in which then a leading vehicle process, which will be described later, is performed. When in step S17 the vehicle is not a leading vehicle according to the sequence number of the vehicle, the flow proceeds to step S18, in which a following vehicle process, which will be described later, is then performed.

When in step S14 the formation of the procession is not completed, the flow proceeds to step S20, in which it is then determined whether the vehicle is in procession forming mode or not. When in step S20 the vehicle is in procession forming mode, the flow proceeds to step S21, in which the procession forming process, which will be described later, is then performed. When in step S20 the vehicle is not in procession forming mode, the flow proceeds to step S22, in which the display device 8 then displays the procession setting screen (see FIGS. 5A and 6A), the total number of vehicles is input in step S23 (by the vehicle total number button DB, hereafter the same), and the sequence number of the object vehicle is input in step S24 (by the vehicle sequence number button JB, hereafter the same). Subsequently, the vehicle is changed to procession forming mode in step S25, a frequency AS band, which will be described later, is selected in step S26, and control terminates. This flowchart is started at an interval of 10 msec.

Figure 11:
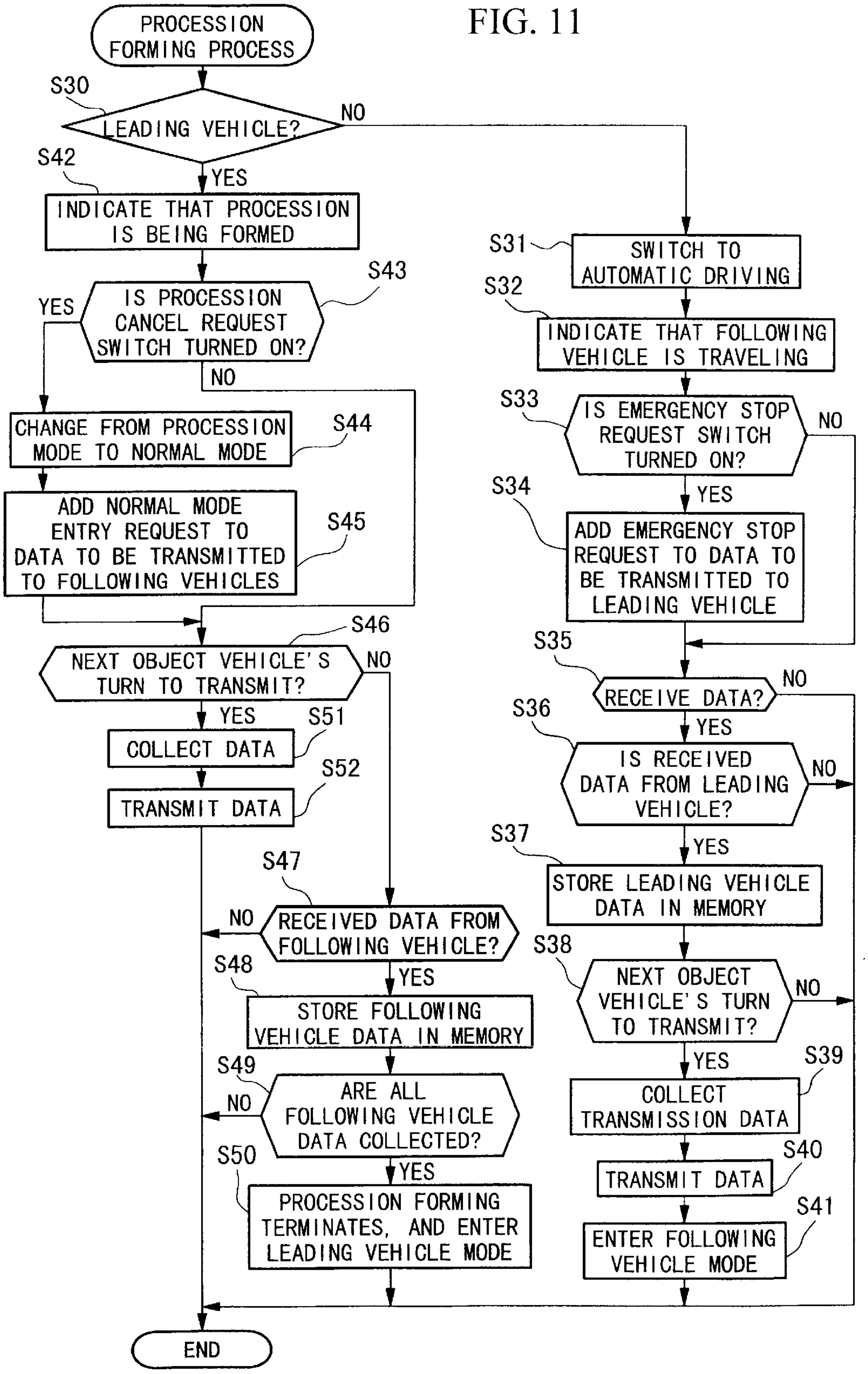
FIG. 11 is a flowchart showing the procession forming process of the first embodiment of the present invention.

The procession forming process in step S21 in FIG. 10 will be explained according to the flowchart of FIG. 11.

In step S30, it is determined whether the vehicle is a leading vehicle according to the sequence number of the vehicle. When in step S30 the vehicle is not a leading vehicle according the sequence number of the vehicle, the flow proceeds to step S31, in which the vehicle is then switched to the automatic driving, and in step S32 the display device 8 indicates that the following vehicle is traveling. Then, in step S33, it is determined whether the emergency stop request switch (corresponding to the emergency stop button KB, hereafter the same) is ON.

When in step S33 the determination is NO, that is, when the emergency stop request switch is OFF, the flow proceeds to step S35. When in step S33 the determination is YES, that is, when the emergency stop request switch is ON, the emergency stop request is added to the data to be transmitted to the leading vehicle in step S34, and the flow proceeds to step S35. In step S35, the presence or absence of received data is determined. When in step S35 there is no received data, that is, when the determination is NO, control terminates. When in step S35 the determination is YES, it is determined whether the received data has been transmitted from the leading vehicle or not.

When in step S36 the received data has not been transmitted from the leading vehicle, control terminates. When in step S36 the received data has been transmitted from the leading vehicle, the data transmitted from the leading vehicle is written in a memory in step S37, and the flow proceeds to step S38. In the next step S38, it is determined whether the next time is the object vehicle's turn to transmit or not. When this determination is NO, control terminates. When this determination is YES, that is, when the next time is the object vehicle's turn to transmit, the transmission data is collected in step S39, the data is transmitted in step S40, the vehicle enters following vehicle mode in step S41, and control terminates.

When in step S30 the determination as to whether the object vehicle is the leading vehicle according to its sequence number is YES, that is, when the object vehicle is the leading vehicle, the display device 8 indicates that the vehicles are forming the procession in step S42, and the flow proceeds to step S43. Then, in step S43, it is determined whether a procession cancel request switch (corresponding to the procession cancellation button TB, hereafter the same) is ON. When in the step S43 the determination is YES, that is, when the procession cancel request switch is ON, the flow proceeds to step S44, in which procession mode is then changed to normal mode, and in step S45 a change request to normal mode is added to the data to be transmitted to the following vehicles. Then, the flow proceeds to step S46.

When in step S43 the determination is NO, that is, when the procession cancel request switch is OFF, the flow proceeds to step S46. In step S46, it is determined whether the next time is the object vehicle's turn to transmit or not. When in step S46 the determination is YES, the transmission data is collected in step S51, the data is transmitted in step S52, and control terminates. When in step S46 the determination is NO, the flow proceeds to step S47, in which it is then determined whether the vehicle has received the data or not from the following vehicle.

When in step S47 the vehicle does not receive the data from the following vehicle, control terminates. When in step S47 the vehicle receives the data from the following vehicle, the data from the following vehicle is stored in the memory in step S48, and it is determined in step S49 whether the data from all the vehicles has been collected.

When in step S49 the data from all the following vehicles has not been collected, control terminates. When in step S49 the data from all the following vehicles are collected, the flow proceeds to step S50, in which the formation of the procession is then completed, the vehicle enters leading vehicle mode, and control terminates.

Figure 12:
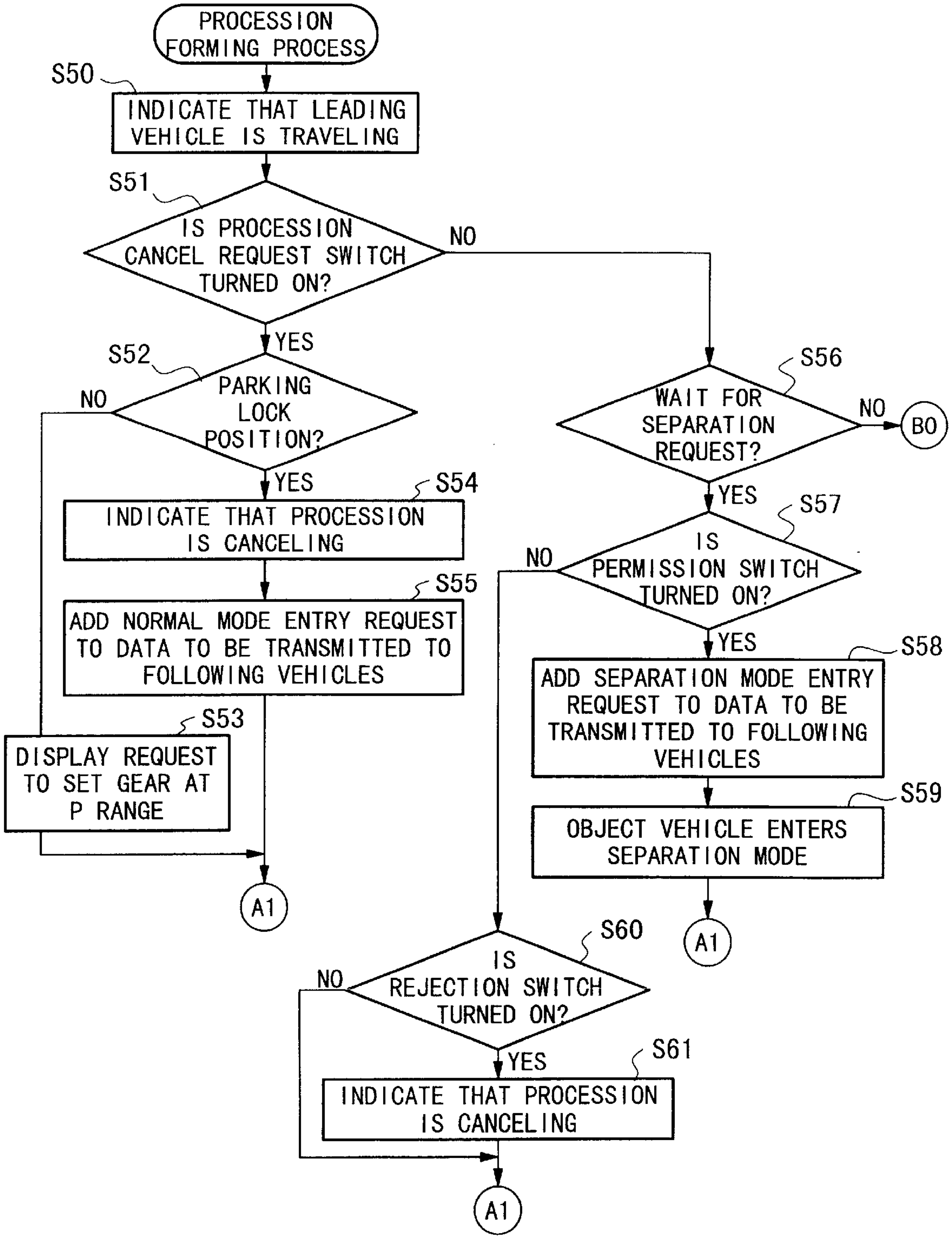
FIG. 12 is a flowchart showing the leading vehicle process of the first embodiment of the present invention.
Figure 13:
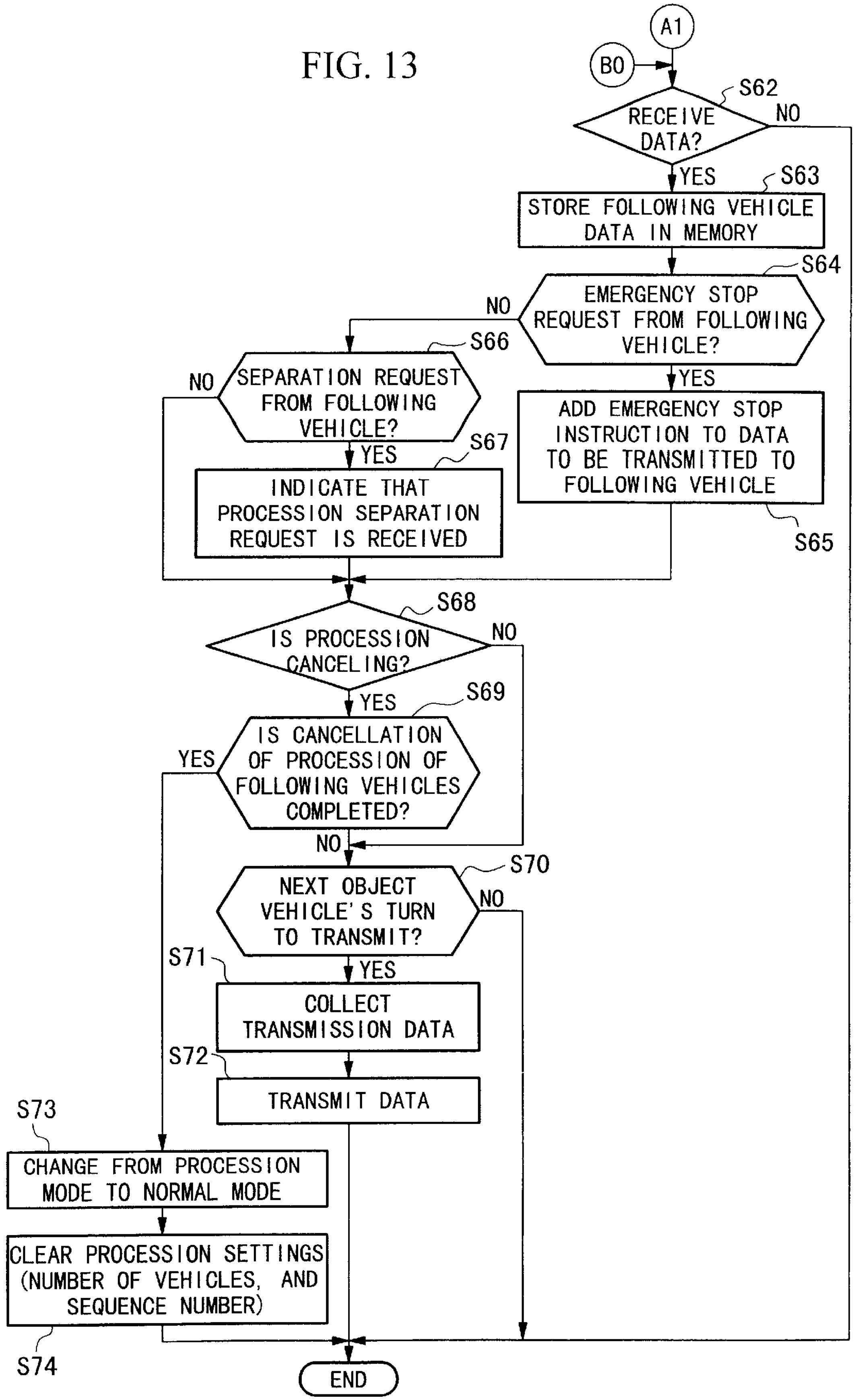
FIG. 13 is a flowchart showing the leading vehicle process of the first embodiment of the present invention.

The leading vehicle process in step S19 in FIG. 10 will be explained with reference to the flowcharts of FIGS. 12 and 13. FIGS. 12 and 13 constitute one flowchart, which is divided into two parts for convenience of illustration.

In step S50, the display device 8 indicates that the leading vehicle is traveling, and the flow proceeds to step S51. In step S51, it is determined whether the procession cancel request switch is ON or not. When in step S51 the determination is NO, that is, when the procession cancel request switch is OFF, the flow proceeds to step S56.

When in step S51 the determination is YES, that is, when the procession cancel request switch is ON, it is determined in the next step S52 whether a gear shifter is at a parking lock position or not. When in step S52 the determination is NO, that is, when the gear shift is not at the parking lock position (parking range), the request to change the gear shift to the P (parking) range is displayed on the display device 8 in step S53, and the flow proceeds to step S62 in FIG. 13. When in step S52 the determination is YES, that is, when the gear shift is at the parking lock position, the display device 8 indicates that the vehicle is canceling the procession in step S54, the request to change to normal mode is added to the data to be transmitted to the following vehicle in step S55, and the flow proceeds to step S62 in FIG. 13.

In step S56, it is determined whether the vehicle is waiting for the request to separate from the procession or not. When in step S56 the vehicle is not waiting for the request to separate from the procession, the flow proceeds to step S62 in FIG. 13. When in step S56 the vehicle is waiting for the request to separate from the procession, it is determined in step S57 whether the switch for permitting the separation of the procession is ON. When in step S57 the determination is YES, the request to change to separation mode is added to the data to be transmitted to the following vehicles in step S58, and the flow proceeds to step S59, in which then the object vehicle enters separation mode.

When in step S57 the determination is NO, it is determined in step S60 whether the switch for rejecting the separation of the procession is ON. When in step S60 the determination is NO, the flow proceeds to step S62 in FIG. 13. When in step S60 the determination is YES, the rejection to the entry to separation mode is added to the data to be transmitted to the following vehicle, and the flow proceeds to step S62.

In step S62 in FIG. 13, it is determined whether there is any received data or not. When this determination is NO, control terminates. When in step S62 the determination is YES, the following vehicle data is stored in step S63, and the flow proceeds to step S64, in which it is then determined whether an emergency stop request was sent from the following vehicle or not.

When in step S64 the determination is YES, the emergency stop request is added to the data to be transmitted to the following vehicles in step S65, and the flow proceeds to step S68. When in step S64 the determination is NO, it is determined whether there is the separation request from the following vehicles or not. When in step S66 the determination is NO, the flow proceeds to step S68.

When in step S66 the determination is YES, in step S67 it is indicated that the procession separation request is received, and the flow proceeds to step S68. In step S68, it is determined whether the procession is canceling or not. When in step S68 the determination is NO, the flow proceeds to step S70. When in step S68 the determination is YES, it is determined in step S69 whether the cancellation of the procession of the following vehicles is completed or not. When in step S69 the determination is NO, the flow proceeds to step S70, in which it is then determined whether the next time is the object vehicle's turn to transmit. When in step S70 the determination is NO, control terminates. When in step S70 the determination is YES, the transmission data is collected in step S71, the data is transmitted in step S72, and control terminates. When in step S69 the determination is YES, procession mode is changed to normal mode in step S73, the procession settings (the total number of vehicles and the sequence number) are cleared in step S74, and control terminates.

Figure 14:
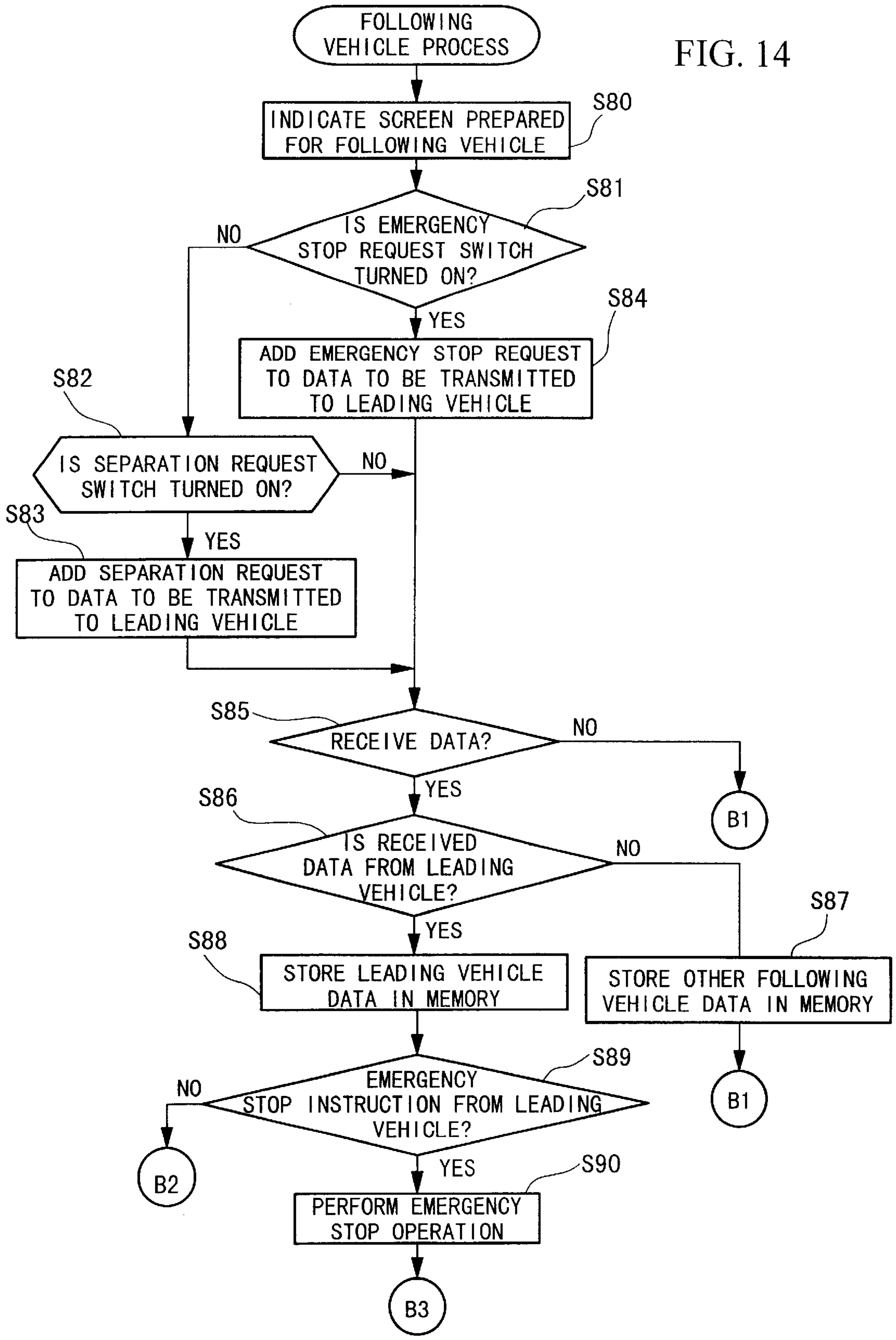
FIG. 14 is a flowchart showing the following vehicle process of the first embodiment of the present invention.
Figure 15:
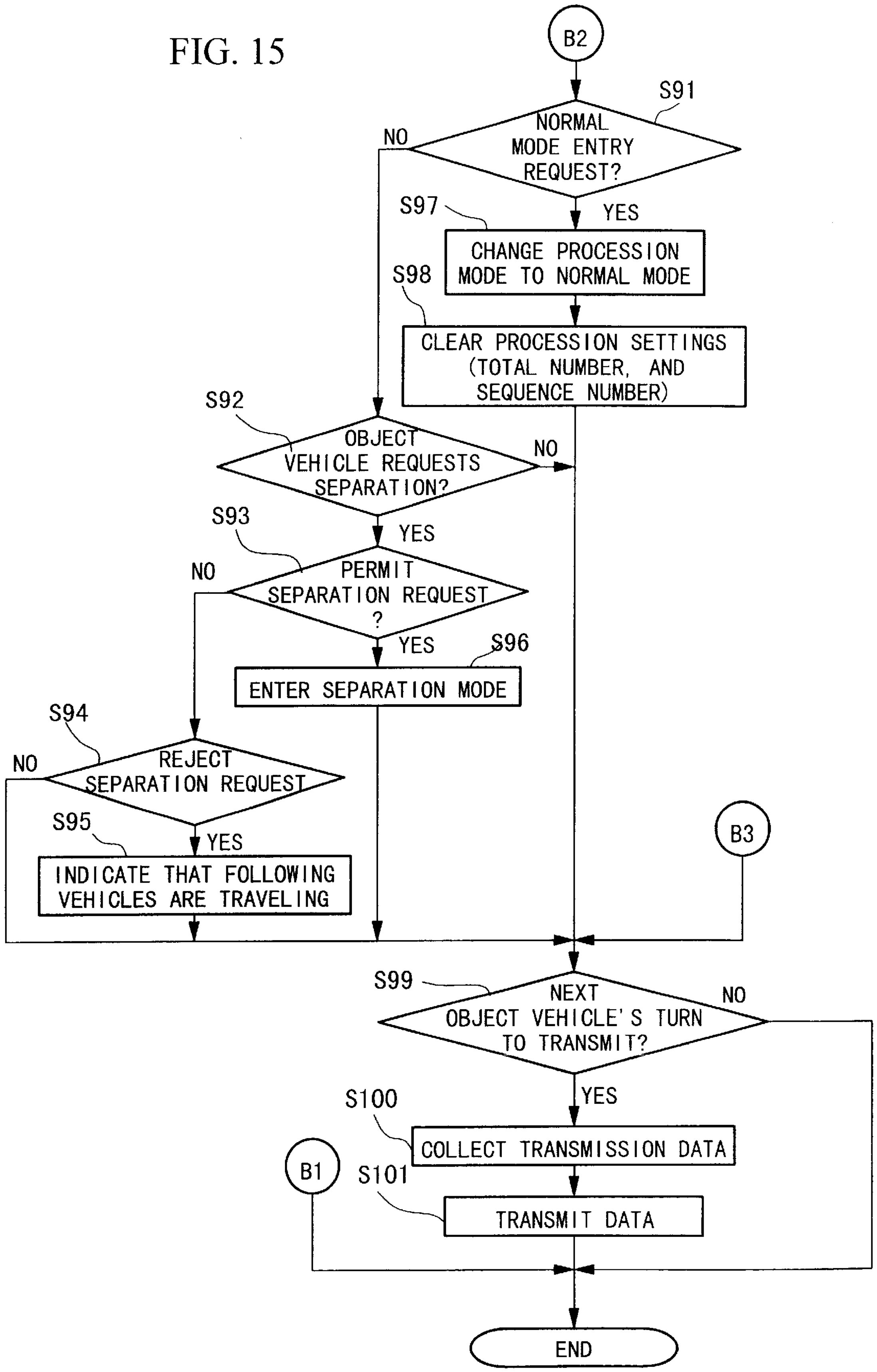
FIG. 15 is a flowchart showing the following vehicle process of the first embodiment of the present invention.

The following vehicle process in step S18 in FIG. 10 will be explained with reference to the flowchart of FIGS. 14 and 15. FIGS. 14 and 15 constitute one flowchart, which is divided into two parts for convenience of illustration.

In step S80, the screen prepared for the following vehicle is displayed, and in step S81 it is determined whether the emergency stop request switch is ON or not. When in step S81 the determination is NO, the flow proceeds to step S82, in which it is then determined whether the separation request switch is ON or not. When in step S82 the determination is NO, the flow proceeds to step S85. When in step S82 the determination is YES, a separation request is added to the data to be transmitted to the leading vehicle in step S83, and the flow proceeds to step S85. When in step S81 the determination is YES, an emergency stop request is added to the data to be transmitted to the leading vehicle in step S84, and the flow proceeds to step S85.

In step S85, it is determined whether there is any received data or not. When in step S85 the determination is NO, control terminates. When in step S85 the determination is YES, it is determined in step S86 whether the received data is from the leading vehicle or not. When in step S86 the determination is NO, the data from the other following vehicle is stored in the memory in step S87, and control terminates. When in step S86 the determination is YES, the data from the leading vehicle is stored in the memory in step S88, and the flow proceeds to step S89. In step S89, it is determined whether there is the emergency stop request from the leading vehicle or not. When in step S89 the determination is YES, the emergency stop operation is executed in step S90, and the flow proceeds to step S99 in FIG. 15. When in step S89 the determination is NO, the flow proceeds to step S91 in FIG. 15.

In step S91 in FIG. 15, it is determined whether there is a request to change to normal mode or not. When in step S91 the determination is NO, the flow proceeds to step S92, in which it is then determined whether the object vehicle produced the separation request or not. When in step S91 the determination is YES, procession mode is changed to normal mode in step S97, the procession settings (the total number of vehicles and the sequence number) are cleared in step S98, and the flow proceeds to step S99.

When in step S92 the determination is NO, the flow proceeds to step S99. When in step S92 the determination is YES, the flow proceeds to step S93, in which it is then determined whether the separation request is permitted or not. When in step S93 the determination is YES, the vehicle changes to separation mode in step S96, and the flow proceeds to step S99. When in step S93 the determination is NO, it is determined in step S94 whether the separation is rejected or not. When in step S94 the determination is NO, the flow proceeds to step S99. When in step S94 the determination is YES, the following vehicle screen is displayed in step S95, and the flow proceeds to step S99.

In step S99, it is determined whether the next time is the object vehicle's turn to transmit. When in step S99 the determination is NO, control terminates. When in step S99 the determination is YES, the transmission data is collected in step S100, and the data is transmitted in step S101, and control terminates.

Figure 16:
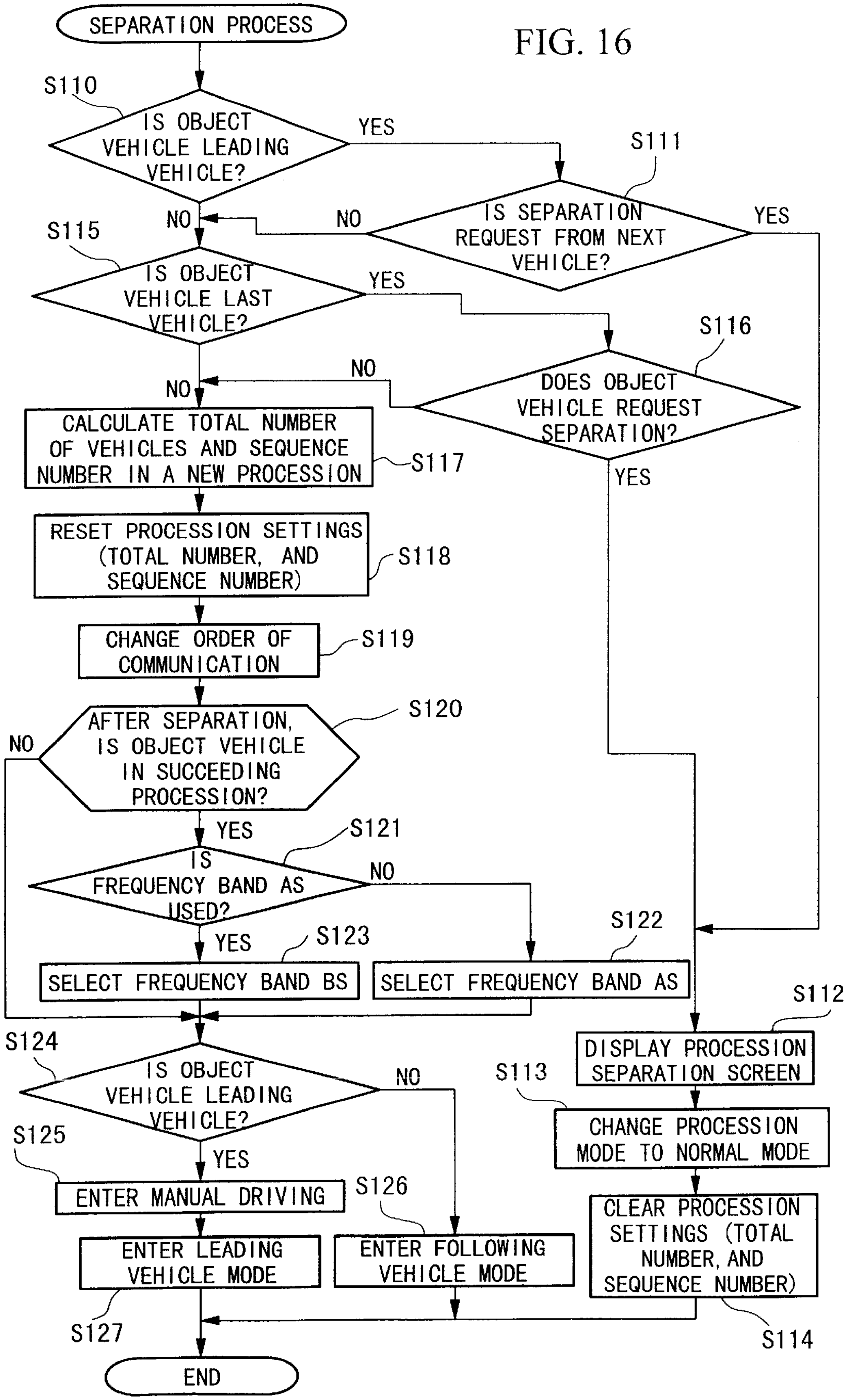
FIG. 16 is a flowchart showing the separation process of the first embodiment of the present invention.

The separation process in step S16 in FIG. 10 will be explained with reference to the flowchart of FIG. 16.

In step S110, it is determined whether the object vehicle is a leading vehicle or not. When this determination is YES, the flow proceeds to step S111, in which it is then determined whether the separation request comes from the next vehicle or not. When in step S111 the determination is YES, the flow proceeds to step S112, in which then the procession separation screen is displayed on the display, procession mode is changed to normal mode in step S113, the procession settings (the total number of vehicles and the sequence number) are cleared in step S114, and control terminates. Thus, the previous leading vehicle A1 in FIG. 2 is separated.

When in step S111 the determination is NO, the flow proceeds to step S115. In step S115, it is determined whether the object vehicle is the last following vehicle in the procession or not. When this determination is YES, the flow proceeds to step S116, in which it is then determined whether the object vehicle requested the separation or not. When in step S116 the determination is YES, the flow proceeds to step S112. Thus, the last following vehicle A5 in FIG. 2 is separated. When in step S116 the determination is NO, the flow proceeds to step S117. Thereafter, the procedure for separating the vehicles into two processions is carried out.

In step S117, the total number of vehicles and the sequence numbers are calculated, and in step S118 the procession settings (the total number of vehicles and the sequence numbers) are reset. In step S119, the order of the communication is changed, and the flow proceeds to step S120. In step S120, it is determined whether the object vehicle belongs to the vehicle group in the rear after the separation or not. When in step S120 the determination is NO, the flow proceeds to step S124. When in step S120 the determination is YES, the flow proceeds to step S121, in which it is then determined whether the frequency band AS is used or not. When in step S121 the determination is YES, the frequency band BS is selected as the frequency used in the vehicle-to-vehicle communication. When in step S121 the determination is NO, the frequency band AS is selected in step S122.

When the frequency bands for the vehicle-to-vehicle communication are selected by the front vehicle group in step S122 and by the rear vehicle group in step S121, the flow proceeds to step S124, in which it is then determined whether the object vehicle is the leading vehicle or not. When in step S124 the determination is NO, the object vehicle enters the following vehicle mode in step S126, and control terminates. When in step S124 the determination is YES, the flow proceeds to step S125, in which the vehicle starts manual driving, the vehicle enters leading vehicle mode in step S127, and control terminates.

The apparatus for changing the frequency for the vehicle-to-vehicle communication will be explained with reference to FIG. 17. As described above, when there is only one vehicle group, the frequency for the vehicle-to-vehicle communication may be single. Once the procession is separated, the frequencies for the vehicle-to-vehicle communication must be different to prevent radio interference between each other.

Specifically, the band of 2.484 MHz (the bandwidth: 2.471–2.497 MHz), which is the frequency band applicable to a radio LAN for mobile bodies, is divided into an AS band whose range is 2.471–2.484 MHz and a BS band whose range is 2.484–2.497 MHz. Thus, these two frequency bands are allocated to the respective separated vehicle groups, thereby preventing radio interference between the groups.

Figure 17A:
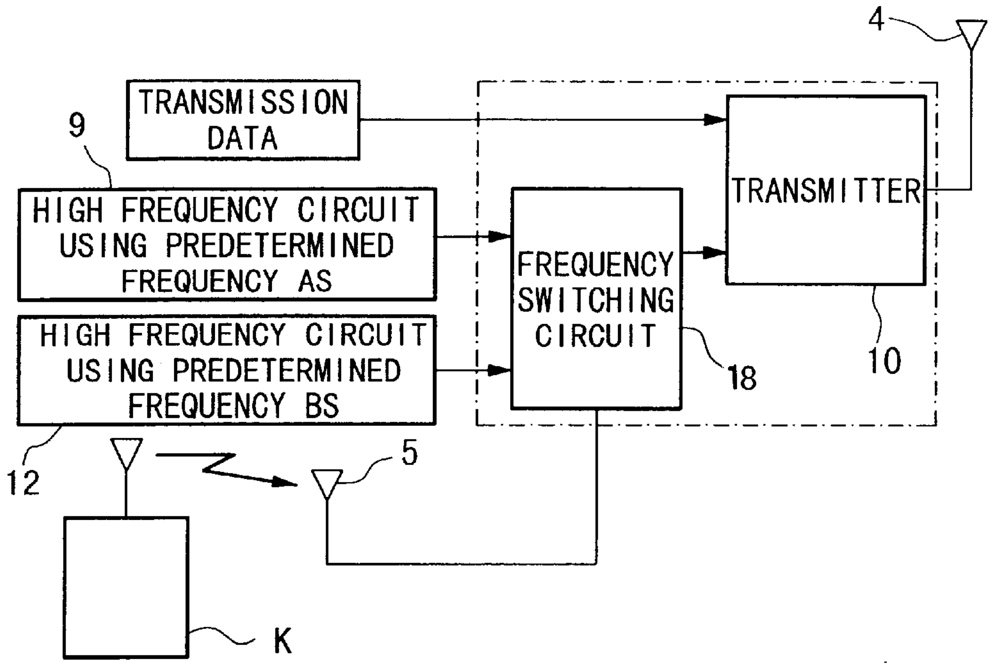
FIGS. 17A and 17B are block diagrams showing vehicle-to-vehicle communication device using multi-channel communication of the first embodiment of the present invention.
Figure 17B:
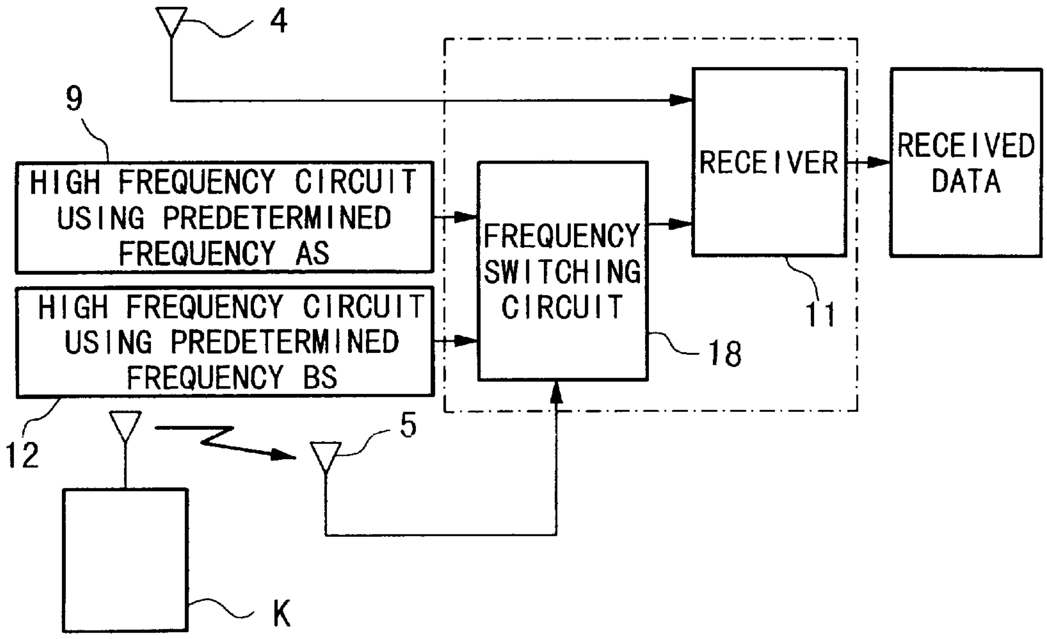

FIGS. 17A and 17B are diagrams for explaining the construction of the communication device using multi-channel communication (for switching a frequency). FIG. 17A shows a transmitter for vehicle-to-vehicle communication. FIG. 17B shows a receiver for vehicle-to-vehicle communication. In FIG. 17A, an instruction from the control device K is input through the road-to-vehicle antenna 5 to a frequency switching circuit 18, by which one of a high frequency circuit 9 using the predetermined frequency band AS and another high frequency circuit 12 using the predetermined frequency band BS. Thus, the transmission data can be transmitted from the vehicle-to-vehicle antenna 4 by the communication device 10 using a radio frequency in the band AS or BS. In FIGS. 17A and 17B, a portion enclosed by the chain lines (the frequency switching circuit 18, and the transmitter 10 in FIG. 17A, and the frequency switching circuit 18 and the receiver 11 in FIG. 17B) constitute a part of the processional travel control apparatus.

As shown in FIG. 17B, the transmitted data is received by the receiver 11 of the other vehicle 1 in the objective vehicle group via the vehicle-to-vehicle antenna 4. Because, in a manner similar to the transmitter according to the instruction from the control device K, the frequency switching circuit 18 can select one of the high frequency circuit 9 using the frequency band AS, and the high frequency circuit 12 using the frequency band BS, the data is reliably received by the receiver 11.

Thus, when the procession is separated, one of two processions uses the frequency in the band AS for the vehicle-to-vehicle communication, and the other uses the frequency in the band BS, and thereby radio interference between two groups can be prevented.

Figure 18:
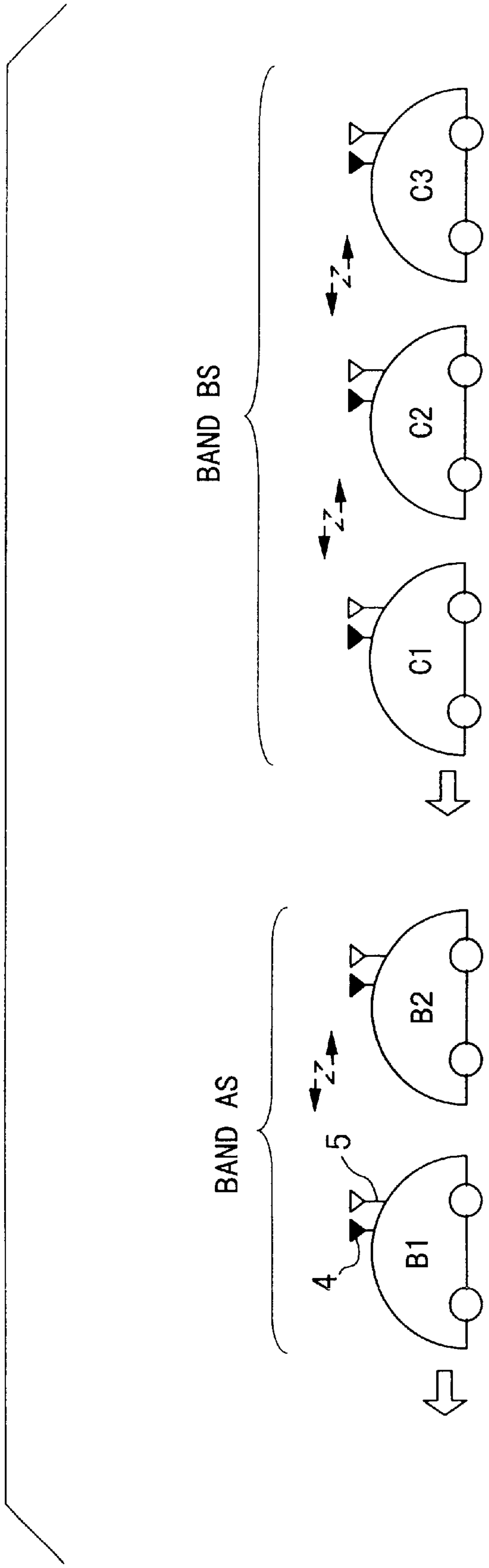
FIG. 18 is a diagram showing the communication status after the separation of the procession of the first embodiment of the present invention.

The communication procedure when the procession is separated will be explained with reference to FIG. 18. In order to simplify the explanation, the description is made by way of the case in which five vehicles forming a procession are separated into respective processions with two vehicles and three vehicles. The front procession includes a leading vehicle B1 and a following vehicle B2. The rear procession includes a leading vehicle C1, and following vehicles C2 and C3. Specifically, in FIG. 2, the following vehicle A3 requests the separation, and the leading vehicle A1 permits the separation. In the following, numbers in the round brackets continue from the explanation of FIG. 2.

(6) The leading vehicle A1 transmits. In the transmitted data, it is specified that the following vehicle A2 has the next transmission right. The separation mode entry request is added to the transmitted data. The data transmitted from the leading vehicle A1 is received by all the vehicles 1 which are the following vehicles A2 to A5.

At the same time, the leading vehicle A1 is changed to the leading vehicle B1, the following vehicle A2 is changed to the following vehicle B2, the following vehicle A3 is changed to the leading vehicle C1, the following vehicle A4 is changed to the following vehicle C2, and the following vehicle A5 is changed to the following vehicle C3. At that time, the procession of the leading vehicle C1 and the following vehicles C2 and C3 changes the communication channel for the vehicle-to-vehicle communication to the band BS.

(7) Next, the following vehicle B2, which has the next transmission right, transmits. In the transmitted data, it is specified that the leading vehicle B1 has the next transmission right. Simultaneously, the leading vehicle C1 transmits, and in the transmitted data, it is specified that the next time is the following vehicle C2's turn to transmit. During this communication, radio interference can be prevented as described above.

(8) The leading vehicle B1 transmits again. In the transmitted data, it is specified that the following vehicle B2 has the next transmission right. On the other hand, the following vehicle C2, which has the transmission right, transmits, and in the transmitted data, it is specified that the leading vehicle C1 has the next transmission right.

(9) The following vehicle B2, which has the transmission right, again. In the transmitted data, it is specified that the leading vehicle B1 has the next transmission right. On the other hand, the leading vehicle C1 transmits, and in the transmitted data, it is specified that the following vehicle C3 has the next transmission right.

(10) Subsequently, the vehicle-to-vehicle communication in two-vehicle group is repeated.

According to the embodiment, when the procession of the vehicles 1 is separated during their processional travel, the transmitter 10 and the receiver 11 request the separation of the procession, and the leading vehicle A1 receives the request and sends a permission signal. As the result, the vehicle which has requested the separation is changed from following travel to normal travel, and can be separated from the procession. Thus, even when the vehicles have different destinations, they can form a procession, thereby increasing the flexibility in formation of the procession. Further, even only the last following vehicle A5 or the leading vehicle A1 can be separated from the procession, thereby increasing the flexibility in separation from the procession, and decreasing a limitation when forming the procession.

When a plurality of vehicles 1 are separated from the procession, these separated vehicles 1 and the vehicles 1 which remain in the procession use the different frequencies which are used for the transmitters 10 and the receivers 11, thus preventing radio interference in the vehicle-to-vehicle communication.

This invention is not limited to the first embodiment described above. Although in the first embodiment radio interference is prevented between the separated vehicle groups by switching the frequency of the communication devices, an identification code may be added to the communication data to prevent radio interference, or other modifications are possible,

Second Embodiment

In the second embodiment, the vehicle has the same construction as the vehicle in the first embodiment, and therefore the detail description thereof is omitted.

Figure 19:
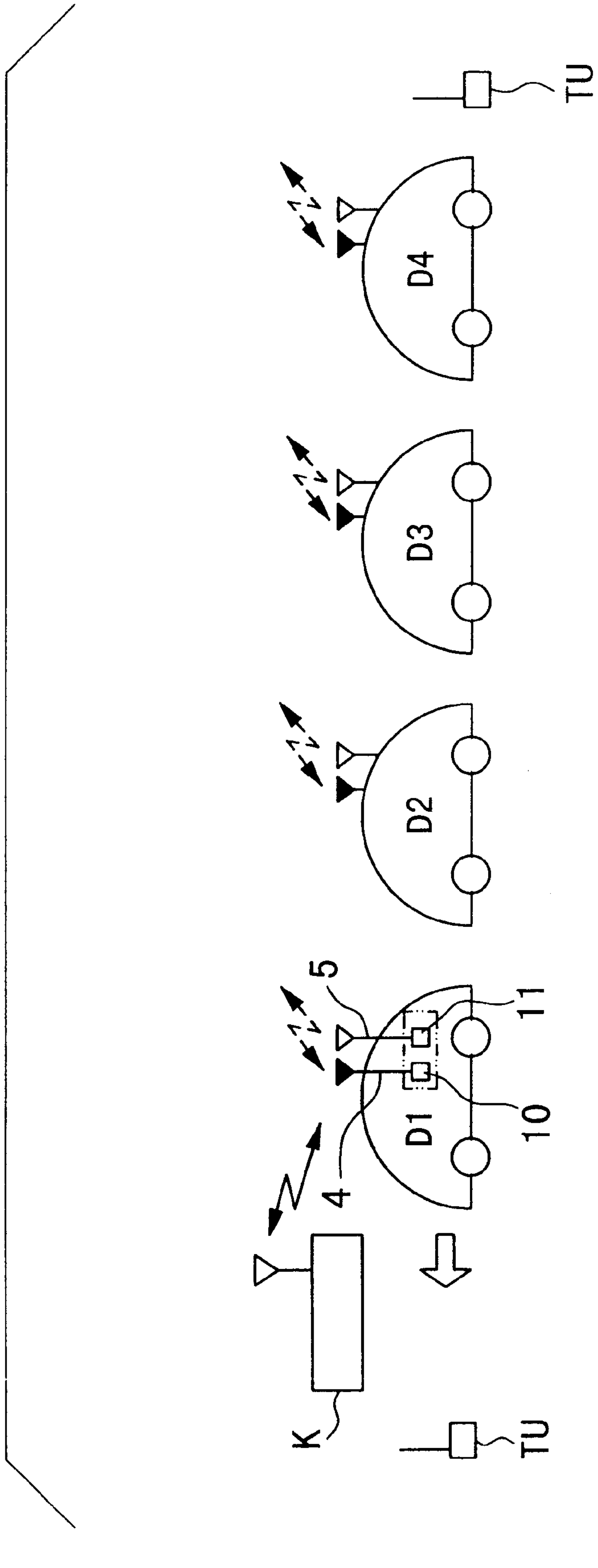
FIG. 19 is a diagram for explaining a processional travel of the second embodiment of the present invention.

FIG. 19 shows the vehicles traveling in a procession. A plurality of electric vehicles travels in a procession by merging vehicle-to-vehicle communication information such as vehicle speed, steering angle, and vehicle position coordinates of the preceding vehicles, obtained from the vehicle-to-vehicle communication using the radio LAN as mentioned above, with information obtained from the laser radar 2 and the reflector 3, and by tracing the tracks of the preceding or leading vehicle, based on the merged information.

In FIG. 19, in the procession DG, following vehicles D2, D3, and D4, which are automatically driven, follow a leading vehicle D1 which is manually driven at the head. The leading vehicle D1, and the following vehicles D2, D3, and D4 have the same specification (the same structure).

Next is a description of the communication procedure in the vehicle-to-vehicle communication in the processional travel. When the setting for forming the procession has finished and each vehicle has recognized the total number of vehicles and its sequence number (which is described later), the transmission and reception are started.

(1) The leading vehicle D1 transmits (broadcasts), and in the transmitted data, it is specified that the following vehicle D2 has the next transmission right. Here, the transmitted data from the leading vehicle D1 is received by all of the following vehicles D2 to D4.

(2) Next, the following vehicle D2 transmits, and in the transmitted data, it is specified that the leading vehicle D1 has the next transmission right. Similarly, the transmitted data from the following vehicle D2 is received by the leading vehicle D1 and all of the following vehicles D3 to D4.

(3) Next, the leading vehicle D1 transmits again, and in the transmitted data, it is specified that the following vehicle D3 has the next transmission right.

(4) Next, the following vehicle D3 transmits, and in the transmitted data, it is specified that the leading vehicle D1 has the next transmission right. Similarly, the transmitted data from the following vehicle D3 is received by the leading vehicle D1 and the following vehicles D2, and D4.

(5) After the following vehicle D4 transmits, the procedure returns to the leading vehicle D1, and then the above procedure is then repeated.

While in the embodiment there are four vehicles in the procession, the number of vehicles is not limited to this.

Figure 20:
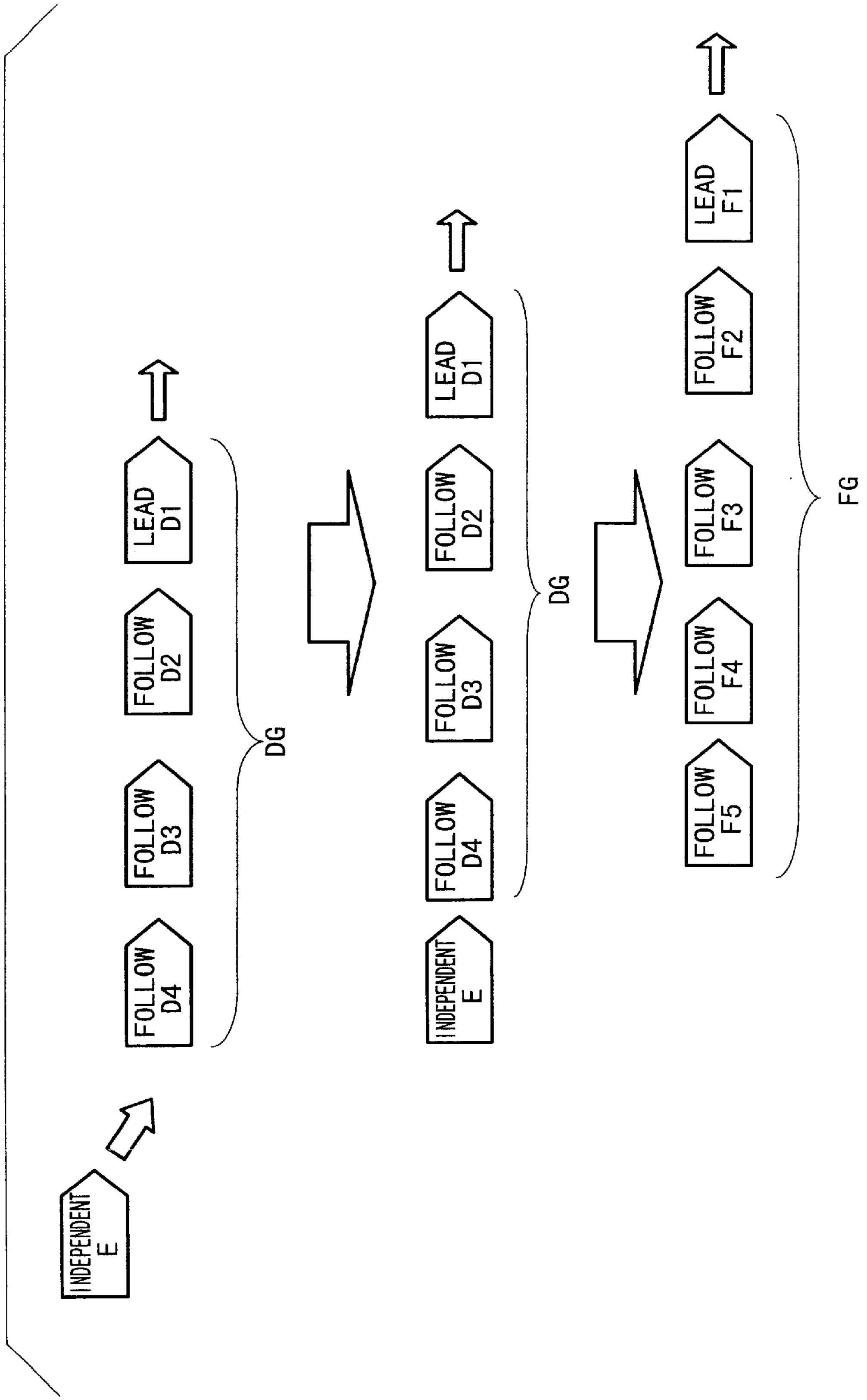
FIG. 20 is a diagram for explaining a manner of incorporating the procession of the second embodiment of the present invention.

When the above-described procession is traveling, an independent vehicle may wish to join the procession. That is, when this vehicle has the same destination as the procession, the labor of the driver can be decreased by joining the vehicle to the procession. FIG. 20 shows the incorporation of the independent vehicle into the procession. The independent vehicle is approaching the procession, and when a procession incorporation request is permitted, the vehicle starts to follow the end of the procession.

Specifically, when the procession is formed at the beginning, the processional vehicle group DG includes in total four vehicles of the leading vehicle D1 and the following vehicles D2, D3, and D4. When the independent vehicle E follows the end of the procession and becomes the following vehicle, the procession FG includes in total five vehicles of the leading vehicle F1 and the following vehicle F2, F3, F4, and D5 (which was the independent vehicle E).

FIGS. 21 and 22 show input/output screens on the display device 8. This display device 8 is normally used as a display for car navigation as mentioned above, and has a function for supporting the processional travel. Specifically, the input/output function for supporting the processional travel will be explained. The function includes an input function for forming a procession outside a port (this function is carried out based on transmission from the control device K in the port), and another input function for joining and incorporating a vehicle to the procession as described later.

Figure 21A:
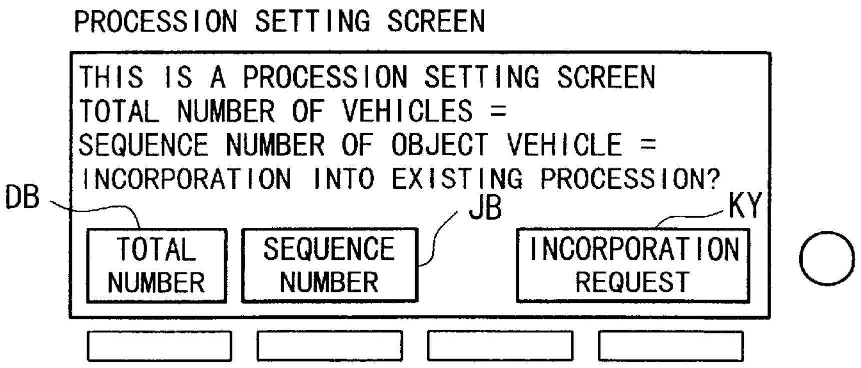
FIGS. 21A to 21D are diagrams for explaining input/output screens on a display device in a leading vehicle of the second embodiment of the present invention.

FIGS. 21A to 21D show a screen on the display device 8 in the leading vehicle D1, and FIG. 21A shows a procession setting screen. As shown in FIG. 21A, the total number of vehicles and the sequence number of the object vehicle can be input by a total number button DB and a vehicle sequence number button JB. An incorporation request button KY is also provided because the leading vehicle D1 has a function for manual driving in a manner similar to the independent vehicle. In FIG. 21A, the large rectangle corresponds to the outline of the navigation display, and small rectangles under and a small circle next to the navigation display are NAVI (navigation) setting switches. Buttons are displayed on the screen (hereunder the same).

Figure 21B:
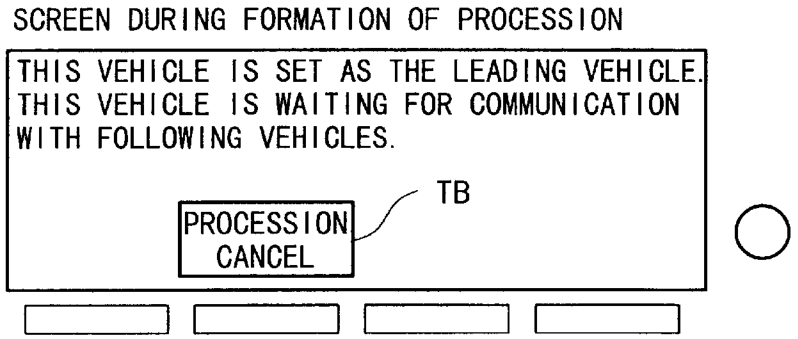
Figure 21C:
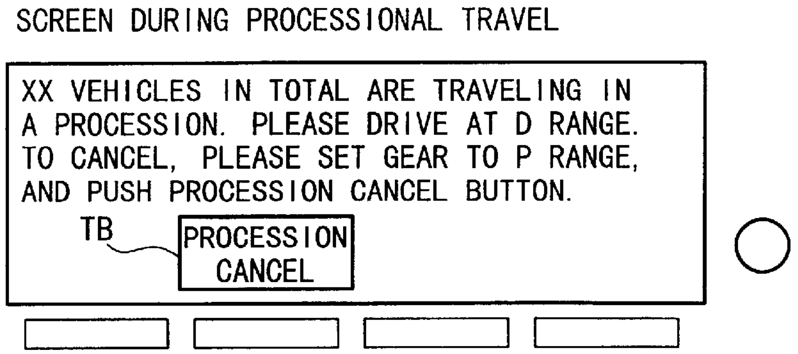

FIG. 21B shows a screen during the formation of the procession. It is indicated that this vehicle is set as the leading vehicle and is waiting for the communication from the following vehicles. A procession cancel button TB is displayed on the screen. FIG. 21C shows a screen during the processional travel. On the display, the number of vehicles in the procession, "the procession is traveling", "please drive in the D range", and "to cancel the procession, please stop vehicles, set the gear to the P range, and push the procession cancel button TB" are displayed.

Figure 21D:
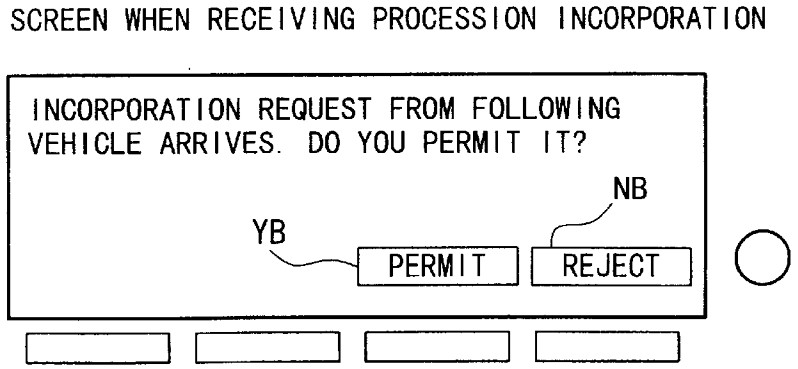

FIG. 21D shows a screen when receiving a procession incorporation request. When the incorporation request is sent from the independent vehicle and it starts to follow the end of the procession, a request permission button is pushed, and the vehicle waits for the change of the request vehicle to the following vehicle.

It is indicated that the incorporation request from the following vehicle is received, and is asked if the request is permitted. On the display, a permission button YB and a rejection button NB are displayed. When in FIG. 21D permission is selected, the total number of vehicles is changed, and a screen shown in FIG. 21C is displayed.

Figure 22A:
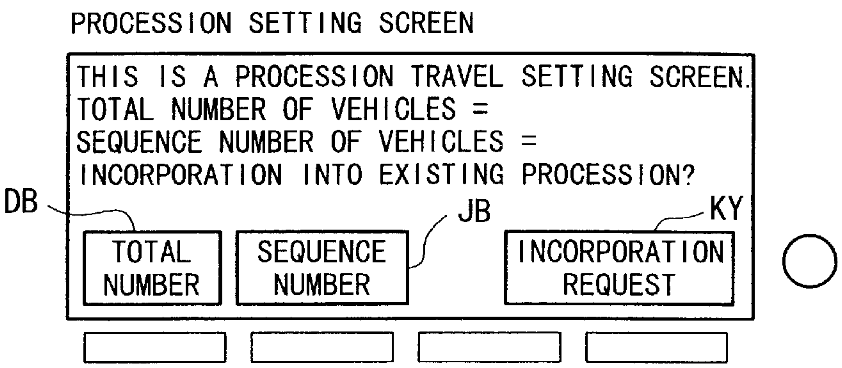
FIGS. 22A to 22D are diagrams for explaining input/output screens on a display device in an independent vehicle of the second embodiment of the present invention.
Figure 22B:
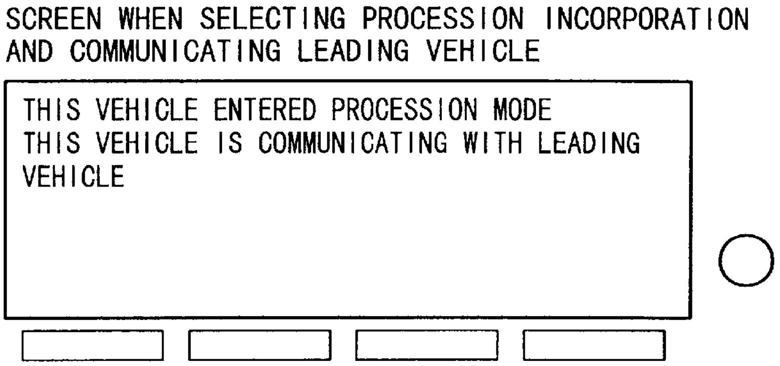
Figure 22C:
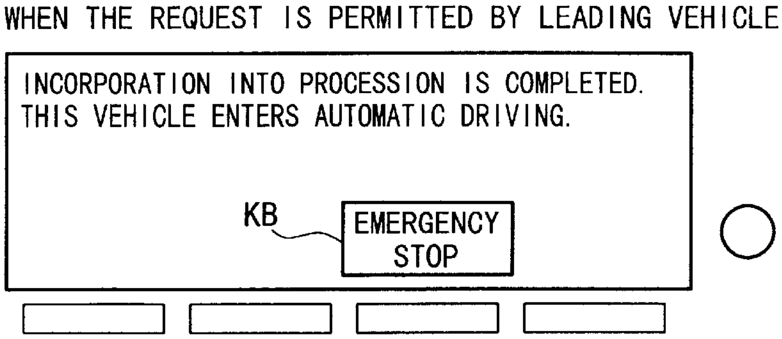
Figure 22D:
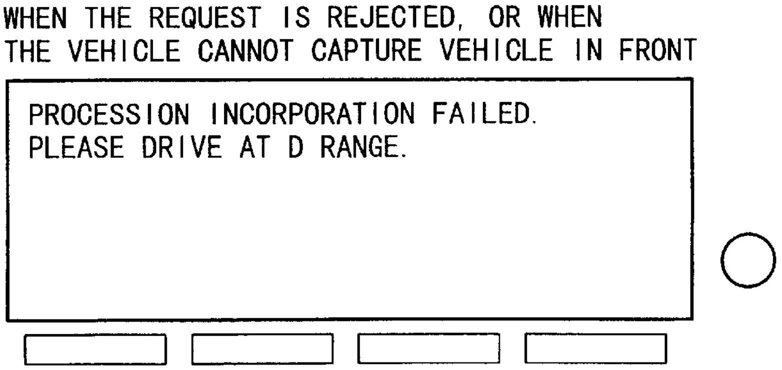

FIGS. 22A to 22D show screens on the display device 8 in the independent vehicle E. As shown in FIG. 22A, the total number of vehicles and the sequence number of the object vehicle can be input by a total number button DB and a vehicle sequence number button JB. An incorporation request button KY can confirm the intention to incorporate the vehicle into the procession. FIG. 22B shows a screen after the selection of the incorporation into the procession and during the communication with the leading vehicle. FIG. 22C shows a screen when the request is permitted by the leading vehicle. It is indicated that the incorporation into the procession is completed, and that the vehicle changes to the automatic driving. On the display, an emergency stop button KB is displayed. FIG. 22D shows a screen when the leading vehicle rejected the request to join, or when the independent vehicle cannot detect the vehicle in front.

Figure 23:
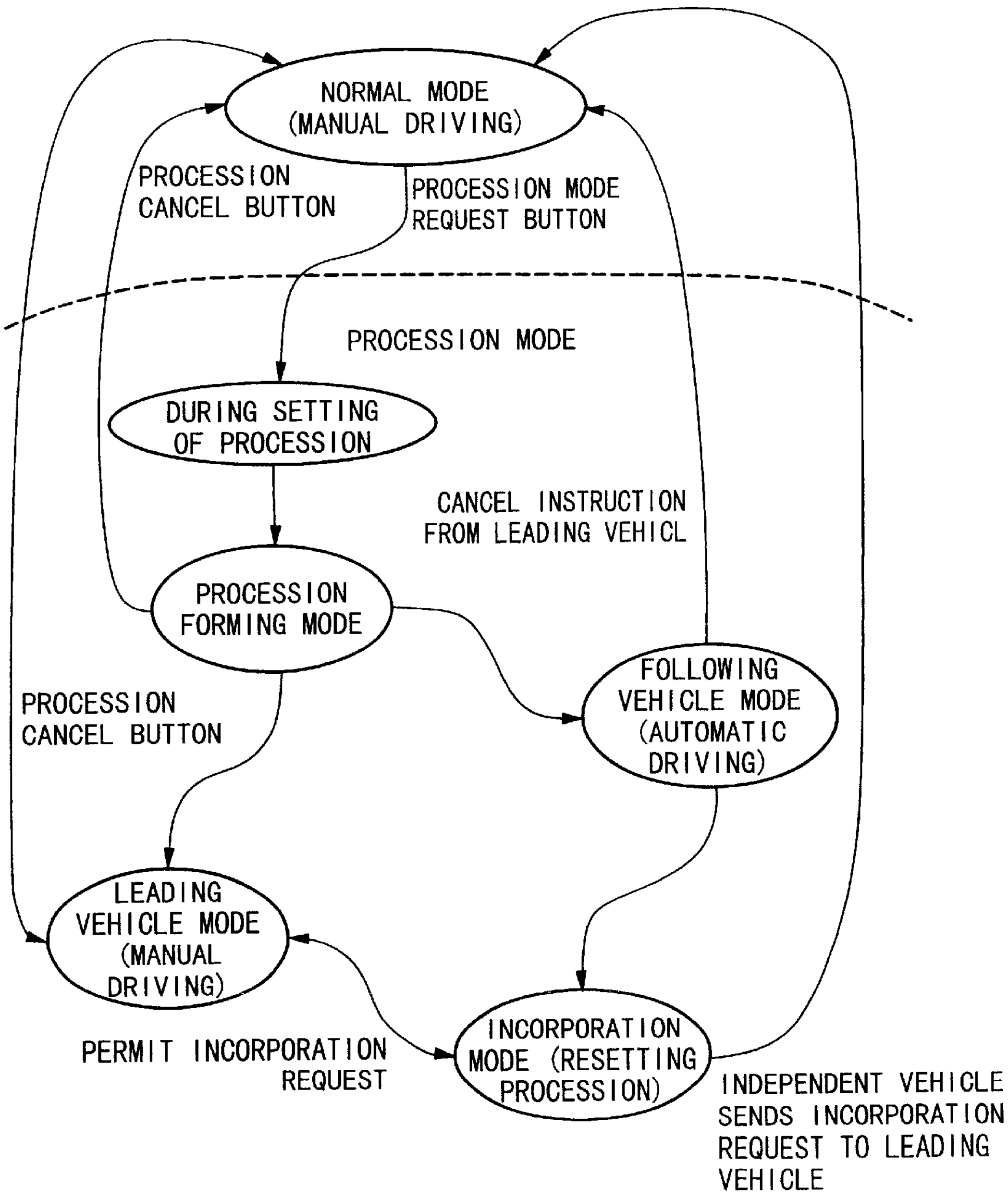
FIG. 23 is a diagram showing a change in control mode of the second embodiment of the present invention.

FIG. 23 shows a change in control mode for the processional travel which are roughly divided into normal mode (manual drive mode) and procession forming mode.

When in normal mode (manual drive mode) a procession mode request button, which is not shown, is pushed, the vehicle changes through setting of a procession to procession forming mode. Procession forming mode can be changed to one of leading vehicle mode (manual driving) and following vehicle mode (automatic driving), or the procession may be cancelled by the procession cancel button TB and the vehicle may change to normal mode. Leading vehicle mode and following vehicle mode can be changed to incorporation mode (resetting of a procession), and incorporation mode can be changed to following vehicle mode when the independent vehicle sends the incorporation request to the last following vehicle and when the request is permitted. Leading vehicle mode can be changed to normal mode by the procession cancel button TB.

Figure 24:
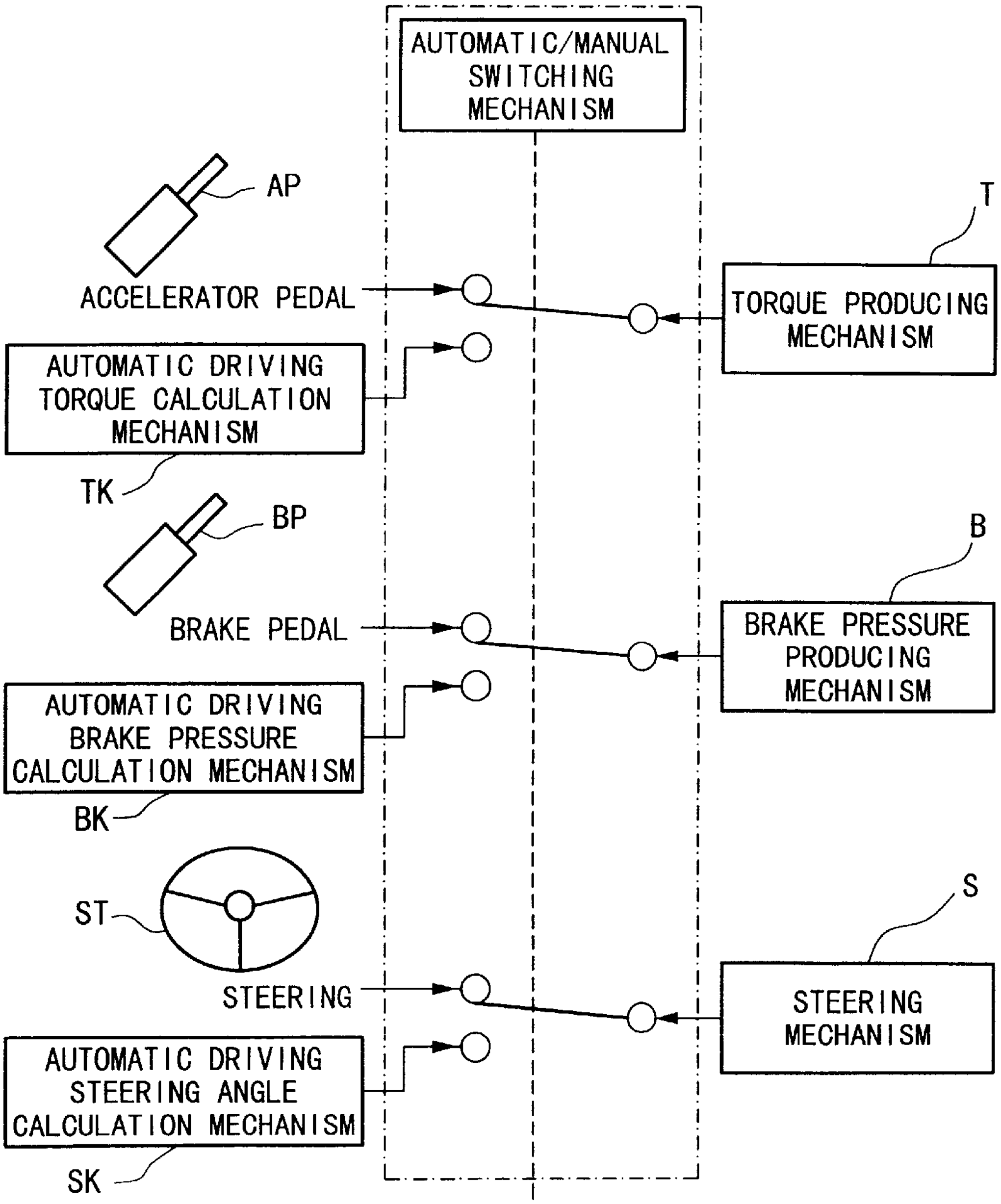
FIG. 24 is a diagram showing a switching mechanism of the second and third embodiments of the present invention.

When normal mode is changed to procession forming mode, the independent vehicle changes manual driving to automatic driving. This change is caused by switching a mechanism shown in FIG. 24. FIG. 24 show an automatic/manual switching mechanism. This switching mechanism can switch three mechanisms, which are a torque producing mechanism T, a brake pressure producing mechanism B, and a steering mechanism S, between automatic/manual operations so that the vehicle can be manually driven as the leading vehicle and automatically driven as the following vehicle. Here, in FIG. 24, the portion enclosed by the chain lines constitute a part of the processional travel control apparatus.

The torque producing mechanism T is connected to an accelerator pedal AP when switched to the manual side, or is connected to an automatic driving torque calculation mechanism TK when switched to the automatic side. The brake pressure producing mechanism B is connected to a brake pedal BP when switched to manual, or is connected to an automatic driving brake pressure calculation mechanism BK when switched to automatic. The steering device mechanism S is connected to a steering ST when switched to manual, or is connected to an automatic driving steering angle calculation mechanism SK when switched to automatic.

The automatic/manual switching mechanism is used when normal mode (manual driving) is changed to procession setting mode as shown in FIG. 23, when the vehicle is changed from a leading vehicle to a following vehicle or from a following vehicle to a leading vehicle during the processional travel.

The automatic/manual switching mechanism is switched to manual driving when the vehicle acts as a leading vehicle, or is switched to automatic driving when the vehicle acts as a following vehicle. The independent vehicle E is switched to automatic driving when the vehicle which is manually driven is incorporated in the procession.

Figure 25:
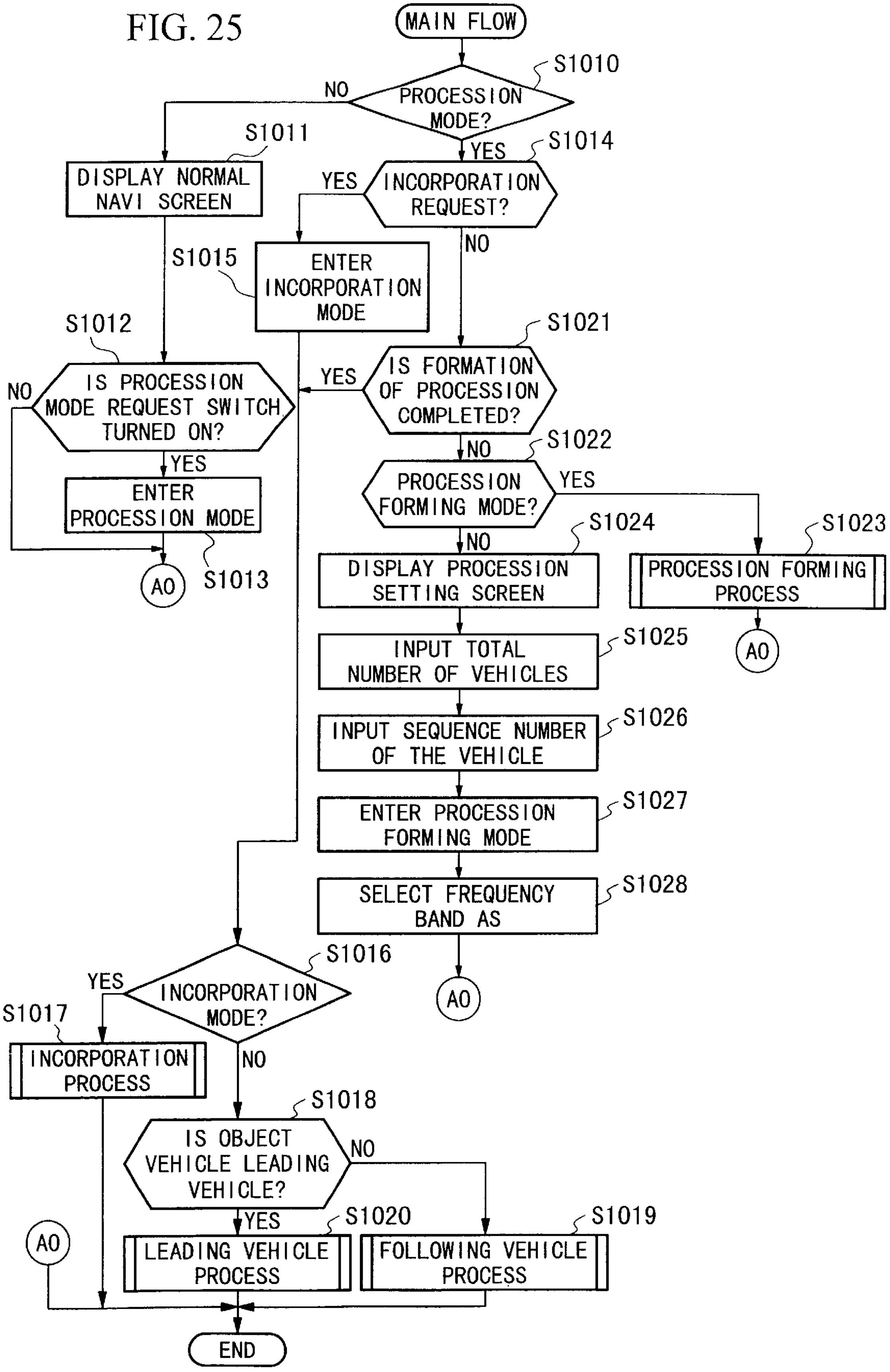
FIG. 25 is a main flowchart showing the control process of the procession of the second embodiment of the present invention.

FIG. 25 is a main flowchart showing the control of the procession.

In step S1010, it is determined whether the vehicle is in procession mode or not. When in step S1010 it is not in the procession mode, the flow proceeds to step S1011, in which then the display device 8 displays a normal navigation screen, and the flow proceeds to step S1012. In step S1012, it is determined whether the procession mode request switch is ON. When in step S1012 the procession mode request switch is OFF, control terminates. When in step S1012 the procession mode request switch is ON, the flow proceeds to step S1013, in which then the vehicle enters the procession mode, and control terminates.

When in step S1010 the vehicle is in the procession mode, the flow proceeds to step S1014, in which then it is determined whether the independent vehicle E requested the incorporation or not. When the determination is YES, that is, when the independent vehicle E requested the incorporation, the vehicle enters incorporation mode in step S1015 (until the permission of the incorporation from the leading vehicle D1). In step S1016, it is determined whether the vehicle is in incorporation mode or not. When in step S1016 the vehicle is in incorporation mode, the incorporation process which is described later is performed in step S1017, and control terminates.

When in step 1016 the vehicle is not in incorporation mode, the flow proceeds to step S1018. In step S1018, it is determined whether the vehicle is a leading vehicle or not, according to the vehicle sequence number. When in step S1018 it is the leading vehicle, the flow proceeds to step S1020, in which a following vehicle process, which will be described later, is then performed.

When in step S1014 the incorporation request is not sent, the flow proceeds to step S1021, in which then it is determined whether the formation of the procession is completed or not. When in step S1021 the formation of the procession is completed, the flow proceeds to step S1016. When in step S1021 the formation of the procession is not completed, the flow proceeds to step S1022, in which then it is determined whether the vehicle is in procession forming mode or not. When in step S1022 the vehicle is in procession forming mode, the flow proceeds to step S1023, in which then the process for forming a procession described herein as too is carried out.

When in step S1022 the vehicle is not in procession forming mode, the flow proceeds to step S1024, in which then the display device 8 displays the procession setting screen (see FIGS. 21A and 22A), the total number of vehicles is input in step S1025 (by the vehicle total number button DB, hereunder the same), and the sequence number of the object vehicle is input in step S1026 (by the vehicle sequence number button JB, hereunder the same). Subsequently, the vehicle is changed to procession forming mode in step S1027, a specified frequency AS band is selected in step S1028, and control terminates. This flowchart is started at an interval of 10 msec.

Figure 26:
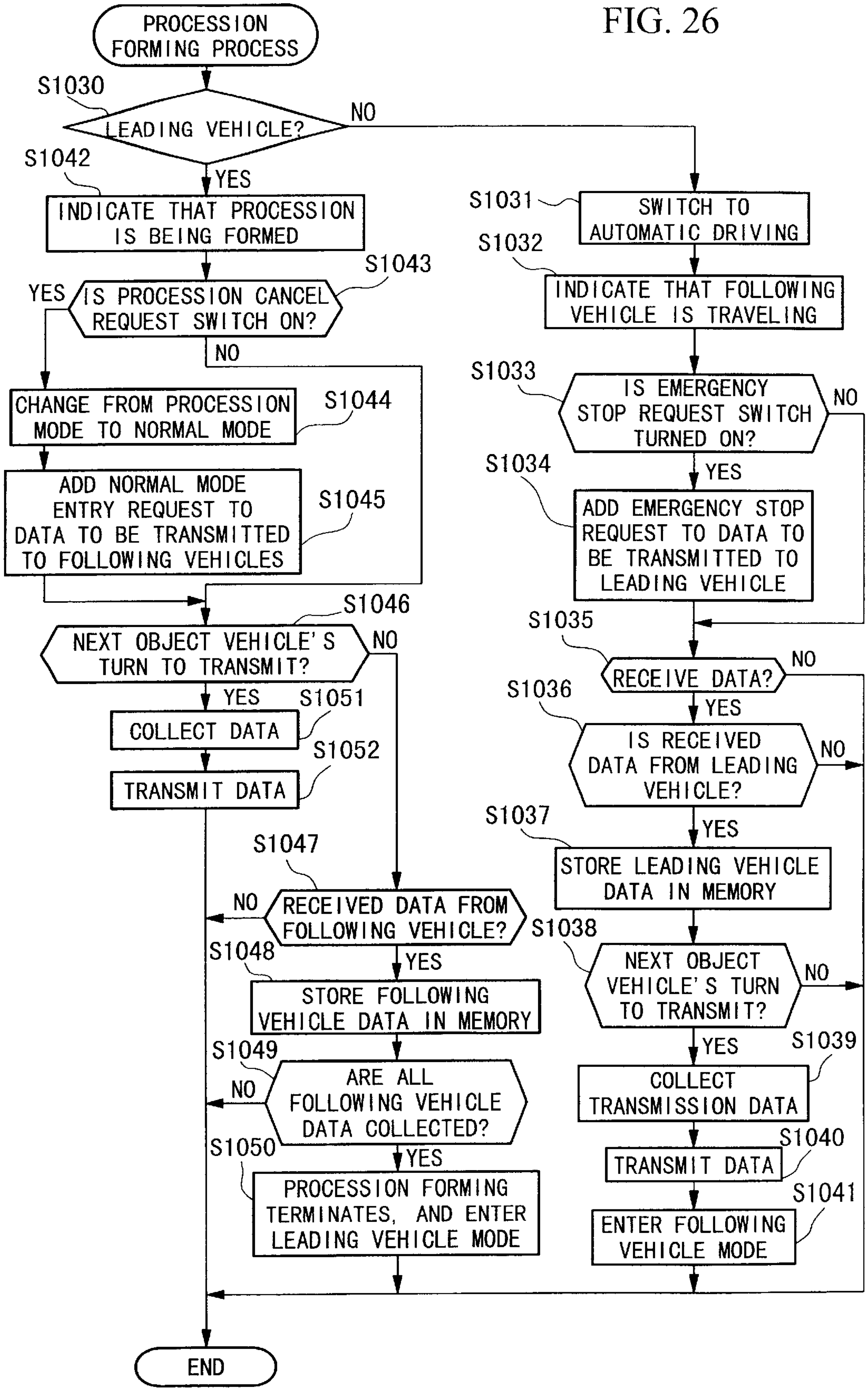
FIG. 26 is a flowchart showing the procession forming process of the second embodiment of the present invention.

The procession forming process in step S1023 in FIG. 25 will be explained according to the flowchart of FIG. 26.

In step S1030, it is determined whether the vehicle is a leading vehicle according to the sequence number of the vehicle. When in step S1030 the vehicle is not a leading vehicle according the sequence number of the vehicle, the flow proceeds to step S1031, in which then the vehicle is switched to the automatic driving, and in step S1032 the display device 8 indicates that the following vehicle is traveling. Then, in step S1033, it is determined whether the emergency stop request switch (corresponding to the emergency stop button KB, hereunder the same) is ON.

When in step S1033 the determination is NO, that is, when the emergency stop request switch is OFF, the flow proceeds to step S1035. When in step S1033 the determination is YES, that is, when the emergency stop request switch is ON, the emergency stop request is added to the data to be transmitted to the leading vehicle in step S1034, and the flow proceeds to step S1035. In step S1035, the presence or absence of received data is determined. When in step S1035 there is no received data, that is, when the determination is NO, control terminates. When in step S1035 the determination is YES, it is determined whether the received data has been transmitted from the leading vehicle or not.

When in step S1036 the received data has not been transmitted from the leading vehicle, control terminates. When in step S1036 the received data has been transmitted from the leading vehicle, the data transmitted from the leading vehicle is written in a memory in step S1037, and the flow proceeds to step S1038. In the next step S1038, it is determined whether the next time is the object vehicle's turn to transmit or not. When this determination is NO, control terminates. When this determination is YES, that is, when the next time is the object vehicle's turn to transmit, the transmission data is collected in step S1039, the data is transmitted in step S1040, the vehicle enters following vehicle mode in step S1041, and control terminates.

When in step S1030 the determination as to whether the object vehicle is the leading vehicle according to its sequence number is YES, that is, when the object vehicle is the leading vehicle, the display device 8 indicates that the vehicles are forming the procession in step S1042, and the flow proceeds to step S1043. Then, in step S1043, it is determined whether a procession cancel request switch (corresponding to the procession cancel button TB, hereunder the same) is ON. When in the step S1043 the determination is YES, that is, when the procession cancel request switch is ON, the flow proceeds to step S1044, in which procession mode is then changed to normal mode, and in step S1045 a change request to normal mode is added to the data to be transmitted to the following vehicles. Then, the flow proceeds to step S1046.

When in step S1043 the determination is NO, that is, when the procession cancel request switch is OFF, the flow proceeds to step S1046. In step S1046, it is determined whether the next time is the object vehicle's turn to transmit or not. When in step S1046 the determination is YES, the transmission data is collected in step S1051, the data is transmitted in step S1052, and control terminates. When in step S1046 the determination is NO, the flow proceeds to step S1047, in which it is then determined whether the vehicle has received the data or not from the following vehicle.

When in step S1047 the vehicle does not receive the data from the following vehicle, control terminates. When in step S1047 the vehicle receives the data from the following vehicle, the data from the following vehicle is stored in the memory in step S1048, and it is determined in step S1049 whether the data from all the vehicles has been collected.

When in step S1049 the data from all the following vehicles has not been collected, control terminates. When in step S1049 the data from all the following vehicles are collected, the flow proceeds to step S1050, in which the formation of the procession is then completed, the vehicle enters leading vehicle mode, and control terminates.

Figure 27:
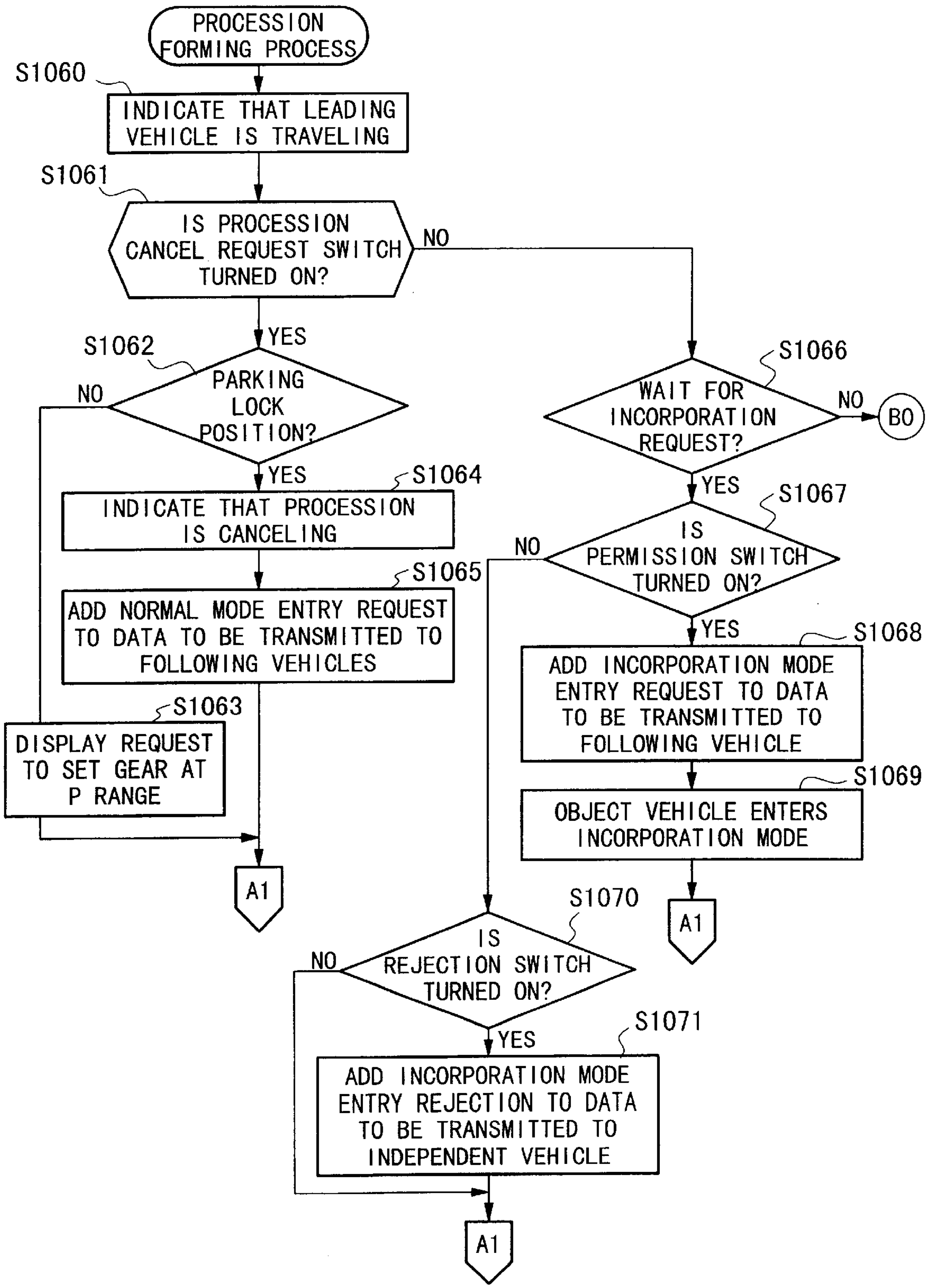
FIG. 27 is a flowchart showing the leading vehicle process of the second embodiment of the present invention.
Figure 28:
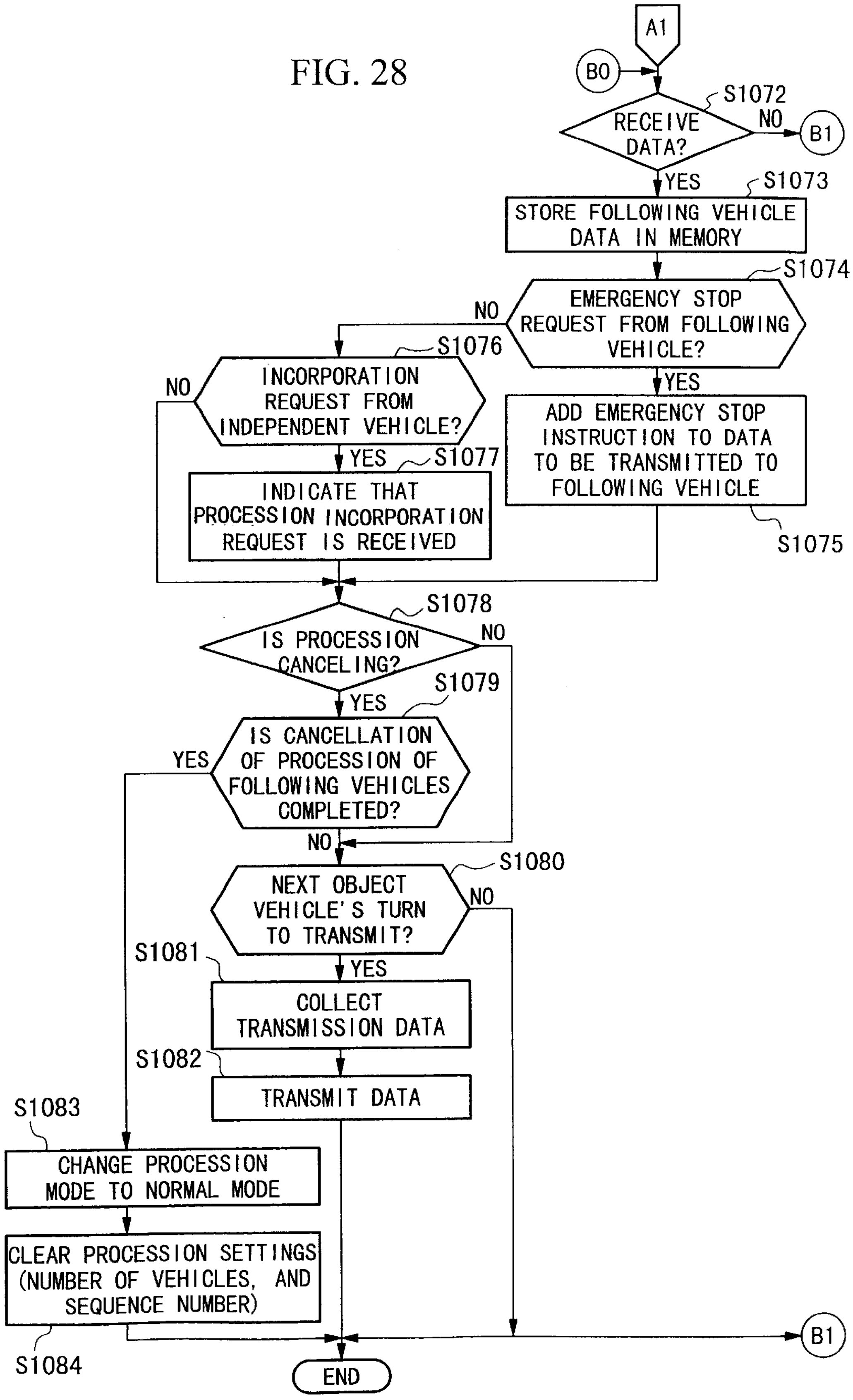
FIG. 28 is a flowchart showing the leading vehicle process of the second embodiment of the present invention.

The leading vehicle process in step S1020 in FIG. 25 will be explained with reference to the flowcharts of FIGS. 27 and 28. FIGS. 27 and 28 constitute one flowchart, which is divided into two parts for convenience of illustration.

In step S1060, the display device 8 indicates that the leading vehicle is traveling, and the flow proceeds to step S1061. In step S1061, it is determined whether the procession cancel request switch is ON or not. When in step S1061 the determination is NO, that is, when the procession cancel request switch is OFF, the flow proceeds to step S1066.

When in step S1061 the determination is YES, that is, when the procession cancel request switch is ON, it is determined in the next step S1062 whether a gear shifter is at a parking lock position or not. When in step S1062 the determination is NO, that is, when the gear shifter is not at the parking lock position (parking range), the request to change the gear shifter to the P (parking) range is displayed on the display device 8 in step S1063, and the flow proceeds to step S1072 in FIG. 28.

When in step S1062 the determination is YES, that is, when the gear shifter is at the parking lock position, the display device 8 indicates that the vehicle is canceling the procession in step S1064, the request to change to normal mode is added to the data to be transmitted to the following vehicles in step S1065, and the flow proceeds to step S1072 in FIG. 28.

In step S1066, it is determined whether the vehicle is waiting for the procession incorporation request or not. When in step S1066 the vehicle is not waiting for the incorporation request, the flow proceeds to step S1072 in FIG. 28. When in step S1066 the vehicle is waiting for the incorporation request, it is determined in step S1067 whether the procession incorporation permission button is ON or not. When in step S1067 the determination is YES, the incorporation mode entry request is added to the data to be transmitted to the following vehicles in step S1068, the object vehicle enters incorporation mode, in step S1069 the object vehicle enters incorporation mode, and the flow proceeds to step S1072.

When in step S1067 the determination is NO, it is determined in step S1070 whether the procession incorporation rejection switch is ON or not. When in step S1070 the determination is NO, the flow proceeds to step S1072 in FIG. 28. When in step S1070 the determination is YES, the incorporation mode entry request is added to the data to be transmitted to the independent vehicles in step S1071, and the flow proceeds to step S1072.

In step S1072 in FIG. 28, it is determined whether there is received data or not. When this determination is NO, control terminates. When in step S1072 the determination is YES, the following vehicle data is stored in step S1073, and the flow proceeds to step S1074, in which it is then determined whether an emergency stop request was sent from the following vehicle or not.

When in step S1074 the determination is YES, the emergency stop request is added to the data to be transmitted to the following vehicles in step S1075, and the flow proceeds to step S1078. When in step S1074 the determination is NO, it is determined in step S1076 whether there is the incorporation request from the indepedent vehicle or not. When in step S1076 the determination is NO, the flow proceeds to step S1078.

When in step S1076 the determination is YES, it is indicated that the procession incorporation request is received in step S1077, and the flow proceeds to step S1078. In step S1078, it is determined whether the procession is canceling or not. When in step S1078 the determination is NO, the flow proceeds to step S1080. When in step S1078 the determination is YES, it is determined in step S1079 whether the cancellation of the procession of the following vehicles is completed or not.

When in step S1079 the determination is NO, the flow proceeds to step S1080, in which then it is determined whether the next time is the object vehicle's turn to transmit. When in step S1080 the determination is NO, control terminates. When in step S1080 the determination is YES, the transmission data is collected in step S1081, the data is transmitted in step S1082, and control terminates. When in step S1079 the determination is YES, procession mode is changed to normal mode in step S1083, the procession settings (the total number of vehicles, and the sequence number) are cleared in step S1084, and control terminates.

Figure 29:
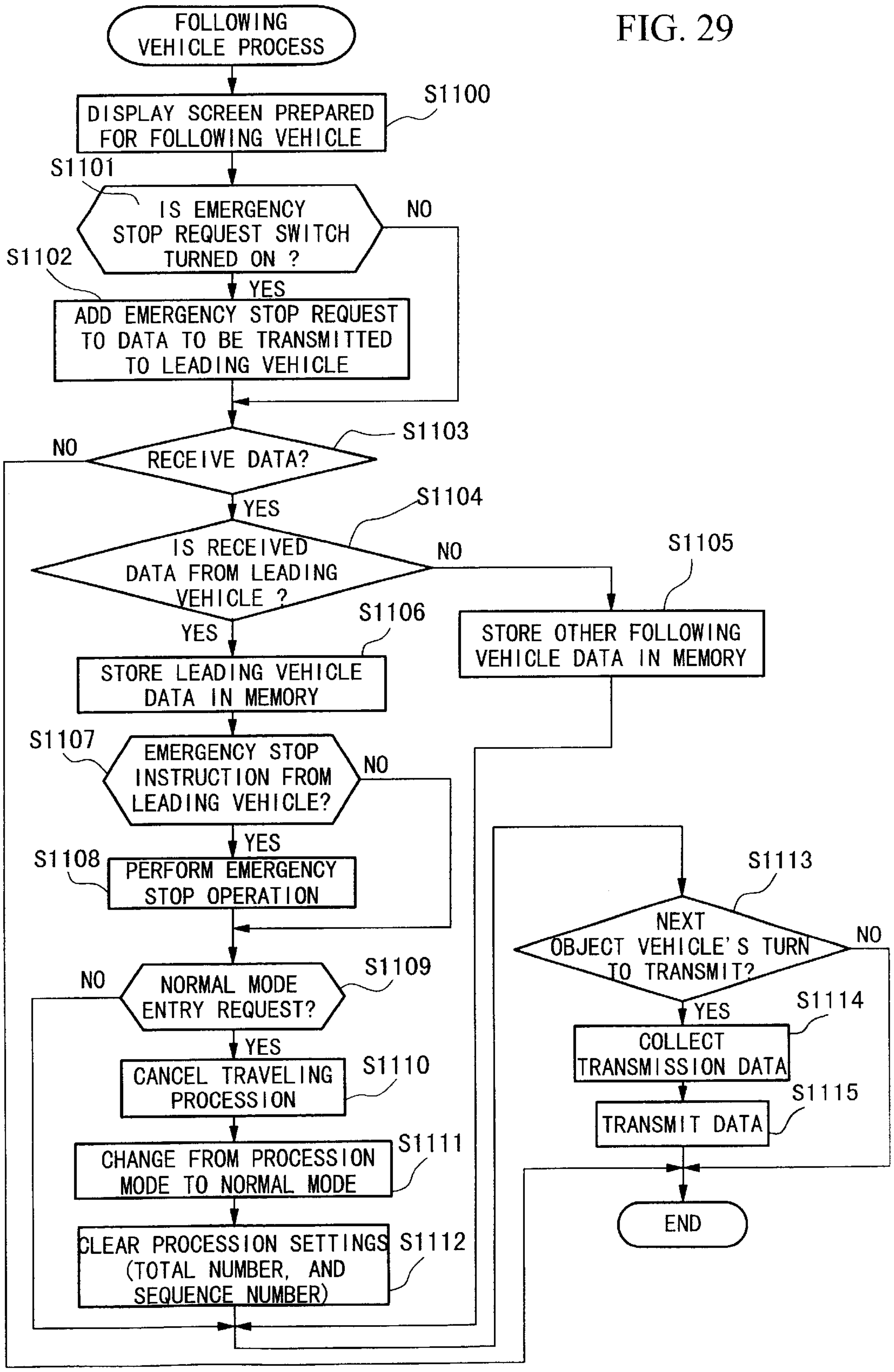
FIG. 29 is a flowchart showing the following vehicle process of the second embodiment of the present invention.

The following vehicle process in step S1019 in FIG. 25 will be explained with reference to the flowchart of FIG. 29.

In step S1100, the screen prepared for the following vehicle is displayed on the display device 8, and in step S1101 it is determined whether the emergency stop request switch is ON or not. When in step S1101 the emergency stop request switch is OFF, the flow proceeds to step S1103.

When in step S1101 the emergency stop request switch is ON, the emergency stop request is added to the data to be transmitted to the leading vehicle in step S1102, and the flow proceeds to step S1103.

In step S1103, the presence or absence of the received data is determined. When in step S1103 there is no received data, control terminates. When in step S1103 there is received data, the flow proceeds to step S1104, in which then it is determined whether the received data was sent from the leading vehicle or not. When in step S1104 the received data was not sent from the leading vehicle, other following vehicle data is then stored in a memory in step S1105, and the flow proceeds to step S1113.

When in step S1104 the received data was sent from the leading vehicle, the leading vehicle data is stored in the memory in step S1106, and the flow proceeds to step S1107. In step S1107, it is determined whether an emergency stop instruction was sent from the leading vehicle.

When in step S1107 no emergency stop instruction was sent from the leading vehicle, the flow proceeds to step S1109. When the emergency stop instruction was sent from the leading vehicle, the vehicle performs the emergency stop operation in step S1108, and the flow proceeds to step S1109. In step S1109, it is determined whether there is a normal mode entry request or not. When in step S1109 there is no normal mode entry request, the flow proceeds to step S1113. When in step S1109 there is the normal mode entry request, the processional travel is terminated in step S1110, procession mode is changed to normal mode in step S111, and the procession settings (the total number of vehicles, and the sequence number) are cleared in step S1112.

In step S1113, it is determined whether the next time is the object vehicle's turn to transmit. When in step S1113 the determination is NO, control terminates. When in step S1113 the determination is YES, the transmission data is collected in step S1114, the data is transmitted in step S1115, and control terminates.

Figure 30:
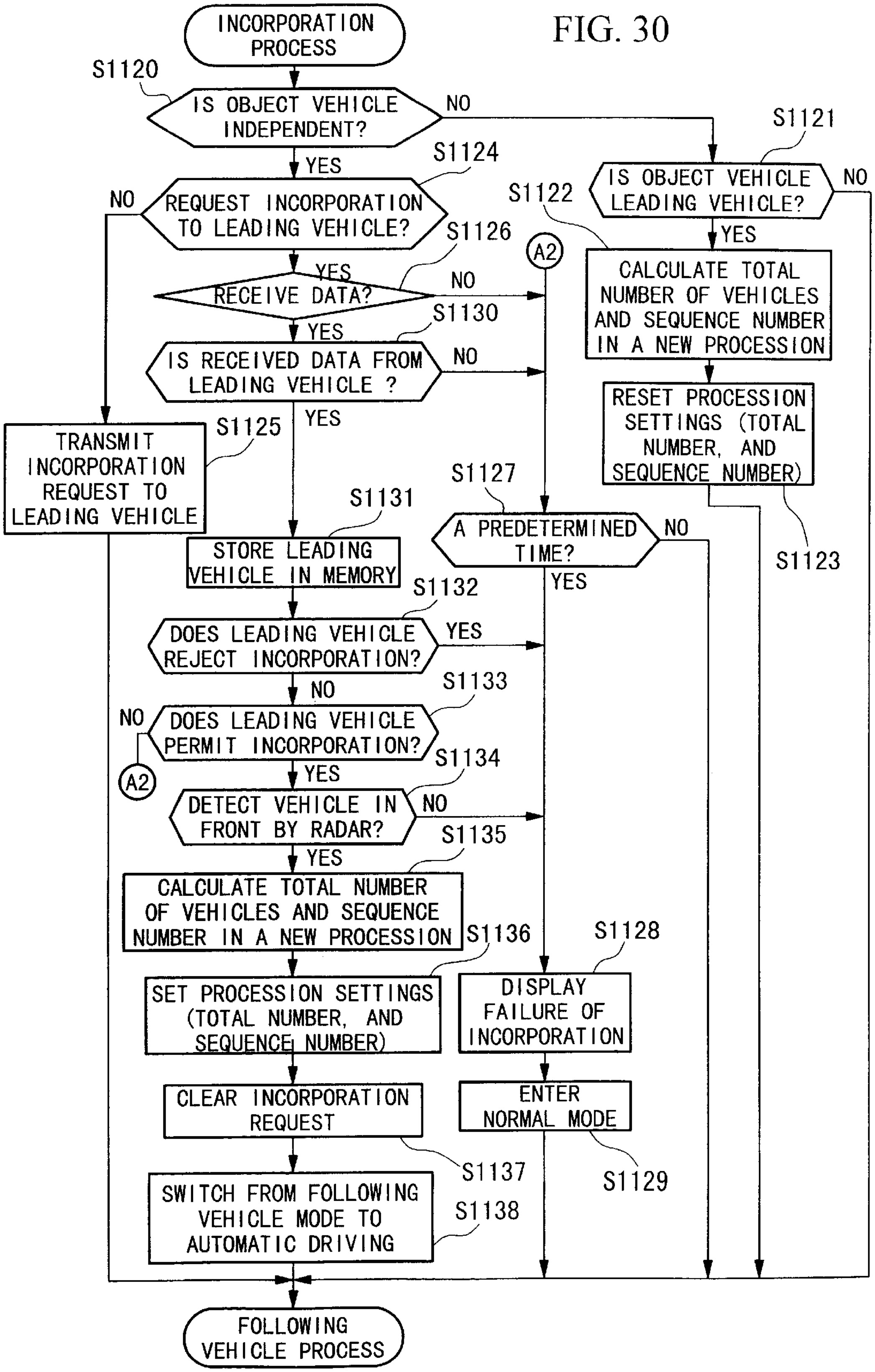
FIG. 30 is a flowchart showing the incorporations process of the second embodiment of the present invention.

The incorporation process in step S1017 in FIG. 26 will be explained with reference to the flowchart of FIG. 30.

In step S1120, it is determined whether the object vehicle is an independent vehicle or not. When the object vehicle is not an independent vehicle, the flow proceeds to step S1121, in which then it is determined whether the object vehicle is a leading vehicle or not. When in step S1121 the object vehicle is not a leading vehicle, control terminates. When in step S1121 the object vehicle is a leading vehicle, the total number of vehicles in a new procession and the sequence number are calculated in step S1122, the procession settings (the total number of vehicles, and the sequence number) are reset in step S1123, and control terminates.

When in step S1120 the object vehicle is an independent vehicle, the flow proceeds to step S1124, in which it is determined whether the vehicle is requesting the incorporation or not. When in step S1124 the vehicle is not requesting the incorporation, the flow proceeds to step S1125, in which the incorporation request is then sent, and control terminates. When in step S1124 the vehicle is requesting the incorporation, the flow proceeds to step S1126, in which the presence or absence of received data is then determined. When in step S1126 there is no received data, the flow proceeds to step S1127, in which then it is determined whether a predetermined time has passed or not. After the predetermined time has passed, the display indicates the failure of the incorporation (see FIG. 22D) in step S1128, the vehicle enters normal mode in step S1129, and control terminates. When in step S1127 the predetermined time has not passed, control terminates.

When in step S1126 there is received data, the flow proceeds to step S1130, in which then it is determined if the received data is sent from the leading vehicle or not. When it is not sent from the leading vehicle, the flow proceeds to step S1127. When in step S1130 the received data is sent from the leading vehicle, the leading vehicle data is stored in the memory in step S1131, and the flow proceeds to step S1132, in which then the incorporation is rejected by the leading vehicle or not. When the incorporation is rejected in step S1132, the flow proceeds to step S1128.

When in step S1132 the incorporation is not rejected, the flow proceeds to step S1133, in which it is then determined whether the incorporation is permitted by the leading vehicle or not. When in step S1133 the incorporation is not permitted, the flow proceeds to step S1127. When in step S1133 the incorporation is permitted by the leading vehicle, the flow proceeds to step S1134, in which then the vehicle can detect the vehicle in front by radar.

When in step S1134 the vehicle cannot detect the vehicle in front, the flow proceeds to step S1128. When in step S1134 the vehicle can detect the vehicle in front, the total number of vehicles in a new procession and the sequence number are calculated in step S1135, the procession settings (the total number of vehicles, and the sequence number) are set in step S1136, and the incorporation request is cleared in step S1137. Then, the vehicle switches from following mode, and is changed to automatic driving in step S1138, and control terminates.

The communication procedure when the independent vehicle E wishes to incorporate into the procession, joins at the end of the procession, and becomes the following vehicle F5 will be explained with reference to FIG. 20. Numbers in the round brackets are continued from the communication procedure for normal processional travel. In the following, the explanation is made by way of the case in which the incorporation request is sent from the independent vehicle E after the leading vehicle D1 performs the communication (1) as described above, and after all the vehicles 1 receive it.

(6) The leading vehicle D1 transmits. In the transmitted data, it is specified that the following vehicle D2 has the next transmission right. The data transmitted from the leading vehicle D1 is received by all the vehicles 1 (which includes the independent vehicle E) which are the following vehicles D2 to D4.

(7) Although the next time is the following vehicle D2's turn to transmit, the independent vehicle E transmits, and the data transmitted from the independent vehicle E is received by all the vehicles 1 which are the leading vehicle D1 and the following vehicles D2 to D4. On reception of the data, the leading vehicle D1 switches the screen on the display device 8 and is waiting for an input. The vehicle-to-vehicle communication in the procession continues.

When the driver in the leading vehicle D1 pushes the permission button YB, the leading vehicle D1 transmits, and specifies in the transmitted data that the following vehicle D2 has the next transmission right. The transmitted data from the leading vehicle D1, which includes the incorporation mode entry request, is received by all the vehicles 1 which are the following vehicles D2, D3, and D4, and the independent vehicle E. When approaching the processional vehicle group DG, the independent vehicle E has turned on the vehicle-to-vehicle communication, for example, set the default value for a communication frequency to the band AS to receive the transmission from the leading vehicle D1.

Then, the leading vehicle D1 is changed to a leading vehicle F1, the following vehicle D2 is changed to a following vehicle F2, the following vehicle D3 is changed to a following vehicle F3, the following vehicle D4 is changed to a following vehicle F4, and the independent vehicle E is changed to a following vehicle F5.

(8) Then, the following vehicle D2=F2 which has the transmission right transmits. In the transmitted data, it is specified that the leading vehicle F1 has the next transmission right. The data transmitted from the following vehicle F2 is received by the leading vehicle F1 and the other following vehicles F3 to F5.

(9) Again, the leading vehicle F1 transmits. It is specified that the leading vehicle F3 has the next transmission right.

(10) The following vehicle F3 transmits. In the transmitted data, it is specified that the leading vehicle F1 has the next transmission right. The data transmitted from the following vehicle F3 is received by the leading vehicle F1 and the other following vehicles F2, F4, and F5.

(11) After the following vehicle F5 transmits, the procedure returns to the leading vehicle F1, and then the above procedure is then repeated. Thus, the communication can be smoothly performed when the independent vehicle joins the procession.

According this embodiment, when the independent vehicle E wishes to join the processional vehicle group DG which is comprised of the leading vehicle D1 and the following vehicles D2, D3, and D4, a new processional vehicle group FG, which includes the independent vehicle E and is comprised of the leading vehicle F1 and the following vehicles F2, F3, F4, and F5, can be formed without stopping the travel and canceling the procession. Therefore, without decreasing the transport efficiency in processional travel, the redundant labor of the drivers can be reduced. Further, the vehicle-to-vehicle communication with the independent vehicle E, which joins the procession, can be smoothly provided, avoiding confusion and blank in communication.

Third Embodiment

The third embodiment of the present invention will be explained, by citing FIG. 1, with reference to FIGS. 31 to 43.

Figure 31:
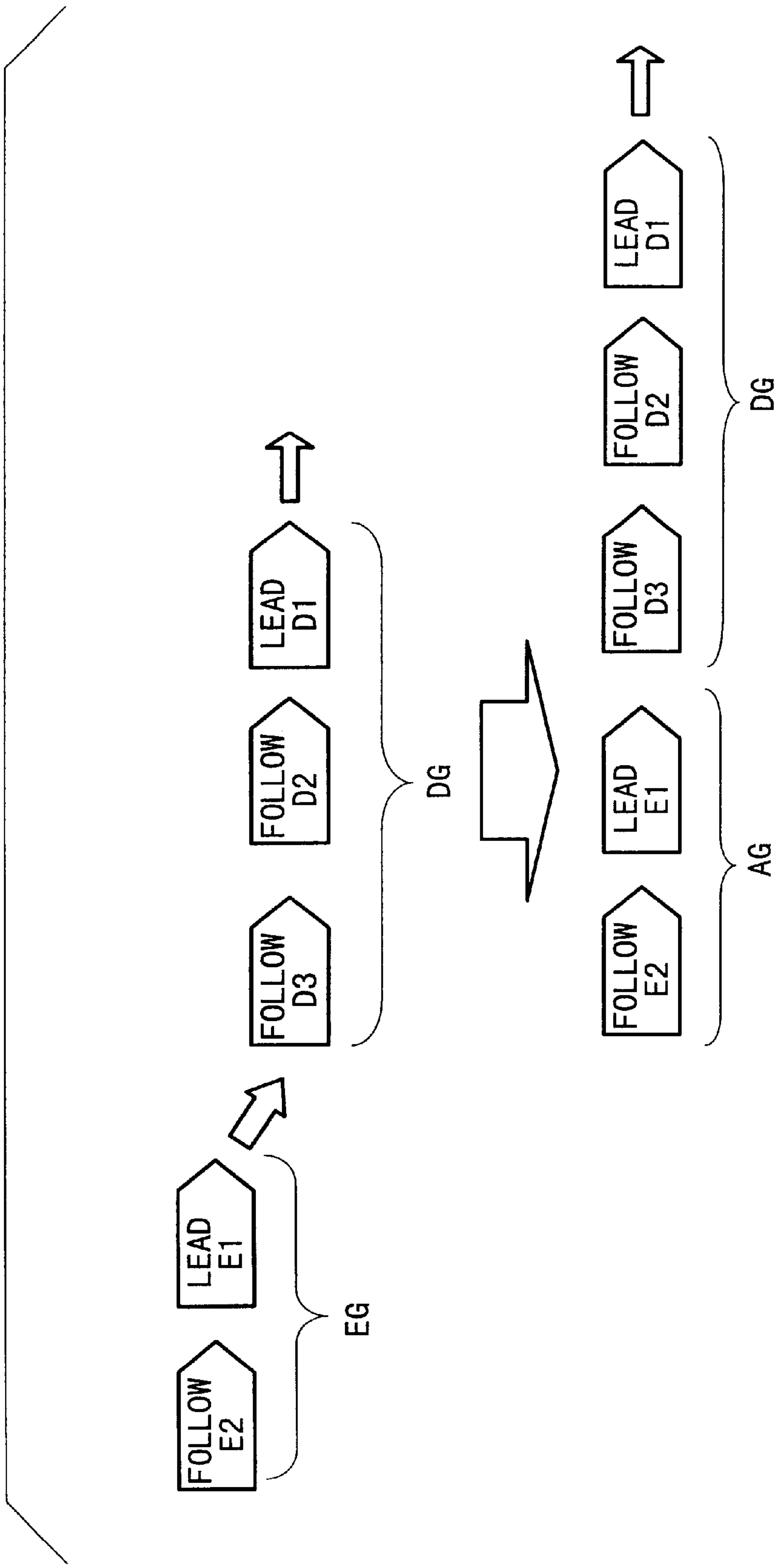
FIG. 31 is a diagram for explaining the situation of joining of processions of the third embodiment of the present invention.

In this embodiment, another procession joins the traveling procession. FIG. 31 shows the manner in which a processional vehicle group EG, which includes in total two vehicles of a leading vehicle E1 and a following vehicle E2, joins a processional vehicle group DG which includes in total three vehicles of a leading vehicle D1 and following vehicles D2 and D3. The processional vehicle group EG approaches the traveling processional vehicle group DG, and when a procession joining request is permitted, the processional vehicle group EG joins at the end of the processional vehicle group DG.

Figure 32:
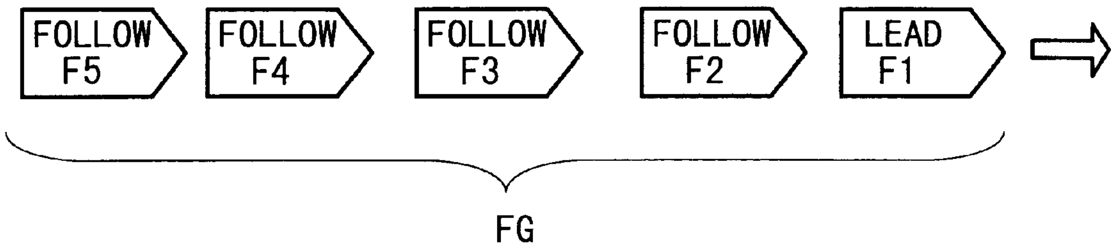
FIG. 32 is a diagram showing the situation after the joining of processions of the third embodiment of the present invention.

When the processional vehicle groups DG and EG join together, a processional vehicle group FG which comprises in total five vehicles of a leading vehicle F1, and following vehicles F2, F3, F4, and F5 shown in FIG. 32.

FIGS. 33, 34, and 35 show screens on the display device 8. FIGS. 33A to 33D show screens on the display device 8 of the leading vehicle D1 in the preceding processional vehicle group DG, and FIG. 33A shows a procession setting screen. The total number of vehicles and the sequence number of the object vehicle can be input by a total number button DB and a vehicle sequence number button JB.

Figure 33A:
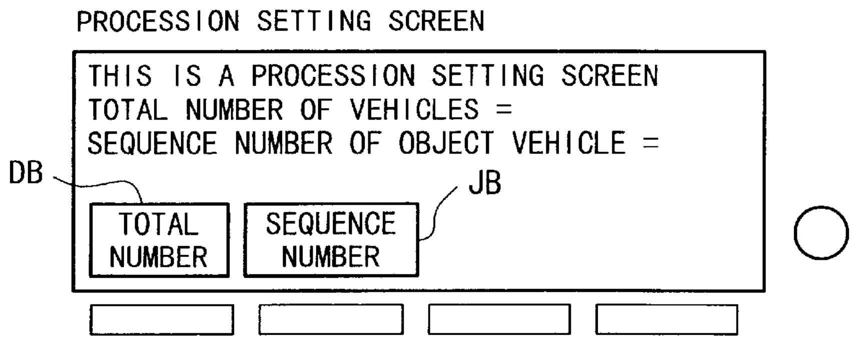
FIGS. 33A to 33D are diagrams for explaining input/output screens on a display device in a leading vehicle of the third embodiment of the present invention.
Figure 33B:
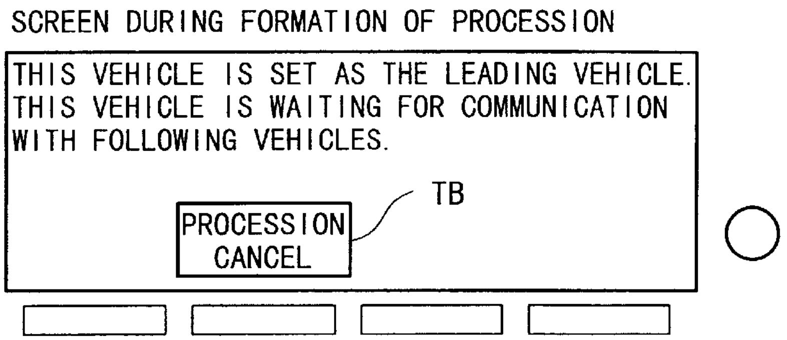
Figure 33C:
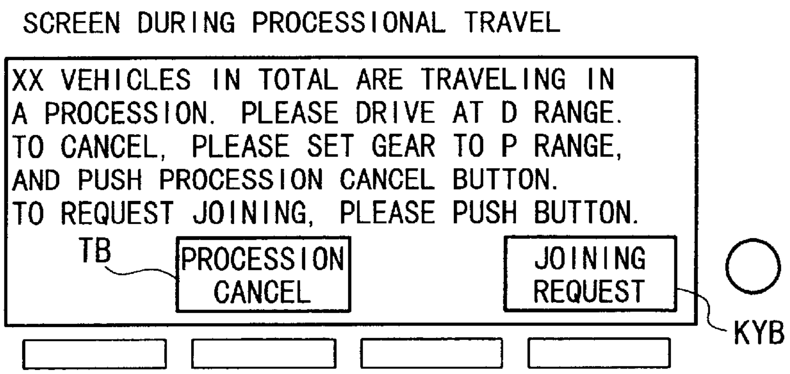

FIG. 33B shows a screen during the formation of the procession. It is indicated that this vehicle is set as the leading vehicle and is waiting for the communication from the following vehicles. A procession cancel button TB is displayed on the screen. FIG. 33C shows a screen during the processional travel. On the display, the number of vehicles in the procession, "the procession is traveling", "please drive in the D range", and "to cancel the procession, please stop vehicles, set the gear to the P range, and push the procession cancel button" are displayed. Further, "to request joining, please push the button" is displayed. On the display, a procession cancel button TB, and a joining request button KYB are displayed.

Figure 33D:
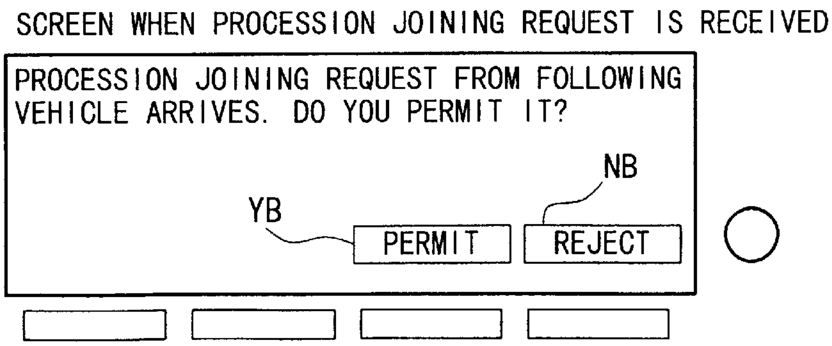

FIG. 33D shows a screen when receiving the procession joining request. When the joining request is sent from another processional vehicle group EG following the end of the procession, a request permission button is pushed, and the vehicle waits for the change of the requesting vehicle group to following vehicles.

It is indicated that the joining request from the following vehicle arrives, and it is asked if the request is permitted. On the display, a permission button YB and a rejection button NB are displayed. In FIG. 33D, when the permission is selected, the total number of vehicles is changed, and the screen shown in FIG. 33C is displayed.

Figure 34A:
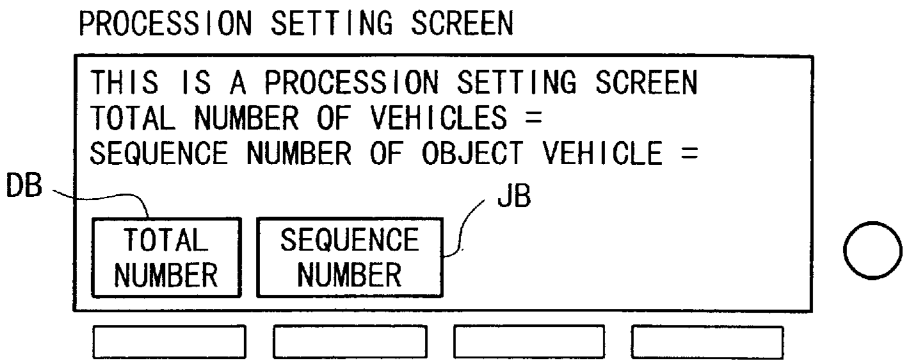
FIGS. 34A to 34C are diagrams for explaining input/output screens on a display device in the leading vehicle in the succeeding procession of the third embodiment of the present invention.
Figure 34B:
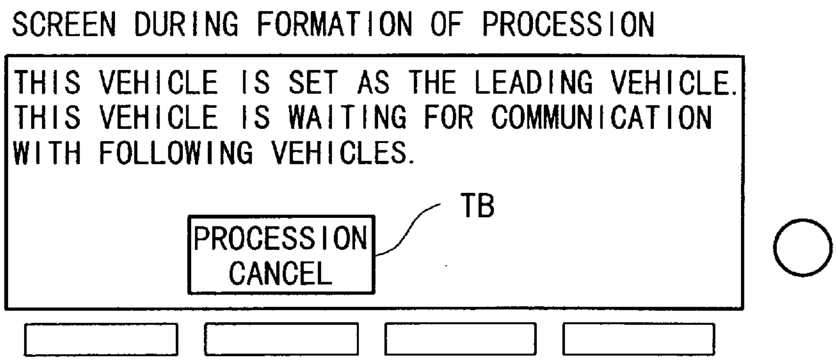
Figure 34C:
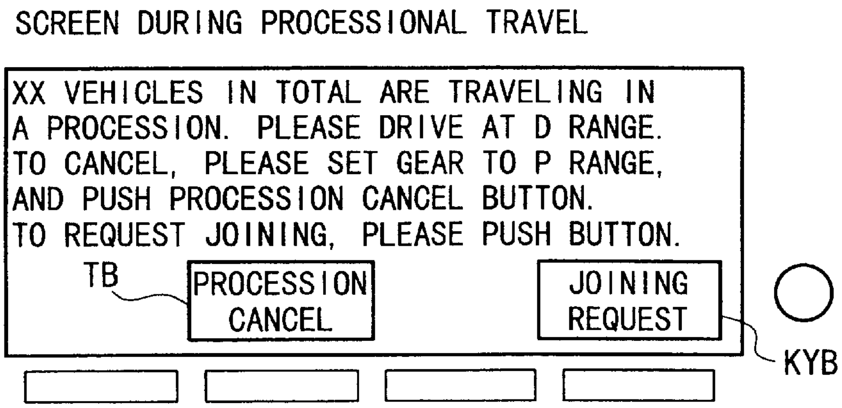

FIGS. 34A to 34C show input/output screens in the leading vehicle E1 in the succeeding procession EG. FIG. 34A shows a procession setting screen. As shown in this figure, the total number of vehicles and the sequence number of the object vehicle can be input by a total number button DB and an object vehicle sequence number button JB. FIG. 34B shows a screen during the formation of the procession. It is indicated that this vehicle is set as a leading vehicle and is waiting for communication from the following vehicles. On the display, a procession cancel button TB is displayed. FIG. 34C shows a screen during the processional travel. On the display, the number of vehicles in the procession, "the procession is traveling", "please drive in the D range", and "to cancel the procession, please stop vehicles, set the gear to the P range, and push the procession cancel button" are displayed. Further, "to request joining, please push the button" is displayed. On the display, a procession cancel button TB and a joining request button KYB are displayed.

Figure 35A:
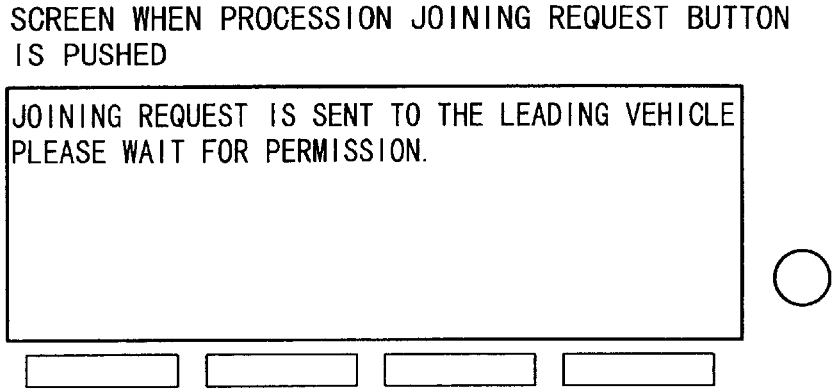
FIGS. 35A and 35B are diagrams for explaining input/output screens on a display device in the leading vehicle in the succeeding procession of the third embodiment of the present invention.
Figure 35B:
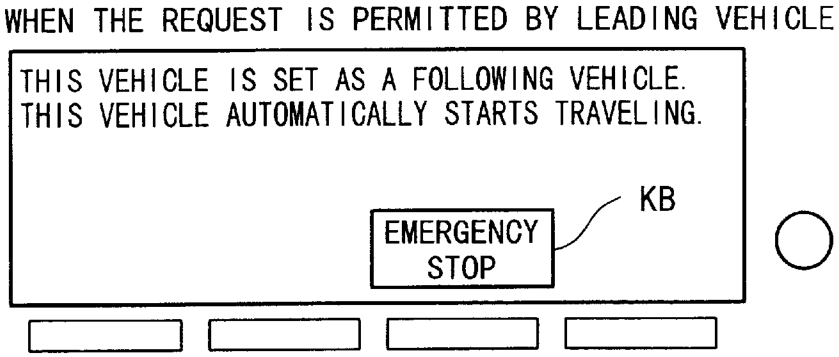

FIG. 35A shows a screen of the leading vehicle E1 in the succeeding processional vehicle group EG which pushed the procession joining request button. It is indicated that the joining request was sent to the leading vehicle, and that the vehicle is waiting for permission. FIG. 35B show that the leading vehicle E1 in the succeeding processional vehicle group EG, which was permitted to join, is set as a following vehicle in a new processional vehicle group FG. Further, it is indicated that the vehicle starts automatic driving. An emergency stop button KB is also displayed.

Figure 36:
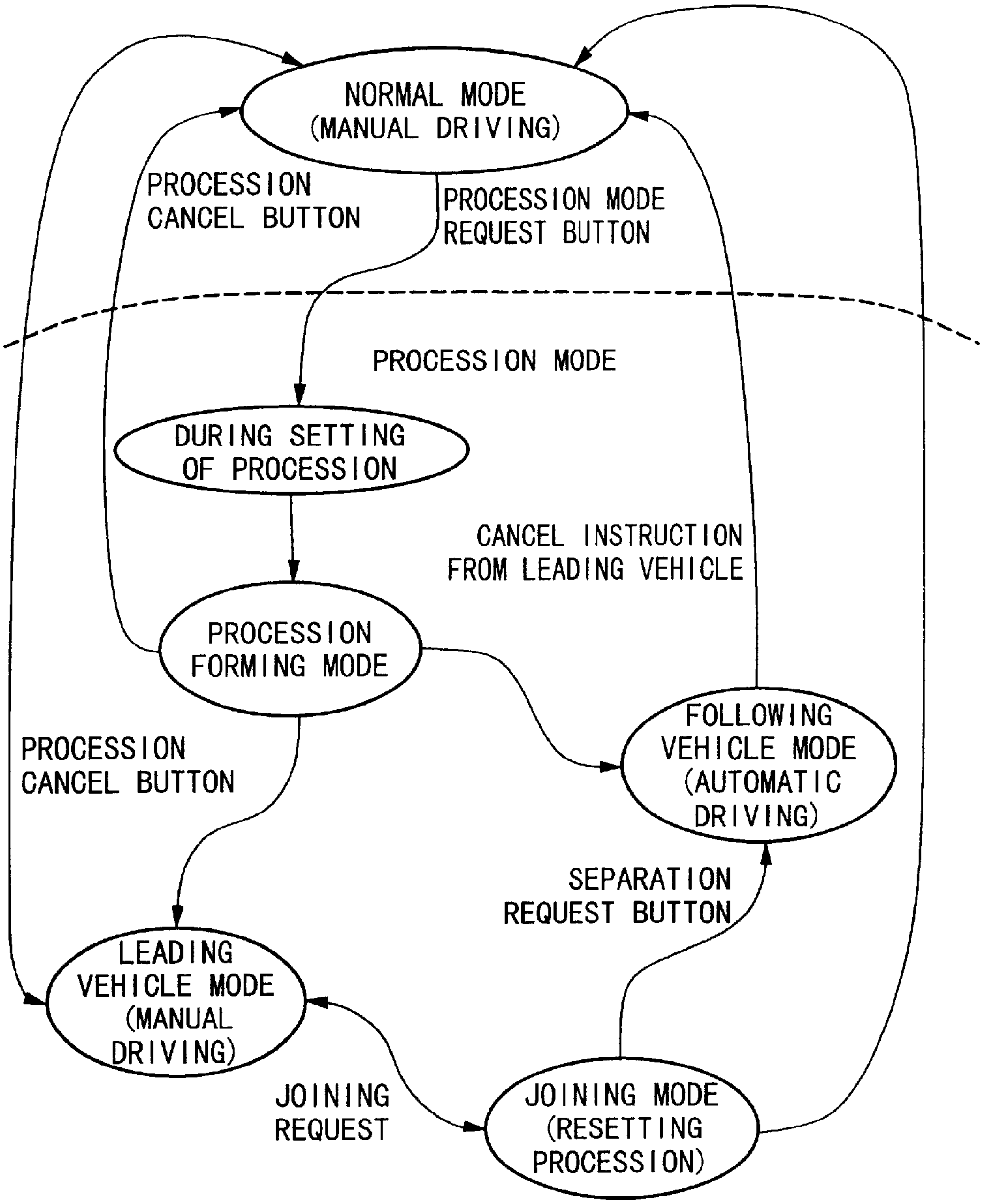
FIG. 36 is a diagram showing a change in control mode of the third embodiment of the present invention.

FIG. 36 shows a change in control mode for the processional travel which are roughly divided into normal mode and procession forming mode.

When in normal mode (manual drive mode) a procession mode request button, which is not shown, is pushed, the vehicle changes through setting of a procession to procession forming mode. Procession forming mode can be changed to either leading vehicle mode (manual driving) or following vehicle mode (automatic driving), or the procession may be cancelled by the procession cancel button TB and the vehicle may change to normal mode. Leading vehicle mode and normal mode can be changed to joining mode (resetting of a procession), and the succeeding vehicles can change from joining mode to following vehicle mode when the joining request sent to the last following vehicle from the succeeding processional vehicle group is permitted. Leading vehicle mode can be changed to normal mode by the procession cancel button TB.

When normal mode is changed to procession forming mode, the following vehicle is changed from manual driving to automatic driving, and this change is performed by switching a mechanism shown in FIG. 24 in a manner similar to the above embodiments. This switching mechanism has the same construction as that shown in FIG. 24, and its detailed description is omitted.

The automatic/manual switching mechanism is used when normal mode (manual driving) is changed to procession setting mode as shown in FIG. 36, when the vehicle is changed from a leading vehicle to a following vehicle or from a following vehicle to a leading vehicle during the processional travel.

The automatic/manual switching mechanism is switched to the manual driving when the vehicle acts as a leading vehicle, or is switched to the automatic driving when the vehicle acts as a following vehicle. The independent vehicle E is switched from manual drive mode to automatic drive mode when it is incorporated in the procession.

Figure 37:
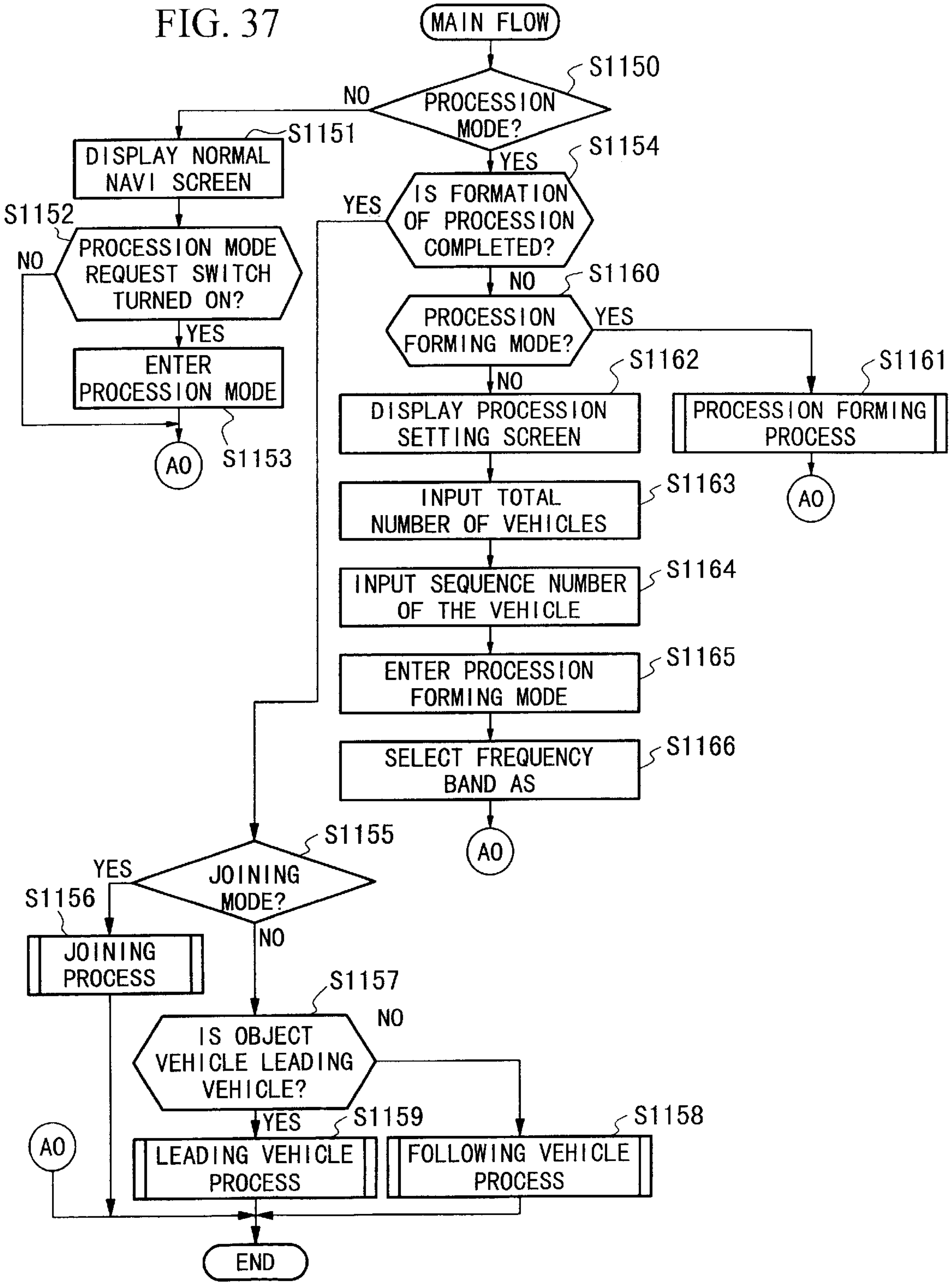
FIG. 37 is a main flowchart showing the control process of the procession of the third embodiment of the present invention.

FIG. 37 is a main flowchart showing the control of the procession.

In step S1150, it is determined whether the vehicle is in procession mode or not. When in step S1150 it is not in the procession mode, the flow proceeds to step S1151, in which then the display device 8 displays a normal navigation screen, and the flow proceeds to step S1152. In step S1152, it is determined whether the procession mode request switch is ON. When in step S1152 the procession mode request switch is OFF, control terminates. When in step S1152 the procession mode request switch is ON, the flow proceeds to step S1153, in which then the vehicle enters the procession mode, and control terminates.

When in step S1150 the vehicle is in the procession mode, the flow proceeds to step S1154, in which then it is determined whether the formation of the procession is completed or not. When the determination is YES, that is, when the formation of the procession is completed, the flow proceeds to step S1155, in which then it is determined whether the vehicle is in the joining mode or not. When in step S1155 the vehicle is in the joining mode, the joining process is performed in step S1156, and control terminates. When in step S1155 the vehicle is not in the joining mode, the flow proceeds to step S1157. In step S1157, it is determined whether the vehicle is a leading vehicle or not, according to the sequence number of the vehicle. When in step S1157 the vehicle is a leading vehicle, the flow proceeds to step S1159, in which then a leading vehicle process is performed. When in step S1157 the vehicle is not a leading vehicle according to the sequence number of the vehicle, the flow proceeds to step S1158, in which then a following vehicle process is performed.

When in step S1154 the formation of the procession is not completed, the flow proceeds to step S1160, in which it is then determined whether the vehicle is in procession forming mode or not. When in step S1160 the vehicle is in procession forming mode, the flow proceeds to step S1161, in which then the procession forming process is performed. When in step S1160 the vehicle is not in procession forming mode, the flow proceeds to step S1162, in which then the display device 8 displays the procession setting screen (see FIGS. 33A and 34A), the total number of vehicles is input in step S1163 (by the vehicle total number button DB, hereunder the same), and the sequence number of the object vehicle is input in step S1164 (by the vehicle sequence number button JB, hereunder the same). Subsequently, the vehicle is changed to procession forming mode in step S1165, the frequency bands are selected in step S1166 (as described later, the procession DG selects the frequency band AS, and the procession EG selects the frequency band BS), and control terminates. This flowchart is started at an interval of 10 msec.

Figure 38:
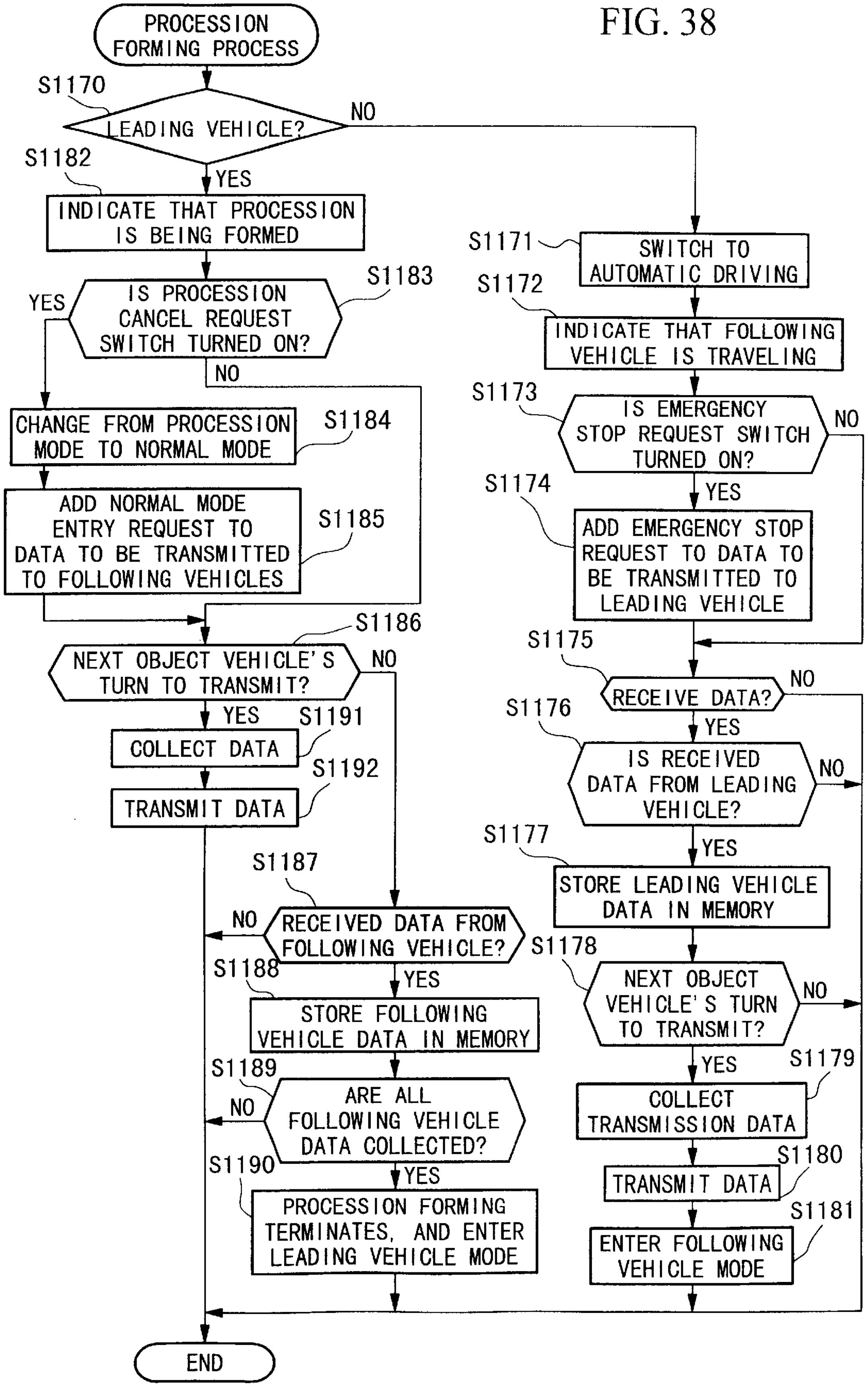
FIG. 38 is a flowchart showing the procession forming process of the third embodiment of the present invention.

The procession forming process in step S1161 in FIG. 37 will be explained according to the flowchart of FIG. 38.

In step S1170, it is determined whether the vehicle is a leading vehicle according to the sequence number of the vehicle. When in step S1170 the vehicle is not a leading vehicle according the sequence number of the vehicle, the flow proceeds to step S1171, in which then the vehicle is switched to the automatic driving, and in step S1172 the display device 8 indicates that the following vehicle is traveling. Then, in step S1173, it is determined whether the emergency stop request switch (corresponding to the emergency stop button KB, hereunder the same) is ON or not.

When in step S1173 the determination is NO, that is, when the emergency stop request switch is OFF, the flow proceeds to step S1175. When in step S1173 the determination is YES, that is, when the emergency stop request switch is ON, the emergency stop request is added to the data to be transmitted to the leading vehicle in step S1174, and the flow proceeds to step S1175. In step S1175, the presence or absence of received data is determined. When in step S1175 there is no received data, that is, when the determination is NO, control terminates. When in step S1175 the determination is YES, it is determined in step S1176 whether the received data has been transmitted from the leading vehicle or not.

When in step S1176 the received data has not been transmitted from the leading vehicle, control terminates. When in step S1176 the received data has been transmitted from the leading vehicle, the data transmitted from the leading vehicle is written in a memory in step S1177, and the flow proceeds to step S1178. In the next step S1178, it is determined whether the next time is the object vehicle's turn to transmit or not. When this determination is NO, control terminates. When this determination is YES, that is, when the next time is the object vehicle's turn to transmit, the transmission data is collected in step S1179, the data is transmitted in step S1180, the vehicle enters following vehicle mode in step S1181, and control terminates.

When in step S1170 the determination as to whether the object vehicle is the leading vehicle according to its sequence number is YES, that is, when the object vehicle is the leading vehicle, the display device 8 indicates that the vehicles are forming the procession in step S1182, and the flow proceeds to step S1183. Then, in step S1183, it is determined whether a procession cancel request switch (corresponding to the procession cancel button TB, hereunder the same) is ON. When in the step S1183 the determination is YES, that is, when the procession cancel request switch is ON, the flow proceeds to step S1184, in which procession mode is then changed to normal mode, and in step S1185 a change request to normal mode is added to the data to be transmitted to the following vehicles. Then, the flow proceeds to step S1186.

When in step S1183 the determination is NO, that is, when the procession cancel request switch is OFF, the flow proceeds to step S1186. In step S1186, it is determined whether the next time is the object vehicle's turn to transmit or not. When in step S1186 the determination is YES, the transmission data is collected in step S1191, the data is transmitted in step S1192, and control terminates. When in step S1186 the determination is NO, the flow proceeds to step S1187, in which then it is determined whether the vehicle has received the data or not.

When in step S1187 the vehicle does not receive the data from the following vehicle, control terminates. When in step S1187 the vehicle receives the data from the following vehicle, the data from the following vehicle is stored in the memory in step S1188, and it is determined in step S1189 whether the data from all the vehicles are collected.

When in step S1189 the data from all the following vehicles are not collected, control terminates. When in step S1189 the data from all the following vehicles are collected, the flow proceeds to step S1190, in which then the formation of the procession is completed, the vehicle enters leading vehicle mode, and control terminates.

Figure 39:
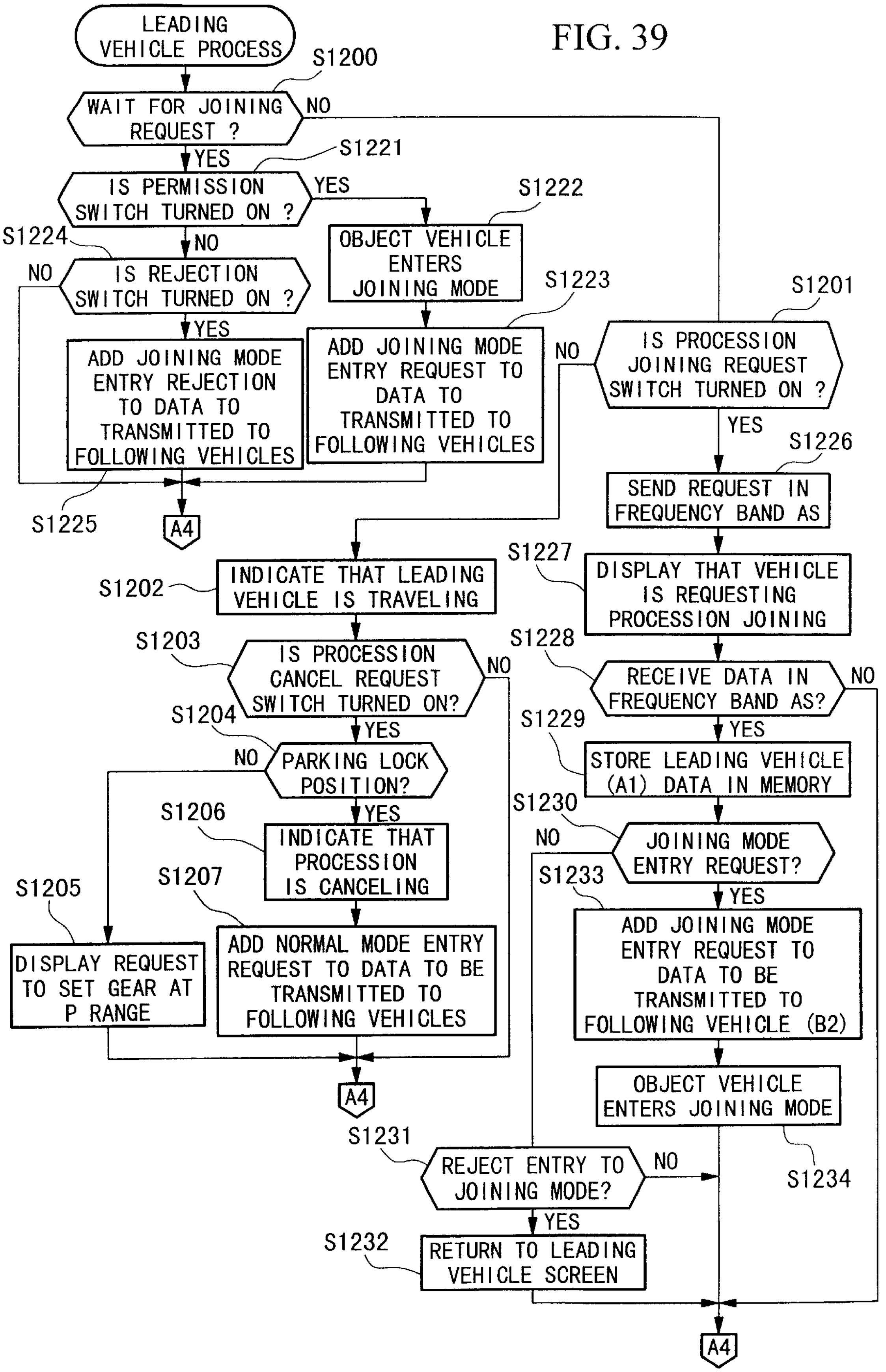
FIG. 39 is a flowchart showing the leading vehicle process of the third embodiment of the present invention.
Figure 40:
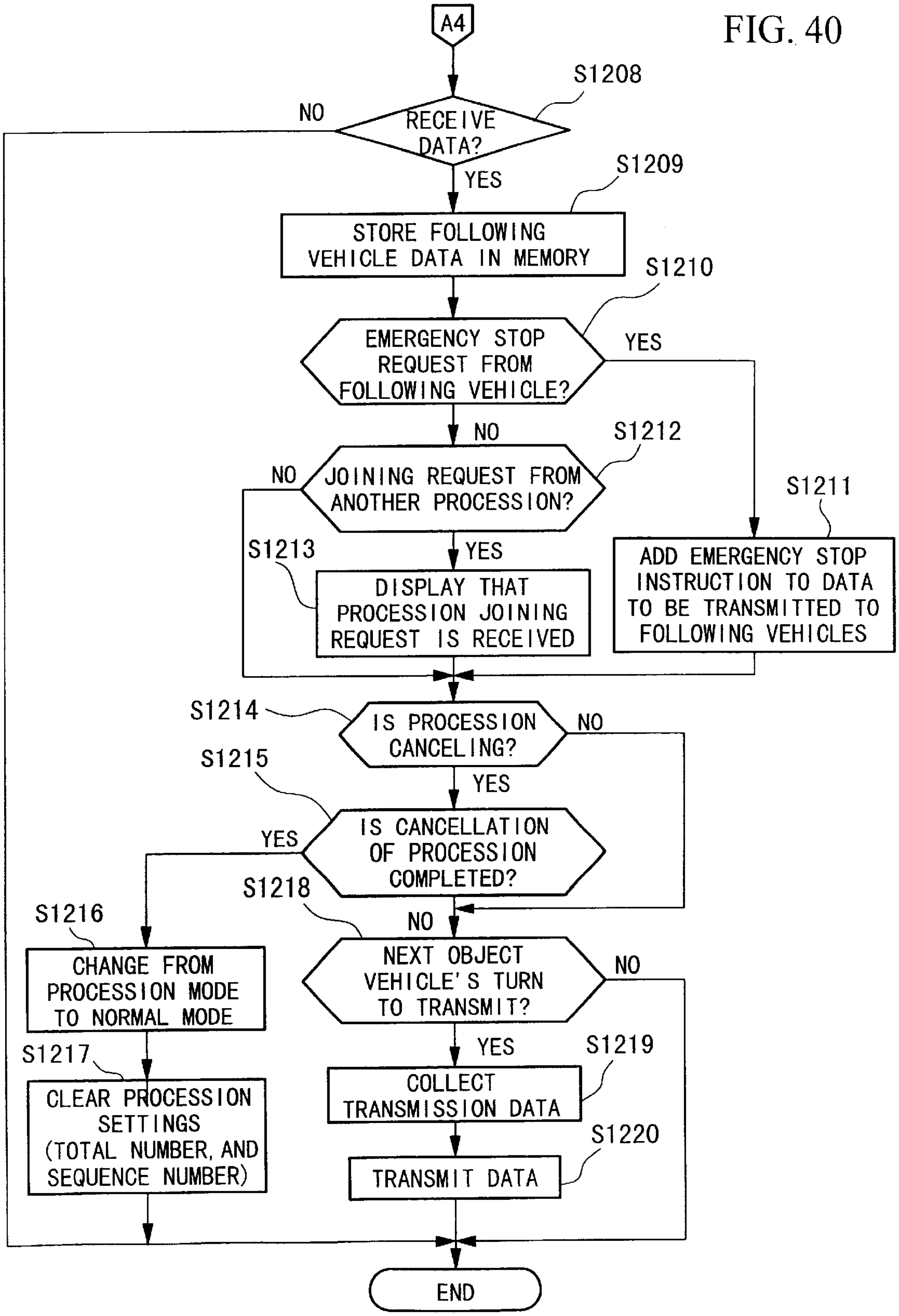
FIG. 40 is a flowchart showing the leading vehicle process of the third embodiment of the present invention.

The leading vehicle process in step S1159 in FIG. 37 will be explained with reference to the flowcharts of FIGS. 39 and 40. FIGS. 39 and 40 constitute one flowchart, which is divided into two parts for convenience of illustration.

In step S1200, it is determined whether the vehicle is waiting for the joining request. When the vehicle is not waiting for the joining request, it is determined in step S1201 whether a procession joining request switch is ON or not. When in step S1201 the procession joining request switch is OFF, the flow proceeds to step S1202, the display indicates that the leading vehicle is traveling, and the flow proceeds to step S1203. In step S1203, it is determined whether the procession cancel request switch is ON or not.

When in step S1203 the determination is NO, that is, when the procession cancel request switch is OFF, the flow proceeds to step S1208 in FIG. 40. When in step S1203 the determination is YES, that is, when the procession cancel request switch is ON, it is determined in the next step S1204 whether a gear shifter is at a parking lock position or not. When in step S1204 the determination is NO, that is, when the gear shifter is not at the parking lock position (parking range), the request to change the gear shifter to the P (parking) range is displayed on the display device 8 in step S1205, and the flow proceeds to step S1208 in FIG. 40.

When in step S1204 the determination is YES, that is, when the gear shift is at the parking lock position, the display device 8 indicates that the vehicle is canceling the procession in step S1206, the request to change to normal mode is added to the data to be transmitted to the following vehicle in step S1207, and the flow proceeds to step S1208 in FIG. 40.

In step S1208 in FIG. 40, it is determined whether there is any received data or not. When this determination is NO, control terminates. When in step S1208 the determination is YES, the following vehicle data is stored in step S1209, and the flow proceeds to step S1210, in which it is then determined whether an emergency stop request was sent from the following vehicle or not.

When in step S1210 the determination is YES, the emergency stop request is added to the data to be transmitted to the following vehicles in step S1211, and the flow proceeds to step S1214. When in step S1210 the determination is NO, it is determined in step S1212 whether the re is the joining request from another vehicle group (e.g., the processional vehicle group EG) or not. When in step S1212 the determination is NO, the flow proceeds to step 1214.

When in step S1212 the determination is YES, in step S1213 it is indicated that the procession joining request is received, and the flow proceeds to step S1214. In step S1214, it is determined whether the processions are joining or not. When in step S1214 the determination is NO, the flow proceeds to step S1218. When in step S1214 the determination is YES, it is determined in step S1215 whether the cancellation of the processions of the following vehicles is completed or not.

When in step S1215 the determination is NO, the flow proceeds to step S1218, in which then it is determined whether the next time is the object vehicle's turn to transmit. When in step S1218 the determination is NO, control terminates. When in step S1218 the determination is YES, the transmission data is collected in step S1219, the data is transmitted in step S1220, and control terminates. When in step S1215 the determination is YES, procession mode is changed to normal mode in step S1216, the procession settings (the total number of vehicles, and the sequence number) are cleared in step S1217, and control terminates.

When in step S1200 the vehicle is waiting for the joining request, it is determined in step S1221 whether the procession joining request permission switch is ON. When in step S1221 the determination is YES, the object vehicle enters joining mode in step S1222, the joining mode entry request is added to the data to be transmitted to the following vehicles in step S1223, and the flow proceeds to step S1208 in FIG. 40.

When in step S1221 the determination is NO, it is determined in step S1224 whether the procession joining request rejection switch is ON or not. When in step S1224 the determination is NO, the flow proceeds to step S1208 in FIG. 40. When in step S1224 the determination is YES, the joining mode entry rejection is added to the data to be transmitted to the following vehicles in step S1225, and the flow proceeds to step S1208 in FIG. 40.

When in step S1201 the procession joining request switch is ON, the request is transmitted in the frequency band AS in step S1226, in step S1227 it is displayed that the joining of the processions is requested, and in step S1228 it is determined whether there is any received data in the frequency band AS or not. When in step S1228 the determination is NO, the flow proceeds to step S1208. When in step S1228 the determination is YES, the leading vehicle (D1) data is stored in the memory in step S1229, and the flow proceeds to step S1230. In step S1230, it is determined whether there is the joining mode entry request or not, and when there is the joining mode entry request, the joining mode entry instruction is added to the data to be transmitted to the following vehicle (E2) in step S1233, the object vehicle enters joining mode in step S1234, and the flow proceeds to step S1208.

When in step S1230 there is no joining entry request, it is determined in step S1231 whether the joining mode entry is rejected or not. When it is not rejected, the flow proceeds to step S1208 in FIG. 40. In contrast, when the entry to joining mode is rejected, a leading vehicle screen is displayed in step S1232, and the flow proceeds to step S1208 in FIG. 40.

Figure 41:
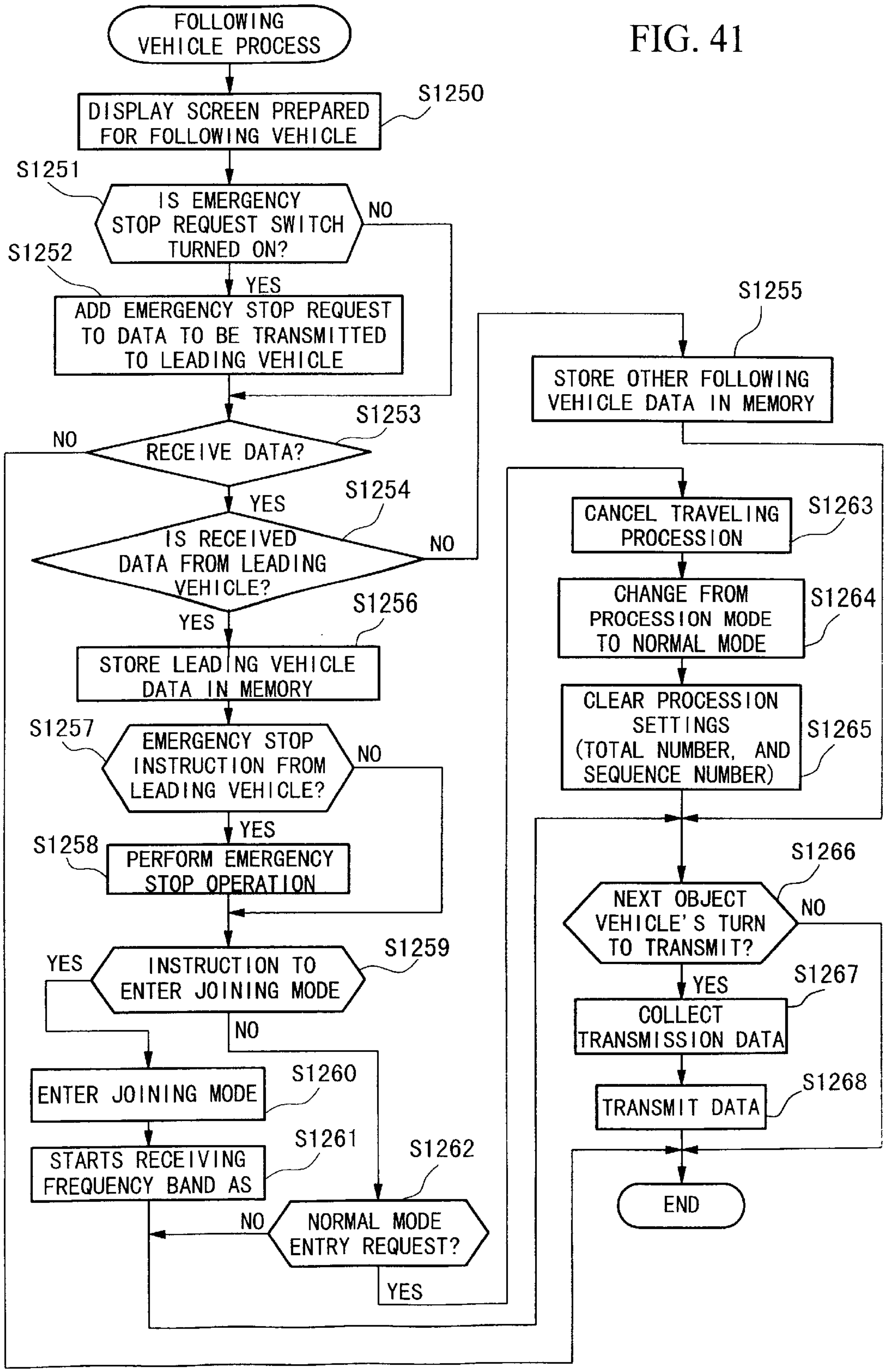
FIG. 41 is a flowchart showing the following vehicle process of the third embodiment of the present invention.

The following vehicle process in step S1158 in FIG. 37 will be explained with reference to the flowchart of FIG. 41.

In step S1250, the screen prepared for the following vehicle is displayed, and the flow proceeds to step S1251. In step S1251 it is determined whether the emergency stop request switch is ON or not. When in step S1251 the emergency stop request switch is OFF, the flow proceeds to step S1253.

When in step S1251 the emergency stop request switch is ON, an emergency stop request is added to the data to be transmitted to the leading vehicle in step S1252, and the flow proceeds to step S1253.

In step S1253, the presence or absence of received data is determined. When in step S1253 there is no received data, control terminates. When in step S1253 there is received data, the flow proceeds to step S1254, in which it is then determined whether the received data has been transmitted from the leading vehicle or not. When in step S1254 the received data was not sent from the leading vehicle, in step S1255 other following vehicle data is stored in a memory, and the flow proceeds to step S1266.

When in step S1254 the received data was sent from the leading vehicle, the leading vehicle data is stored in the memory in step S1256, and the flow proceeds to step S1257. In step S1257, it is determined whether an emergency stop instruction was sent from the leading vehicle.

When in step S1257 no emergency stop instruction was sent from the leading vehicle, the flow proceeds to step S1259. When the emergency stop instruction was sent from the leading vehicle, the vehicle performs the emergency stop operation in step S1258, and the flow proceeds to step S1259.

In step S1259, it is determined whether there is a joining mode entry request or not. When in step S1259 there is the joining mode entry request, the vehicle enters joining mode in step S1260, and starts receiving a signal in the frequency band AS in step S1261, and the flow proceeds to step S1266.

When in step S1259 there is no joining mode entry instruction, in step S1262 it is determined whether there is a normal mode entry request or not. When in step S1262 there is no normal mode entry request, the flow proceeds to step S1266. When in step S1262 there is the normal mode entry request, the processional travel (processional travel mode) is terminated in step S1263, procession mode is changed to normal mode in step S1264, the procession settings (the total number of vehicles, and the sequence number) are cleared in step S1265, and the flow proceeds to step S1266.

In step S1266, it is determined whether the next time is the object vehicle's turn to transmit. When in step S1266 the determination is NO, control terminates. When in step S1266 the determination is YES, the transmission data is collected in step S1267, the data is transmitted in step S1268, and control terminates.

Figure 42:
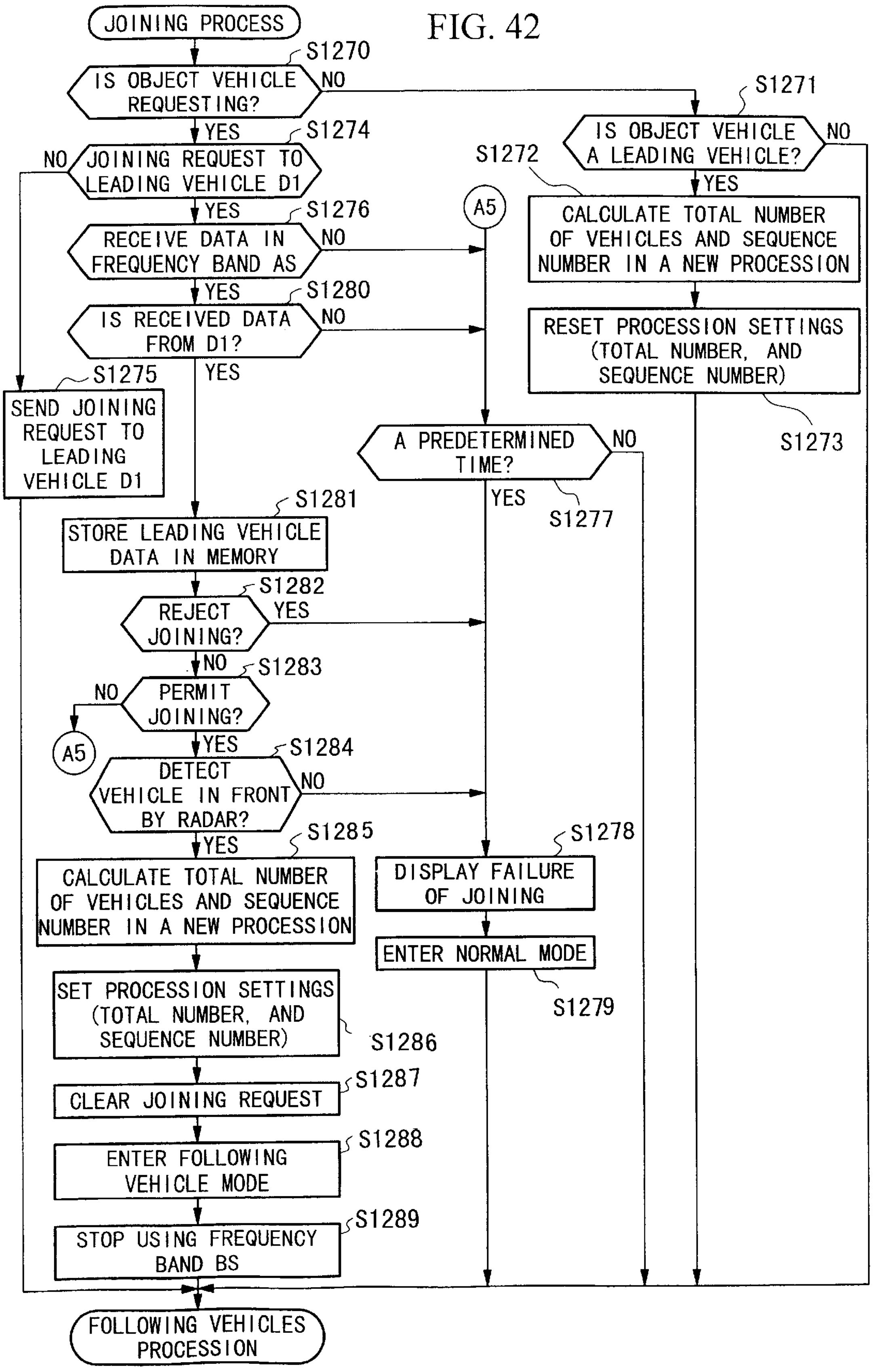
FIG. 42 is a flowchart showing the joining process of the third embodiment of the present invention.

The joining process in step S1156 in FIG. 37 will be explained with reference to the flowchart of FIG. 42.

In step S1270, it is determined whether the object vehicle is in the requesting vehicle group or not. When the object vehicle is not in the requesting vehicle group, the flow proceeds to step S1271, in which it is then determined whether the object vehicle is a leading vehicle or not. When in step S1271 the object vehicle is not a leading vehicle, control terminates. When in step S1271 the object vehicle is a leading vehicle, the total number of vehicles in a new procession and the sequence number are calculated in step S1272, the procession settings (the total number of vehicles, and the sequence number) are reset in step S1273, and control terminates.

When in step S1270 the object vehicle is in the requesting vehicle group, the flow proceeds to step S1274, in which it is determined whether the vehicle is requesting the joining to the leading vehicle D1 or not. When in step S1274 the vehicle is not requesting the joining, the flow proceeds to step S1275, in which then the joining request is sent to the leading vehicle D1, and control terminates. When in step S1274 the vehicle is requesting the joining, the flow proceeds to step S1276, in which it is then determined whether there is any received data in the frequency band AS or not.

When in step S1276 there is no received data, the flow proceeds to step S1277, in which then it is determined whether a predetermined time has passed or not. After the predetermined time has passed, the display indicates the failure of the joining in step S1278, the vehicle enters normal mode in step S1279, and control terminates. When in step S1277 the predetermined time has not passed, control terminates.

When in step S1276 there is received data, the flow proceeds to step S1280, in which it is then determined whether the received data is sent from the leading vehicle D1 or not. When it is not sent from the leading vehicle, the flow proceeds to step S1277. When in step S1280 the received data is sent from the leading vehicle, the leading vehicle data is stored in the memory in step S1281, and the flow proceeds to step S1282, in which it is then determined whether the joining is rejected or not. When the joining is rejected in step S1282, the flow proceeds to step S1278.

When in step S1282 the joining is not rejected, the flow proceeds to step S1283, in which it is then determined whether the joining is permitted or not. When in step S1283 the joining is not permitted, the flow proceeds to step S1277. When in step S1283 the joining is permitted by the leading vehicle, the flow proceeds to step S1284, in which then the vehicle can detect the vehicle in front by radar.

When in step S1284 the vehicle cannot detect the vehicle in front, the flow proceeds to step S1278. When in step S1284 the vehicle can detect the vehicle in front by radar, the total number of vehicles in a new procession and the sequence number are calculated in step S1285, the procession settings (the total number of vehicles, and the sequence number) are set in step S1286, and the joining request is cleared in step S1287. Then, in step S1288, the vehicle enters following mode, and stops using the frequency band BS in step S1289, and control terminates.

The communication procedure when another procession wishes to join the procession, joins at the end of the procession, and forms a new procession will be explained.

In the following procedure, as shown in FIG. 31, the processional vehicle group EG, which includes in total two vehicles of the leading vehicle E1 and the following vehicle E2, joins a processional vehicle group DG which includes in total three vehicles of the leading vehicle D1 and the following vehicles D2 and D3. The processional vehicle group EG approaches the traveling processional vehicle group DG, and when the procession joining request is permitted, the processional vehicle group EG joins at the end of the processional vehicle group DG, and they form the processional vehicle group FG shown in FIG. 32.

In the following, the explanation is made by way of the case in which the joining request is sent from the processional vehicle group EG after the leading vehicle D1 performs the communication (1) in the above-described communication procedure, and after all the vehicles 1 receive it. The communication procedure in the respective processions is similar to the second embodiment, and its description is omitted. The processional vehicle group DG performs the vehicle-to-vehicle communication using the frequency band AS, and the processional vehicle group EG performs the vehicle-to-vehicle communication using the frequency band BS. Numbers in the round brackets continued from the communication procedure for normal processional travel.

(12) The leading vehicle D1 in the processional vehicle group DG transmits using the frequency band AS. In the transmitted data, it is specified that the following vehicle D2 has the next transmission right. The data transmitted from the leading vehicle D1 is received by all the vehicles 1 which are the following vehicles D2 to D3.

(13) Although the next time is the following vehicle D2's turn to transmit, the leading vehicle E1 in the processional vehicle group EG manually switches the communication frequency to the frequency band AS, the leading vehicle E1 transmits in the frequency band AS, and the data transmitted from the leading vehicle E1 in the processional vehicle group EG is received by all the vehicles 1 in the processional vehicle group DG. At that time, the other vehicles 1 in the processional vehicle group EG receives the data in the frequency band AS used by the processional vehicle group DG. Here, the following vehicle E2 in the processional vehicle group EG receives an instruction informing the timing for switching the frequency from an instruction device, which is not shown, of the leading vehicle E1. Thus, the following vehicle E2 in the processional vehicle group EG can receive the timing for the leading vehicle E1's switching the frequency band AS for the processional vehicle group DG to the frequency band BS for the processional vehicle group EG.

On reception of the data, the leading vehicle D1 switches the screen on the display device 8. The vehicle-to-vehicle communication in the processional vehicle group DG in the frequency band AS continues. The processional vehicle group EG is switched to the frequency band BS, and the vehicle-to-vehicle communication continues. When the driver in the leading vehicle D1 pushes the permission button KYB, the leading vehicle D1 transmits, and specifies in the transmitted data that the following vehicle D2 has the next transmission right. The transmitted data from the leading vehicle D1, which includes the joining mode entry request, is received by all the vehicles 1 in the processional vehicle groups DG and EG.

Then, the leading vehicle D1 is changed to a leading vehicle F1, the following vehicle D2 is changed to a following vehicle F2, the following vehicle D3 is changed to a following vehicle F3, the leading vehicle E1 is changed to a following vehicle F4, and the following vehicle E2 is changed to a following vehicle F5. The vehicle-to-vehicle communication in the processional vehicle group EG terminates.

(14) Then, the following vehicle D2=F2 which has the transmission right transmits. In the transmitted data, it is specified that the leading vehicle F1 has the next transmission right. The data transmitted from the following vehicle F2 is received by the leading vehicle F1 and the other following vehicles F3 to F5.

(15) Again, the leading vehicle F1 transmits. It is specified that the leading vehicle F3 has the next transmission right.

(16) The following vehicle F3 transmits. In the transmitted data, it is specified that the leading vehicle F1 has the next transmission right. The data transmitted from the following vehicle F3 is received by the leading vehicle F1 and the other following vehicles F2, F4, and F5.

(17) After the following vehicle F5 transmits, the procedure returns to the leading vehicle F1, and then the above procedure is then repeated. Thus, the communication can be smoothly performed when the processional vehicle group EG joins the procession.

The apparatus for changing the frequency for the vehicle-to-vehicle communication will be explained with reference to FIG. 43. As described above, when there is only one processional vehicle group, there may be a single frequency for the vehicle-to-vehicle communication. Once the processions are joined, the frequencies for the vehicle-to-vehicle communication must be different to prevent radio interference between each other.

Specifically, the band of 2.484 MHz (the bandwidth: 2.471–2.497 MHz), which is the frequency band applicable to a radio LAN for mobile bodies, is divided into the AS band whose range is 2.471–2.484 MHz and the BS band whose range is 2.484–2.497 MHz. Thus, these two frequency bands are allocated to the respective separated vehicle groups, thereby preventing radio interference between the groups.

Figure 43A:
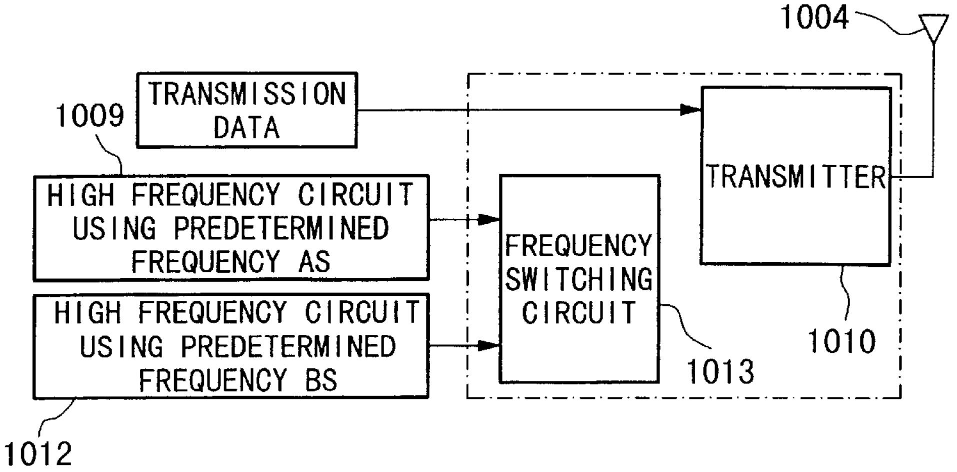
FIGS. 43A and 43B are block diagrams showing vehicle-to-vehicle communication device using multi-channel communication of the third embodiment of the present invention.
Figure 43B:
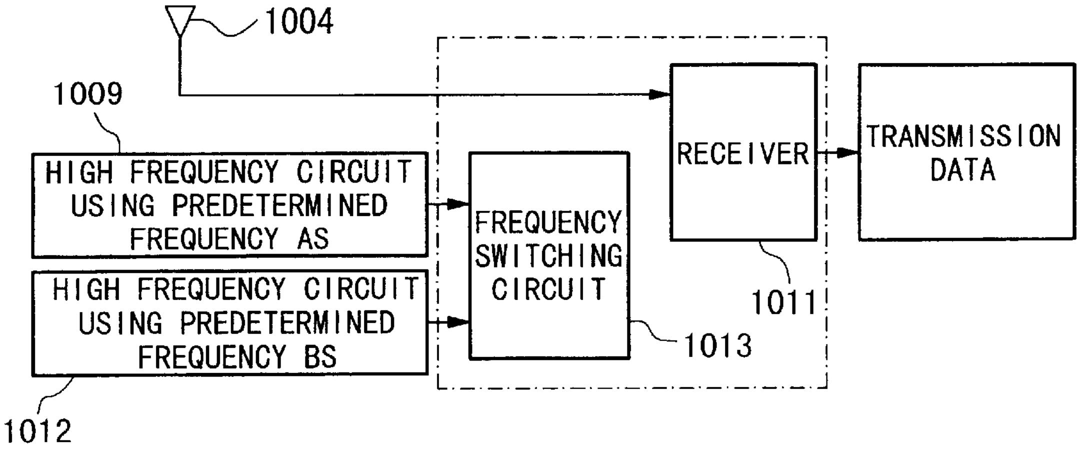

FIGS. 43A and 43B are diagrams for explaining the construction of the communication device using multi-channel communication (for switching a frequency). FIG. 43A shows a transmitter for vehicle-to-vehicle communication. FIG. 43B shows a receiver for vehicle-to-vehicle communication. In FIG. 43A, an instruction by the driver (e.g., an instruction input by a button not shown) is input to a frequency switching circuit 1013, by which one of a high frequency circuit 1009 using the predetermined frequency band AS and another high frequency circuit 1012 using the predetermined frequency band BS is selected. Thus, the transmission data can be transmitted from the vehicle-to-vehicle antenna 1004 using a radio frequency in the band AS or BS. In FIGS. 43A and 43B, a portion enclosed by the chain lines (the frequency switching circuit 1013 and the transmitter 1010 in FIG. 43A, and the frequency switching circuit 1013 and the receiver 1011 in FIG. 43B) constitute a part of the processional travel control apparatus.

As shown in FIG. 43B, the transmitted data is received by the receiver 1011 of the other vehicle 1 in the object vehicle group. Because, in a manner similar to the transmitter, the frequency switching circuit 1013 can select one of the high frequency circuit 1009 using the frequency band AS, and the high frequency circuit 1012 using the frequency band BS, according to the instruction from the display device, the data is reliably received by the receiver 1011.

Thus, because, before the processions are joined together, the processional vehicle group DG uses the frequency in the band AS, and the other processional vehicle group EG uses the frequency in the band BS. When they are joined together, the processional vehicle group EB is manually switched to the frequency band AS to receive the information from the processional vehicle group DG. When the joining is permitted, the processional vehicle group EG joins the processional vehicle group DG, and the vehicle-to-vehicle communication is performed in the frequency band AS. Therefore, before the joining, radio interference can be prevented, and after the joining, the processional vehicle group FG can perform the vehicle-to-vehicle communication using the common frequency band.

According this embodiment, when the processional vehicle group EG, which consists of the leading vehicle E1 and the following vehicle E2 wishes to join the processional vehicle group DG which consists of the leading vehicle D1 and the following vehicles D2 and D3, the processional vehicle group EG can join the procession, and the new processional vehicle group FG which consists of the leading vehicle F1 and the following vehicles F2, F3, F4, and F5, without stopping and canceling the respective processions. Therefore, without decreasing the transport efficiency in processional travel, the redundant labor of the drivers can be reduced. Further, the vehicle-to-vehicle communication between the processional vehicle group DG and the processional vehicle group EG can be smoothly provided, avoiding confusion and blank in communication.

This invention is not limited to the above embodiments, and for example the total number of vehicles is not limited unless there is no problem with processional travel.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A processional travel control apparatus which allows processional travel a group of vehicles including a leading vehicle and a following vehicle automatically following the leading vehicle, wherein an object vehicle comprises a device for sending a request to separate or join the processional travel, to the leading vehicle;

the leading vehicle comprises a device for selectively permitting and rejecting the request from the object vehicle, the apparatus further comprises a mode switching device, and when the leading vehicle permits the request, the object vehicle is switched by the mode switching device between automatic driving, in which the object vehicle functions as a following vehicle automatically following the leading vehicle, and manual driving by a driver.

2. An apparatus according to claim 1, further comprising a channel switching device for switching a communication channel when the object vehicle separates or joins the processional travel.

3. An apparatus according to claim 1, wherein the object vehicle is the following vehicle in said group of vehicles, the following vehicle comprises the device for sending a request to separate from the processional travel to the leading vehicle, the leading vehicle comprises a device for permitting or rejecting the separation request from the following vehicle, and when the leading vehicle permits the separation request, the following vehicle is switched by the mode switching device from the automatic driving, in which the following vehicle automatically follows the leading vehicle, and the manual driving by a driver.

4. An apparatus according to claim 3, further comprising a channel switching device for switching a communication channel, wherein when the leading vehicle permits the separation request and there is another following vehicle which allows the following vehicle separating from the procession at the time of switching from automatic driving to manual driving, a new procession is formed comprising the separating following vehicle and said another following vehicle, and the channel switching device switches a communication device of the new procession to a communication channel different from that of the original procession.

5. A processional travel control apparatus which has a communication device for sending information regarding an object vehicle position to another vehicle, and which allows processional travel with a group of vehicles including a leading vehicle and succeeding vehicles automatically following the leading vehicle, based on the information, wherein an independent vehicle, which travels independently from the vehicle group traveling in a procession, comprises a device for sending a request to incorporate the independent vehicle into the procession to the leading vehicle, the leading vehicle comprises a device for selectively permitting and rejecting the incorporation request from the independent vehicle, the apparatus further comprises a mode switching device, and when the leading vehicle permits the incorporation request from the independent vehicle, the independent vehicle is switched by the mode switching device from manual driving by a driver to automatic driving in which this vehicle automatically follows the leading vehicle.

6. A processional travel control apparatus which has a communication device for sending information regarding an object vehicle position to another vehicle, and which allows processional travel with a group of vehicles, each said group including a leading vehicle and at least one succeeding vehicle automatically following the leading vehicle, based on the information, wherein a leading vehicle in a second vehicle group, which travels in a second procession independently from a first vehicle group traveling in a first procession, comprises a device for sending a request to join the first procession to the leading vehicle in the first procession, the leading vehicle in the first vehicle group comprises a device for selectively permitting and rejecting the joining request from the leading vehicle in the second vehicle group, the aparatus further comprises a mode switching device, and when the leading vehicle in the first vehicle group permits the joining request from the leading vehicle of the second vehicle group, the leading vehicle in the second vehicle group is switched by the mode switching device from manual driving by a driver to automatic driving in which this vehicle automatically follows the leading vehicle in the first vehicle group, and becomes a following vehicle in a new vehicle group and followsthe leading vehicle in the first group, which becomes the leading vehicle in the new group.

7. An apparatus according to claim 6, further comprising a channel switching device for switching a communication channel, wherein when the leading vehicle in the first vehicle group permits the separation request from the second vehicle group and the second vehicle group joins a first vehicle group, the channel switching device sets the communication channel for the second vehicle group to the same as that for the first vehicle group.

8. An apparatus according to claim 5, wherein the succeeding vehicles automatically, sequentially follow the leading vehicle in the processional travel.

* * * * *

UNITED STATES PATENT AND TRADEMARK OFFICE

CERTIFICATE OF CORRECTION

PATENT NO. : 6,356,820 B1 
DATED : March 12, 2002
INVENTOR(S) : Hideki Hashimoto and Masami Ogura It is certified that error appears in the above-identified patent and that said Letters Patent is hereby corrected as shown below:

<u>Title page,</u>
Item [57], ABSTRACT,
Line 11, change "ans" to -- and --.

<u>Column 1,</u>
Line 67, after "includes" insert -- a --.

<u>Column 3,</u>
Line 33, change "leading vehicles" to -- leading vehicle --.
Line 34, change "vehicles group" to -- vehicle group --.
Line 65, change "embodiment" to -- embodiments --.

<u>Column 4,</u>
Line 19, change "a waiting" to -- awaiting --.

<u>Column 7,</u>
Line 17, change "AS" to -- A5 --.
Line 60, after "port" insert a comma.

<u>Column 10,</u>
Line 36, after "according" insert -- to --.

<u>Column 15,</u>
Line 53, before "again" insert -- transmits --.

<u>Column 16,</u>
Line 19, after "possible" change the comma to a period.

<u>Column 18,</u>
Line 16, change "are" to -- is --.
Line 37, change "show" to -- shows --.
Line 45, change "constitute" to -- constitutes --.
Line 54, change "steering device" to -- steering --.
Line 55, change "steering ST" to -- steering device ST --.

UNITED STATES PATENT AND TRADEMARK OFFICE

CERTIFICATE OF CORRECTION

PATENT NO. : 6,356,820 B1
DATED : March 12, 2002
INVENTOR(S) : Hideki Hashimoto and Masami Ogura It is certified that error appears in the above-identified patent and that said Letters Patent is hereby corrected as shown below:

Column 19,
Line 29, change "1016" to -- S1016 --.
Line 47, before "described" insert a comma; change "herein" to -- hereinafter, --; delete "as too".
Line 66, after "according" insert -- to --.

Column 21,
Line 48, change "vehicles" to -- vehicle --.
Line 63, change "indepedent" to -- independent --.

Column 22,
Line 55, change "S111" to -- S1111 --.

Column 24,
Line 50, after "According" insert -- to --.

Column 26,
Line 3, change "show" to -- shows --.

Column 27,
Line 37, after "according" insert -- to --.

Column 29,
Line 16, change "the re" to -- there --.
Line 19, change "1214" to -- S1214 --.
Line 23, change "joining" to -- canceling --.

Column 32,
Line 35, change "receives" to -- receive --.

Column 34,
Line 9, "According" insert -- to --.
Line 37, before "a group" insert -- with --.

UNITED STATES PATENT AND TRADEMARK OFFICE

CERTIFICATE OF CORRECTION

PATENT NO. : 6,356,820 B1 
DATED : March 12, 2002
INVENTOR(S) : Hideki Hashimoto and Masami Ogura It is certified that error appears in the above-identified patent and that said Letters Patent is hereby corrected as shown below:

<u>Column 35,</u>
Line 3, change "and" to -- to --.
Line 8, change "allows" to -- follows --.

<u>Column 36,</u>
Line 2, change "a group" to -- groups --.
Line 16, change "aparatus" to -- apparatus --.
Line 26, change "follow-" to -- follows --.
Line 27, change "sthe" to -- the --; after "first" insert -- vehicle --.
Line 34, change "a first" to -- the first --.
Line 35, change "sets the" to -- sets a --.

Signed and Sealed this

Twenty-second Day of October, 2002

*Attest:*

JAMES E. ROGAN

*Attesting Officer* *Director of the United States Patent and Trademark Office*

UNITED STATES PATENT AND TRADEMARK OFFICE

CERTIFICATE OF CORRECTION

PATENT NO. : 6,356,820 B1
DATED : March 12, 2002
INVENTOR(S) : Hideki Hashimoto and Masami Ogura It is certified that error appears in the above-identified patent and that said Letters Patent is hereby corrected as shown below:

Title page,
Item [57], ABSTRACT,
Line 11, change "ans" to -- and --.

Column 1,
Line 67, after "includes" insert -- a --.

Column 3,
Line 33, change "leading vehicles" to -- leading vehicle --.
Line 34, change "vehicles group" to -- vehicle group --.
Line 65, change "embodiment" to -- embodiments --.

Column 4,
Line 19, change "a waiting" to -- awaiting --.

Column 7,
Line 17, change "AS" to -- A5 --.
Line 60, after "port" insert a comma.

Column 10,
Line 36, after "according" insert -- to --.

Column 15,
Line 53, before "again" insert -- transmits --.

Column 16,
Line 19, after "possible" change the comma to a period.

Column 18,
Line 16, change "are" to -- is --.
Line 37, change "show" to -- shows --.
Line 45, change "constitute" to -- constitutes --.
Line 54, change "steering device" to -- steering --.
Line 55, change "steering ST" to -- steering device ST --.

UNITED STATES PATENT AND TRADEMARK OFFICE
CERTIFICATE OF CORRECTION

PATENT NO. : 6,356,820 B1
DATED : March 12, 2002
INVENTOR(S) : Hideki Hashimoto and Masami Ogura It is certified that error appears in the above-identified patent and that said Letters Patent is hereby corrected as shown below:

Column 19,
Line 29, change "1016" to -- S1016 --.
Line 47, before "described" insert a comma; change "herein" to -- hereinafter, --; delete "as too".
Line 66, after "according" insert -- to --.

Column 21,
Line 48, change "vehicles" to -- vehicle --.
Line 63, change "indepedent" to -- independent --.

Column 22,
Line 55, change "S111" to -- S1111 --.

Column 24,
Line 50, after "According" insert -- to --.

Column 26,
Line 3, change "show" to -- shows --.

Column 27,
Line 37, after "according" insert -- to --.

Column 29,
Line 16, change "the re" to -- there --.
Line 19, change "1214" to -- S1214 --.
Line 23, change "joining" to -- canceling --.

Column 32,
Line 35, change "receives" to -- receive --.

Column 34,
Line 9, after "According" insert -- to --.
Line 37, before "a group" insert -- with --.

UNITED STATES PATENT AND TRADEMARK OFFICE

CERTIFICATE OF CORRECTION

PATENT NO. : 6,356,820 B1 
DATED : March 12, 2002
INVENTOR(S) : Hideki Hashimoto and Masami Ogura It is certified that error appears in the above-identified patent and that said Letters Patent is hereby corrected as shown below:

<u>Column 35,</u>
Line 3, change "and" to -- to --.
Line 8, change "allows" to -- follows --.

<u>Column 36,</u>
Line 2, change "a group" to -- groups --.
Line 16, change "aparatus" to -- apparatus --.
Line 26, change "follow-" to -- follows --.
Line 27, change "sthe" to -- the --; after "first" insert -- vehicle --.
Line 34, change "a first" to -- the first --.
Line 35, change "sets the" to -- sets a --.

This certificate supersedes Certificate of Correction issued October 22, 2002.

Signed and Sealed this

Twenty-fifth Day of March, 2003

JAMES E. ROGAN
*Director of the United States Patent and Trademark Office*